(12) United States Patent
Yoo et al.

(10) Patent No.: US 12,534,747 B2
(45) Date of Patent: Jan. 27, 2026

(54) MICROORGANISM PRODUCING L-AMINO ACID AND METHOD OF PRODUCING L-AMINO ACID USING THE SAME

(71) Applicant: CJ CHEILJEDANG CORPORATION, Seoul (KR)

(72) Inventors: Hye Ryun Yoo, Seoul (KR); So-Yeon Kim, Seoul (KR); Hye Min Park, Seoul (KR); Sung Gun Lee, Seoul (KR); Jin Nam Lee, Seoul (KR); Hyun Ah Kim, Seoul (KR); Sol Choi, Seoul (KR); Lan Huh, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 875 days.

(21) Appl. No.: 17/599,818

(22) PCT Filed: Apr. 29, 2020

(86) PCT No.: PCT/KR2020/005674
§ 371 (c)(1),
(2) Date: Sep. 29, 2021

(87) PCT Pub. No.: WO2020/226341
PCT Pub. Date: Nov. 12, 2020

(65) Prior Publication Data
US 2022/0228179 A1 Jul. 21, 2022

(30) Foreign Application Priority Data
May 9, 2019 (KR) .......... 10-2019-0054430

(51) Int. Cl.
*C12P 13/04* (2006.01)
*C07K 14/195* (2006.01)
*C12N 9/00* (2006.01)
*C12N 15/52* (2006.01)
*C12N 15/77* (2006.01)

(52) U.S. Cl.
CPC ............ *C12P 13/04* (2013.01); *C07K 14/195* (2013.01); *C12N 9/00* (2013.01); *C12N 15/52* (2013.01); *C12N 15/77* (2013.01); *C12Y 108/01002* (2013.01); *C12Y 201/01013* (2013.01); *C12Y 206/01052* (2013.01); *C12Y 301/03003* (2013.01); *C12Y 401/99001* (2013.01)

(58) Field of Classification Search
CPC ........ C07K 14/195; C12N 9/00; C12N 15/52; C12P 13/005
See application file for complete search history.

(56) References Cited

U.S. PATENT DOCUMENTS

| 8,916,519 B2 | 12/2014 | Montelione et al. |
| 2003/0175912 A1* | 9/2003 | Suga ............ C12P 13/06 435/320.1 |
| 2012/0190081 A1 | 7/2012 | Chang et al. |
| 2014/0134680 A1 | 5/2014 | Dischert et al. |

FOREIGN PATENT DOCUMENTS

| JP | 64-60383 A | 3/1989 |
| JP | 3-7591 A | 1/1991 |
| JP | 11-253187 A | 9/1999 |
| JP | 2004-254694 A | 9/2004 |
| KR | 10-2008-0025355 A | 3/2008 |
| KR | 10-2008-0036608 A | 4/2008 |
| KR | 10-0838038 B1 | 6/2008 |
| KR | 10-2012-0041115 A | 4/2012 |
| KR | 10-1208480 B1 | 12/2012 |
| KR | 10-2020-0013995 A | 10/2020 |
| KR | 10-2020-0130567 A | 11/2020 |

OTHER PUBLICATIONS

Grant. G.A., 2018, Frontiers in Molecular Biosciences, vol. 5, article 110, pp. 1-18 (Year: 2018).*
NCBI GenBank Accession No. SFW99817.1, 2016, pp. 1-2 (Year: 2016).*
Merriam Webster Dictionary, "Modified" pp. 1-13, available at https://www.merriam-webster.com/dictionary/modified, accessed on Oct. 22, 2024 (Year: 2024).*
Kyoto Encyclopedia of Genes and Genomes., 2011, Enzyme 2.6. 1.52, pp. 1-2, retrieved from https://www.genome.jp/dbget-bin/www_bget?ec:2.6.1.52#:~:text=KEGG%20ENZYME:%202.6.,pyridoxal%205'%2Dphosphate%20protein on Oct. 22, 2024 (Year: 2011 ).*
Francis et al., Production of Recombinant Proteins in Current Protocols in Protein Science, 2010, Unit 5.24, pp. 1-29, (Year: 2010).*
GenBank: SFW99817.1 "D-3-phosphoglycerate dehydrogenase [*Azotobacter vinelandii*]" Nov. 17, 2016, 1 page.
Kwak et al., "Identification of Amino Acid Residues Involved in Feedback Inhibition of the Anthranilate Synthase in *Escherichia coli*," *Journal of Biochemistry and Molecular Biology* 32(1):20-24 (Jan. 1999).
Rey et al., "The putative transcriptional repressor McbR, member of the TetR-family, is involved in the regulation of the metabolic network directing the synthesis of sulfur containing amino acids in *Corynebacterium glutamicum*," *Journal of Biotechnology* 103:51-65 (2003).

(Continued)

*Primary Examiner* — Lianko G Garyu
*Assistant Examiner* — Claudia Espinosa
(74) *Attorney, Agent, or Firm* — Seed Intellectual Property Law Group LLP

(57) ABSTRACT

Provided are a microorganism producing an L-amino acid or a precursor thereof, and a method of producing an L-amino acid or a precursor thereof using the microorganism.

12 Claims, No Drawings
Specification includes a Sequence Listing.

(56) References Cited

OTHER PUBLICATIONS

Schendzielorz et al., "Taking Control over Control: Use of Product Sensing in Single Cells to Remove Flux Control at Key Enzymes in Biosynthesis Pathways," *ACS Synthetic Biology* 3(1):21-29 (2014).
Grant, "D-3-Phosphoglycerate Dehydrogenase," *Front. Mol. Biosci.* 5:110, 18 pages, (Dec. 2018).
Uniprot [online] Accession No. C1DK31, https://rest.uniprot.org/unisave/C1DK31?format=txt&versions=67, 1 page (May 8, 2019).
NCBI Reference Sequence: WP_012703298.1, phosphoglycerate dehydrogenase [*Azotobacter vinelandii*], 1 page, (Nov. 15, 2017).

* cited by examiner

MICROORGANISM PRODUCING L-AMINO ACID AND METHOD OF PRODUCING L-AMINO ACID USING THE SAME

STATEMENT REGARDING SEQUENCE LISTING

The Sequence Listing associated with this application is provided in text format in lieu of a paper copy, and is hereby incorporated by reference into the specification. The name of the text file containing the Sequence Listing is 200187_476USPC_SEQUENCE_LISTING.txt. The text file is 66.8 KB, was created on Sep. 7, 2021Oct. 4, 2021, and is being submitted electronically via EFS-Web.

TECHNICAL FIELD

The present disclosure relates to a microorganism producing an L-amino acid or a precursor thereof and a method of producing an L-amino acid or a precursor thereof using the microorganism.

BACKGROUND ART

L-amino acids, basic constitutional units for protein, have been used to as major raw materials of medicines, food additives, animal feeds, nutritional supplements, pesticides, sterilizers, and the like. Extensive research has been conducted to develop microorganisms and fermentation processes for producing L-amino acids and other beneficial substances with high yields. For example, target-specific approaches, such as a method of increasing the expression of a gene encoding an enzyme involved in L-lysine biosynthesis and a method of removing a gene unnecessary for the biosynthesis have been mainly used (Korean Patent No. 10-0838038).

Meanwhile, strains of the genus *Corynebacterium*, particularly, *Corynebacterium glutamicum*, are gram-positive microorganisms widely used to produce L-amino acids and other beneficial substances. Intensive research has been performed to develop microorganisms and fermentation processes for producing the amino acids with high yields. For example, target-specific approaches, such as a method of increasing expression of a gene encoding an enzyme involved in amino acid biosynthesis or a method of removing a gene unnecessary for the biosynthesis in strains of the genus *Corynebacterium* have been widely used (Korean Patent Publication Nos. 10-0924065 and 10-1208480). In addition to these methods, a method of removing a gene not involved in production of amino acids and a method of removing a gene whose specific functions are not known with regard to the production of amino acids have also been used. However, there is still a need for research into methods of efficiently producing L-amino acids with high yields.

DESCRIPTION OF EMBODIMENTS

Technical Problem

The present inventors have made extensive efforts to develop a microorganism capable of producing L-amino acids with high yields and have found that productivity of L-amino acids can be increased by introducing a protein derived from another microorganism thereinto, thereby completing the present disclosure.

Solution to Problem

An object of the present disclosure is to provide a microorganism producing an L-amino acid or a precursor thereof, wherein the microorganism is modified to express a protein comprising an amino acid sequence of SEQ ID NO: 1 or a functional fragment thereof.

Another object of the present disclosure is to provide a composition for producing an L-amino acid or a precursor thereof, wherein the composition comprises the microorganism that is modified to express a protein comprising an amino acid sequence of SEQ ID NO: 1 or a functional fragment thereof, or the protein.

Still another object of the present disclosure is to provide a method of producing an L-amino acid or a precursor thereof, the method comprising: culturing the microorganism in a culture medium; and recovering the L-amino acid or the precursor thereof from the cultured microorganism or the culture medium.

Still another object of the present disclosure is to provide use of a protein comprising an amino acid sequence of SEQ ID NO: 1 or a functional fragment thereof for increasing production of an L-amino acid or a precursor thereof.

Advantageous Effects of Disclosure

The microorganism according to the present disclosure producing an L-amino acid or a precursor thereof, wherein the microorganism is modified to express a protein comprising an amino acid sequence of SEQ ID NO: 1 or a functional fragment thereof may produce L-serine, L-tryptophan, L-histidine, L-methionine, L-cysteine, and/or O-phosphoserine.

BEST MODE

Hereinafter, the present disclosure will be described in more detail.

Meanwhile, each description and embodiment disclosed in the present disclosure may be applied herein to describe different descriptions and embodiments. In other words, all combinations of various components disclosed in the present disclosure are included within the scope of the present disclosure. Furthermore, the scope of the present disclosure should not be limited by the detailed descriptions provided below.

Additionally, those skilled in the art will be able to recognize or confirm, using ordinary experiments, many equivalents for specific aspects of the present disclosure. Such equivalents are intended to be included in the scope of the present disclosure.

To achieve the above objects, an aspect of the present disclosure provides a microorganism producing an L-amino acid or a precursor thereof, wherein the microorganism is modified to express a protein comprising an amino acid sequence of SEQ ID NO: 1 or a functional fragment thereof.

The protein comprising an amino acid sequence of SEQ ID NO: 1 or a functional fragment thereof may be a protein having a D-3-phosphoglycerate dehydrogenase activity.

In the present disclosure, the "D-3-phosphoglycerate dehydrogenase" is an enzyme primarily catalyzing chemical reactions below.

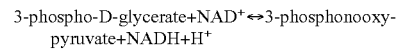

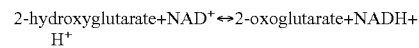

For the purpose of the present disclosure, the D-3-phosphoglycerate dehydrogenase may be SerA, and a sequence thereof may be identified from known database of the NCBI Genbank. Additionally, any other protein having an activity equivalent thereto and derived from microorganisms, which are different from the above-described microorganism producing an L-amino acid or a precursor thereof and including the protein, may also be used without limitation. Specifically, the protein may be a protein comprising an amino acid sequence of SEQ ID NO: 1 and may be interchangeably used with a protein composed of an amino acid sequence of SEQ ID NO: 1, a protein consisting of an amino acid sequence of SEQ ID NO: 1, or a protein having an amino acid sequence of SEQ ID NO: 1, without being limited thereto.

The protein may have an amino acid sequence of SEQ ID NO: 1 and/or at least 70%, 80%, 85%, 90%, 95%, 96%, 97%, 98%, or 99% homology or identity with the amino acid sequence of SEQ ID NO: 1. Additionally, it will be obvious that any accessory protein having an amino acid sequence including deletion, modification, substitution, or addition of one or several amino acids is within the scope of the present disclosure, so long as the amino acid sequence retains the above-described homology or identity and an effect equivalent to that of the protein.

In addition, any polypeptide having the D-3-phosphoglycerate dehydrogenase activity and encoded by a polynucleotide hybridized, under stringent conditions, with a probe constructed using known gene sequences, e.g., a nucleotide sequence entirely or partially complementary to a nucleotide sequence encoding the polypeptide, may also be used without limitation.

Additionally, for the purpose of the present disclosure, the protein may be derived from other microorganisms different from the above-described microorganism producing an L-amino acid or a precursor thereof and including the protein, and the protein may specifically be a protein derived from the genus *Azotobacter*, a protein identical to that derived from the genus *Azotobacter*, or any protein capable of increasing production of an L-amino acid or a precursor thereof, without limitation. More specifically, the microorganism of the genus *Azotobacter* may be *Azotobacter agilis, Azotobacter armeniacus, Azotobacter beijerinckii, Azotobacter chroococcum, Azotobacter* sp. DCU26, *Azotobacter* sp. FA8, *Azotobacter nigricans, Azotobacter paspali, Azotobacter salinestris, Azotobacter tropicalis*, or *Azotobacter vinelandii*. and in an embodiment of the present disclosure, may be one derived from *Azotobacter vinelandii*, but the microorganism is not limited thereto.

As used herein, the term "functional fragment" refers to an amino acid sequence having an effect equivalent to that of the protein, and it will be obvious that any protein having the amino acid sequence including a deletion, modification, substitution, or addition of one or several amino acids and retaining an effect equivalent to that of the protein is within the scope of the present disclosure and may be regarded as a functional fragment for the purpose of the present disclosure.

As used herein, although the expression "protein or polypeptide comprising an amino acid sequence of a particular SEQ ID NO:", "protein or polypeptide consisting of an amino acid sequence of a particular SEQ ID NO:" or "protein or polypeptide having an amino acid sequence of a particular SEQ ID NO:" is used, it is obvious that any protein having an amino acid sequence including a deletion, modification, substitution, conservative substitution, or addition of one or several amino acids may also be used in the present disclosure so long as the protein has the activity identical or equivalent to the polypeptide consisting of the amino acid sequence of the particular SEQ ID NO. For example, the protein may have an addition of a sequence to the N-terminus and/or the C-terminus of the amino acid sequence without causing changes in the functions of the protein, naturally occurring mutation, silent mutation, or conservative substitution thereof.

The term "conservative substitution" refers to a substitution of one amino acid with another amino acid having a similar structural and/or chemical property. Such amino acid substitution may generally occur based on similarity of polarity, charge, solubility, hydrophobicity, hydrophilicity, and/or amphipathic nature of a residue. For example, positively charged (basic) amino acids include arginine, lysine, and histidine; negatively charged (acidic) amino acids include glutamic acid and aspartic acid; aromatic amino acids include phenylalanine, tryptophan, and tyrosine; and hydrophobic amino acids include alanine, valine, isoleucine, leucine, methionine, phenylalanine, tyrosine, and tryptophan.

Another aspect of the present disclosure provides a polynucleotide encoding the protein comprising an amino acid sequence of SEQ ID NO: 1.

As used herein, the term "polynucleotide" has a comprehensive meaning including DNA and RNA molecules, and a nucleotide that is a basic structural unit in a polynucleotide may include not only a natural nucleotide but also an analogue in which a sugar or a base is modified (Scheit, Nucleotide Analogs, John Wiley, New York (1980); Uhlman and Peyman, Chemical Reviews, 90:543-584 (1990)).

The polynucleotide encoding the protein comprising an amino acid sequence of SEQ ID NO: 1 may have any sequence capable of encoding the protein having the D-3-phosphoglycerate dehydrogenase activity derived from *Azotobacter vinelandii*, without limitation. Alternatively, the polynucleotide may have any sequence encoding a protein having an activity of increasing production of an L-amino acid or a precursor thereof that comprises the amino acid sequence of SEQ ID NO: 1 without limitation.

The polynucleotide may be, for example, a polynucleotide encoding a polypeptide having at least 70%, 75%, 80%, 85%, 86%, 87%, 88%, 89%, 90%, 91%, 92%, 93%, 94%, 95%, 96%, 97%, 98% or 99% homology or identity with the amino acid sequence of SEQ ID NO: 1. Specifically, for example, the polynucleotide encoding the protein comprising an amino acid sequence of SEQ ID NO: 1 or an amino acid sequence having at least 70% homology or identity with the amino acid sequence of SEQ ID NO: 1 may be a polynucleotide sequence of SEQ ID NO: 95 or a polynucleotide having at least 70%, 75%, 80%, 85%, 86%, 87%, 88%, 89%, 90%, 91%, 92%, 93%, 94%, 95%, 96%, 97%, 98% or 99% sequence homology or identity with the nucleotide sequence of SEQ ID NO: 95.

In addition, it is obvious that the polynucleotide may also a polynucleotide which can be translated into a protein comprising the amino acid sequence of SEQ ID NO: 1 or an amino acid sequence having at least 70% identity with SEQ ID NO: 1 or a protein having homology or identity therewith by codon degeneracy. Alternatively, the polynucleotide may have a nucleotide sequence that can be hybridized with a probe constructed using known gene sequences, e.g., a nucleotide sequence entirely or partially complementary to the nucleotide sequence under stringent conditions to encode a protein comprising an amino acid sequence having at least 70% identity with SEQ ID NO: 1 without limitation. The term "stringent conditions" refers to conditions allowing specific hybridization between polynucleotides. Such conditions are disclosed in detail in known documents (e.g., J. Sambrook et al., Molecular Cloning, A Laboratory Manual, 2nd Edition, Cold Spring Harbor Laboratory press, Cold Spring Harbor, N.Y., 1989; F. M. Ausubel et al., Current Protocols in Molecular Biology, John Wiley & Sons, Inc., New York). For example, the stringent conditions may include conditions under which genes having a high homology or identity, e.g., at least 70%, 80%, specifically 85%, specifically 90%, more specifically 95%, more specifically 97%, or even more specifically 99% homology or identity, hybridize with each other, while genes having a homology or identity lower than those described above do not hybridize with each other; or conditions under which washing is performed once, and specifically twice or three times in ordinary washing conditions of Southern hybridization at a salt concentration and a temperature corresponding to 60° C., 1×SSC, 0.1% SDS, specifically 60° C., 0.1×SSC, 0.1% SDS, and more specifically 68° C., 0.1×SSC, 0.1% SDS. Hybridization requires that two polynucleotides have complementary sequences, although bases may mismatch due to stringent conditions of hybridization. The term "complementary" is used to describe the relationship between bases of nucleotides capable of hybridizing with each other. For example, with respect to DNA, adenosine is complementary to thymine, and cytosine is complementary to guanine. Thus, the present disclosure may include not only substantially similar polynucleotide sequences but also a polynucleotide fragment isolated thereof complementary to the entire sequence.

Specifically, the polynucleotide having homology or identity may be detected using the above-described hybridization conditions including a hybridization process using a Tm value of 55° C. Additionally, the Tm value may be 60° C., 63° C., or 65° C., but is not limited thereto, and may be appropriately adjusted by those skilled in the art according to the purpose thereof.

The "homology" and "identity" refer to a degree of relevance between two amino acid sequences or nucleotide sequences and may be expressed as a percentage.

The terms homology and identity may often be used interchangeably.

Sequence homology or identity of conserved polynucleotides or polypeptides may be determined by standard alignment algorithm and default gap penalties established by a program may be used together therewith. Substantially homologous or identical sequences may generally hybridize with each other over the entire sequence or at least about 50%, 60%, 70%, 80%, or 90% of the entire sequence under moderate or highly stringent conditions. In hybridized polynucleotides, polynucleotides including degenerated codon instead of codon may also be considered.

The homology or identity between polypeptides or polynucleotide sequences may be determined using any algorithm known in the art, e.g., BLAST (see: Karlin and Altschul, Proc. Natl. Acad. Sci. USA, 90, 5873, (1993)) or FASTA introduced by Pearson (see: Methods Enzymol., 183, 63, 1990). Based on the algorithm BLAST, programs known as BLASTN or BLASTX have been developed (see: http://www.ncbi.nlm.nih.gov). In addition, the presence of homology, similarity, or identity between amino acid or polynucleotide sequences may be confirmed by comparing these sequences by southern hybridization experiments under defined stringent conditions, and the defined stringent hybridization conditions are within the scope of the subject technology, and may be determined by a method known to one of ordinary skill in the art (for example, J. Sambrook et al., Molecular Cloning, A Laboratory Manual, 2nd Edition, Cold Spring Harbor Laboratory press, Cold Spring Harbor, N.Y., 1989; F. M. Ausubel et al., Current Protocols in Molecular Biology, John Wiley & Sons, Inc., New York).

As used herein, the term "to be expressed/being expressed" with regard to a protein means a state in which a target protein is introduced into a microorganism or, in the case where the protein is present in a microorganism, the activity of the protein is enhanced compared to its endogenous activity or its activity before modification.

Specifically, the term "introduction of a protein" refers to providing the activity of a particular protein to a microorganism, in which the protein is not originally possessed, or the activity of the protein is enhanced compared to its endogenous activity or the activity before modification. For example, the introduction of a protein may refer to introduction of a polynucleotide encoding a particular protein into chromosome or introduction of a fragment or vector including a polynucleotide encoding the particular protein into a microorganism, thereby capable of expressing the activity of the protein. The "endogenous activity" refers to an activity of a protein originally possessed by a parent strain of a microorganism before transformation when the microorganism is transformed by genetic modification caused by a natural or artificial factor.

As used herein, the term "amino acid or a precursor thereof" refers to an amino acid or a precursor which can be produced by using the protein and it may include serine, tryptophan, histidine, methionine, cysteine, L-cystathionine, L-homocysteine, O-acetylhomoserine, O-succinyl homoserine, L-homoserine, and/or O-phosphoserine, without being limited thereto. In the present disclosure, the amino acid may be an L-amino acid, specifically, L-serine, L-tryptophan, L-histidine, L-methionine, or L-cysteine but may include all L-amino acids produced by microorganisms from various carbon sources via metabolic processes. The precursor may be O-acetylhomoserine or O-succinylhomoserine, which is a precursor converted into methionine by O-acetylhomoserine sulfhydrylase (KR10-1048593); L-homoserine, L-homocysteine, or L-cystathionine, which is a methionine precursor; and acetylserine, which is a L-cystein precursor; and/or O-phosphoserine, which is a precursor converted into cysteine by O-phosphoserine sulfhydrylase, without being limited thereto. More specifically, the amino acid or a precursor thereof may be L-serine, L-tryptophan, L-histidine, L-methionine, O-phosphoserine, or L-cysteine, but is not limited thereto.

In order to enhance the biosynthesis of the L-amino acids or precursors thereof, the protein comprising an amino acid sequence of SEQ ID NO: 1 or a functional fragment thereof according to the present disclosure may be used. For example, in order to enhance the biosynthesis of L-serine, L-tryptophan, L-histidine, L-methionine L-cysteine, L-homocysteine, L-cystathionine, acetylserine, O-acetylhomoserine, O-succinylhomoserine, L-homoserine, and/or O-phosphoserine, a microorganism may be modified to express the protein comprising an amino acid sequence of SEQ ID NO: 1 or a functional fragment thereof according to the present disclosure. As a specific example, the protein comprising an amino acid sequence of SEQ ID NO: 1 may be introduced or the activity of the protein may be enhanced. Additionally, the ability to produce an L-amino acid or a precursor thereof may further be enhanced by additionally introducing or enhancing the activity of a particular protein or inactivating the activity of a particular protein.

Specifically, the microorganism may produce L-amino acids or precursors thereof by further including i) phosphoserine phosphatase having weakened activity, ii) 3-phosphoserine aminotransferase having enhanced activity, or iii) both phosphoserine phosphatase having weakened activity and 3-phosphoserine aminotransferase having enhanced activity, without being limited thereto.

The microorganism may further be modified by enhancement of trp operon, inactivation of tryptophanase (TnaA), inactivation of Mtr membrane protein (Mtr), or any combination thereof, without being limited thereto.

Specifically, the microorganism may further be modified by enhancement of the trp operon by inactivating TrpR that inhibits expression of genes (trpEDCBA) associated with biosynthesis of L-tryptophan involved in production of L-tryptophan, by inactivation of tryptophanase (TnaA) that plays a role in introducing extracellular L-tryptophan into a cell, and by inactivation of Mtr membrane protein that plays a role in decomposing intracellular L-tryptophan and water molecules into indole, pyruvate, and ammonia ($NH_3$), without being limited thereto.

Additionally, for the purpose of the present disclosure, the microorganism may further be modified by enhancing his operon, without being limited thereto.

Specifically, biosynthesis genes split into 4 operons in total may be introduced into the microorganism in a cluster form, in which the promoter was substituted, to enhance the L-histidine biosynthetic pathway, and the L-histidine biosynthesis cluster is split into 4 operons (hisE-hisG, hisA-impA-hisF-hisI, hisD-hisC-hisB, and cg0911-hisN) in total. The his operon may be enhanced by using a vector that can simultaneously introduce the biosynthesis genes into the microorganism, without being limited thereto.

Additionally, for the purpose of the present disclosure, the microorganism may further be modified by inactivation of transcriptional regulator (McbR), enhancement of methionine synthase (meth), enhancement of sulfite reductase [NADPH] hemoprotein beta-component (cysI), or any combination thereof, without being limited thereto.

Specifically, the microorganism may further be modified by inactivating McbR, that is a methionine/cysteine transcriptional regulator, enhancing methionine synthase (Meth), enhancing sulfite reductase [NADPH] hemoprotein beta-component, or any combination thereof, without being limited thereto.

The introduction, enhancement, and inactivation of the activity of a particular protein and/or gene may be performed using any appropriate method known in the art.

As used herein, the term "enhancement" of activity of a protein means that the activity of the protein is introduced or increased when compared with its endogenous activity. The "introduction" of the activity means that a microorganism acquires activity of a particular polypeptide which has not been naturally or artificially possessed by the microorganism.

As used herein, the term "increase" in the activity of a protein relative to its endogenous activity means that the activity of the protein included in the microorganism is enhanced compared to the endogenous activity of the protein or the activity before modification. The term "endogenous activity" refers to activity of a protein originally possessed by a parent strain of a microorganism or a non-modified microorganism before transformation when the microorganism is transformed by genetic modification caused by a natural or artificial factor. The endogenous activity may also be interchangeably used with activity before modification. The increase in the activity may include both introduction of a foreign protein and enhancement of the endogenous activity of the protein. The increase/enhancement in the activity of the protein may be achieved by increase/enhancement of gene expression.

Specifically, the increase in the activity of a protein according to the present disclosure may be achieved by one of the following methods without being limited thereto:
(1) a method of increasing the copy number of a polynucleotide encoding the protein,
(2) a method of modifying an expression control sequence to increase expression of the polynucleotide,
(3) a method of modifying a polynucleotide sequence on a chromosome to enhance the activity of the protein,
(4) a method of introducing a foreign polynucleotide having the activity of the protein or a codon optimized modification polynucleotide having the activity of the protein, or
(5) a method of enhancing the activity by any combination thereof.

The method of increasing the copy number of a polynucleotide described in (1) above is not particularly limited, but may be performed in a form operably linked to a vector or in an integrated form into a chromosome of a host cell. Specifically, this method may be performed by introducing a vector, which replicates and functions irrespective of a host and is operably linked to a polynucleotide encoding the protein of the present disclosure, into a host cell; or by introducing a vector, which inserts the polynucleotide into the chromosome of the host cell and is operably linked to the polynucleotide, into a host cell, thereby increasing the copy number of the polynucleotide in the chromosome of the host cell.

Next, the method of modifying the expression control sequence to increase the expression of the polynucleotide described in (2) above may be performed by inducing a modification in the nucleotide acid sequence by deletion, insertion, non-conservative substitution, conservative substitution, or any combination thereof to further enhance the activity of the expression control sequence, or by replacing the nucleotide sequence with a nucleotide sequence having a stronger activity, without being limited thereto. The expression control sequence may include a promoter, an operator sequence, a ribosome-binding site encoding sequence, and a sequence for regulating the termination of transcription and translation, without being limited thereto.

A strong heterologous promoter instead of the intrinsic promoter may be linked upstream of the polynucleotide expression unit, and examples of the strong promoter may include CJ1 to CJ7 promoters (Korean Patent No. 0620092 and International Publication No. WO2006/065095), a lysCP1 promoter (International Publication No. WO2009/096689), an EF-Tu promoter, a groEL promoter, an aceA promoter, an aceB promoter, a lac promoter, a trp promoter, a trc promoter, a tac promoter, a lambda phage PR promoter, a $P_L$ promoter, a tet promoter, a gapA promoter, a SPL1, SPL7, or SPL13 promoter (Korean Patent No. 10-1783170), or an O2 promoter (Korean Patent No. 10-1632642), without being limited thereto. In addition, the method of modifying the polynucleotide sequence on the chromosome described in (3) above may be performed by inducing a variation in the expression control sequence by deletion, insertion, non-conservative substitution, conservative substitution, or any combination thereof to further enhance the activity of the polynucleotide sequence, or by replacing the nucleotide sequence with a nucleotide sequence modified to have a stronger activity, without being limited thereto In addition, the method of introducing the foreign polynucleotide sequence described in (4) above may be performed by introducing a foreign polynucleotide encoding a protein having an activity identical/similar to that of the protein, or a codon optimized variant polynucleotide thereof into the host cell. The foreign polynucleotide may be any polynucleotide having an activity identical/similar to that of the protein without limitation. In addition, an optimized codon thereof may be introduced into the host cell to perform optimized transcription and translation of the introduced foreign polynucleotide in the host cell. The introduction may be performed by any known transformation method suitably selected by those of ordinary skill in the art. When the introduced polynucleotide is expressed in the host cell, the protein is produced and the activity thereof may be increased.

Finally, the method of enhancing the activity by any combination of the methods (1) to (4) described in (5) above may be performed by combining at least one of the methods of increasing the copy number of the polynucleotide encoding the protein, modifying the expression control sequence to increase expression thereof, modifying the polynucleotide sequence on the chromosome, introducing the foreign polynucleotide having the activity of the protein or a codon optimized variant polynucleotide thereof.

As used herein, the term "weakening" of the activity of a protein is a concept that includes both reduction and elimination of the activity compared to endogenous activity.

The weakening of the activity of a protein may be achieved by a variety of methods well known in the art. Examples of the method may include: a method of deleting a part of or the entire gene encoding the protein on the chromosome, including the case when the activity is eliminated; a method of substituting the gene encoding the protein on the chromosome with a gene mutated to reduce the activity of the protein; a method of introducing a mutation into an expression control sequence of the gene encoding the protein on the chromosome; substituting the expression control sequence of a gene encoding the protein with a sequence having weaker or no activity (e.g., replacing an endogenous promoter of the gene with a weaker promoter); a method of deleting a part of or the entire gene encoding the protein on the chromosome; a method of introducing an antisense oligonucleotide (e.g., antisense RNA) which binds complementarily to a transcript of the gene on the chromosome to inhibit the translation from the mRNA into the protein; a method of artificially adding a sequence complementary to the SD sequence to the upstream of the SD sequence of the gene encoding the protein to form a secondary structure, thereby inhibiting the binding of ribosome thereto, and a method of incorporating a promoter to the 3' terminus of the open reading frame (ORF) to induce a reverse transcription (reverse transcription engineering (RTE)), or any combination thereof, but are not limited thereto.

Specifically, the method of deleting a part of or the entire gene encoding the protein may be performed by replacing a polynucleotide encoding an endogenous target protein within the chromosome with a polynucleotide or marker gene having a partial deletion in the nucleic acid sequence using a vector for chromosomal insertion into a microorganism. For example, a method of deleting a part of or the entire gene by homologous recombination may be used, without being limited thereto. In addition, the term "part", although it may vary according to type of the polynucleotide and may be appropriately determined by one of ordinary skill in the art, refers to 1 nucleotide to 300 nucleotides, specifically, 1 nucleotide to 100 nucleotides, and more specifically, 1 nucleotide to 50 nucleotides, without being limited thereto.

Additionally, the method of modifying the expression control sequence may be performed by inducing a modification in the expression control sequence via deletion, insertion, conservative substation, or non-conservative substitution, or any combination thereof to further weaken the activity of the expression control sequence or performed by substituting the expression control sequence with a nucleic acid sequence having weaker activity. The expression control sequence may include a promoter, an operator sequence, a sequence encoding a ribosome-binding site, and a sequence for regulating termination of transcription and translation, without being limited thereto.

In addition, the method of modifying the sequence of a gene on the chromosome may be performed by inducing a modification via deletion, insertion, conservative substation, or non-conservative substitution, or any combination thereof to further weaken the activity of the protein in the sequence or performed by substituting the sequence of the gene with a sequence of a gene modified to have weaker or no activity, but is not limited thereto.

As used herein, the expression "microorganism producing an L-amino acid or a precursor thereof" refers to a microorganism capable of producing an L-amino acid or a precursor thereof in large amounts from carbon sources contained in a culture medium compared with wild-type or non-modified microorganisms. Additionally, the microorganism may refer to a microorganism naturally having the ability to produce an L-amino acid or a precursor thereof or a microorganism prepared by providing the ability to produce an L-amino acid or a precursor thereof to a parent strain of a microorganism which is unable to produce the L-amino acid or a precursor thereof. Specifically, the microorganism may be a microorganism which is modified to express a protein comprising the amino acid sequence of SEQ ID NO: 1 or a functional fragment thereof for producing the L-amino acid or a precursor thereof, but is not limited thereto.

Additionally, the "microorganism producing an L-amino acid or a precursor thereof" includes both wild-type microorganisms and microorganisms in which natural or artificial genetic modification has occurred, such as microorganisms in which a particular mechanism is weakened or enhanced via introduction of an exogenous gene, enhancement or inactivation of an endogenous gene, etc., and in which genetic modification has occurred or the activity has been enhanced in order to produce a target L-amino acid or a precursor thereof. Specifically, the types of the microorganism are not particularly limited, as long as the microorganism is able to produce an L-amino acid or a precursor thereof, but the microorganism may belong to the genus *Enterobacter*, the genus *Escherichia*, the genus *Erwinia*, the genus *Serratia*, the genus *Providencia*, the genus *Corynebacterium*, or the genus *Brevibacterium*. More specifically, the microorganism may be any microorganism belonging to the genus *Corynebacterium* or the genus *Escherichia*. The microorganism of the genus *Corynebacterium* may be *Corynebacterium glutamicum*, *Corynebacterium ammoniagenes*, *Brevibacterium lactofermentum*, *Brevibacterium flavum*, *Corynebacterium thermoaminogenes*, *Corynebacterium efficiens*, *Corynebacterium stationis*, or the like, but is not limited thereto. More specifically, the microorganism of the genus *Escherichia* may be *Escherichia coli*, and the microorganism of the genus *Corynebacterium* may be *Corynebacterium glutamicum*, without being limited thereto.

For the purpose of the present disclosure, the microorganism may be any microorganism including the protein and is thus capable of producing an L-amino acid and a precursor thereof.

As used herein, the expression of "microorganism capable of producing an L-amino acid or a precursor thereof" may be used interchangeably with the expressions of "microorganism producing an L-amino acid or a precursor thereof" and "microorganism having the ability to produce an L-amino acid or a precursor thereof".

Another aspect of the present disclosure provides a composition for producing an L-amino acid or a precursor thereof, in which the composition comprises a microorganism modified to express a protein comprising an amino acid sequence of SEQ ID NO: 1 or a functional fragment thereof, or the protein.

The composition for producing an L-amino acid or a precursor thereof refers to a composition capable of producing an L-amino acid or a precursor thereof by the protein according to the present disclosure. The composition may comprise the protein, a functional fragment thereof, or any components used to operate the protein, without limitation.

Another aspect of the present disclosure provides a method of producing an L-amino acid or a precursor thereof, in which the method comprises culturing the microorganism in a culture medium.

The method may further include recovering an L-amino acid or a precursor thereof from the cultured medium or culture thereof.

In the above method, the culturing of the microorganism may be performed by, but is not limited to, batch culture, continuous culture, fed-batch, or the like known in the art. In this regard, culture conditions are not particularly limited, but an optimal pH (e.g., pH 5 to 9, specifically pH 6 to 8, and most specifically pH 6.8) may be maintained by using a basic compound (e.g., sodium hydroxide, potassium hydroxide, or ammonia) or an acidic compound (e.g., phosphoric acid or sulfuric acid). Additionally, an aerobic condition may be maintained by adding oxygen or an oxygen-containing gas mixture to the culture. A culturing temperature may be maintained at 20° C. to 45° C., specifically 25° C. to 40° C., and the culturing may be performed for about 10 hours to about 160 hours, without being limited thereto. The amino acid produced during the culturing may be released into the culture medium or remain in the cells.

Examples of a carbon source to be contained in the culture medium may include saccharides and carbohydrates (e.g., glucose, sucrose, lactose, fructose, maltose, molasse, starch, and cellulose), oils and fats (e.g., soybean oil, sunflower oil, peanut oil, and coconut oil), fatty acids (e.g., palmitic acid, stearic acid, and linoleic acid), alcohols (e.g., glycerol and ethanol), and organic acids (acetic acid), which may be used alone or in combination, etc., but are not limited thereto. Examples of a nitrogen source to be contained in the culture medium may be a nitrogen-containing organic compound (e.g., peptone, yeast extract, gravy, malt extract, corn steep liquor, soybean flour, and urea), an inorganic compound (e.g., ammonium sulfate, ammonium chloride, ammonium phosphate, ammonium carbonate, and ammonium nitrate) which may be used alone or in combination, etc., but are not limited thereto. As a phosphorous source, potassium dihydrogen phosphate, dipotassium hydrogen phosphate, and sodium-containing salts corresponding thereto may be used alone or in combination without being limited thereto. In addition, the culture medium may include essential growth-promoting materials such as a metal salt (e.g., magnesium sulfate and iron sulfate), amino acids, and vitamins, but are not limited thereto.

The amino acid produced in the above-described culturing step of the present disclosure may be recovered by collecting a target amino acid from the culture solution using any known method selected according to the culturing method. For example, centrifugation, filtration, anion exchange chromatography, crystallization, and high-performance liquid chromatography (HPLC) may be used, and the target amino acid may be recovered from the culture medium or the microorganism using any appropriate method in the art, without being limited thereto.

Additionally, the recovering step may include a purification process which may be performed using an appropriate method well known in the art. Thus, the recovered amino acid may be a purified amino acid or a fermentation broth of a microorganism including an amino acid (Introduction to Biotechnology and Genetic Engineering, A. J. Nair., 2008).

In addition, for the purpose of the present disclosure, in the case of the microorganism modified to express D-3-phosphoglycerate dehydrogenase derived from the genus *Azotobacter*, the yields of L-amino acids and precursors thereof including serine, tryptophan, histidine, methionine, and O-phosphoserine increase. It is important that the modified microorganism increases the yields of L-amino acids and precursors thereof, while wild-type strains of the genus *Corynebacterium* are unable to or able to produce L-amino acids or precursors thereof in a very small amount.

Still another aspect of the present disclosure provides a method of producing an L-amino acid or a precursor thereof using the composition, which comprises a microorganism modified to express a protein comprising an amino acid sequence of SEQ ID NO: 1 or a functional fragment thereof, or the protein.

The microorganism modified to express the protein comprising an amino acid sequence of SEQ ID NO: 1 or a functional fragment thereof and the microorganism including the same are as described above.

Still another aspect of the present disclosure provides use of a protein comprising an amino acid sequence of SEQ ID NO: 1 or a functional fragment thereof for increasing production of L-amino acid or a precursor thereof.

SEQ ID NO: 1 or the functional fragment thereof, an L-amino acid, and a precursor thereof are as described above.

MODE OF DISCLOSURE

Hereinafter, the present disclosure will be described in more detail with reference to the following examples. However, these examples are for illustrative purposes only and are not intended to limit the scope of the present disclosure. Meanwhile, technical matters not described in this specification can be sufficiently understood and easily performed by those skilled in the art in the technical field of the present application or a similar technical field thereof.

Example 1: Preparation of *Azotobacter*-Derived D-3-Phosphoglycerate Dehydrogenase (serA(Avn))-Overexpressing Vector In order to identify whether the ability to produce serine and OPS is improved by enhancing *Azotobacter vinelandii*- derived D-3-phosphoglycerate dehydrogenase (hereinafter, referred to as 'SerA(Avn)'), an expression vector was prepared.

A pCL1920 vector (GenBank No. AB236930) was used to express serA(Avn) gene (SEQ ID NO:1) encoding SerA (Avn), and a trc promoter (Ptrc) was used as an expression promotor, thereby constructing a vector in the form of pCL-Ptrc-serA(Avn).

As a control, a vector including D-3-phosphoglycerate dehydrogenase derived from E. coli, in which the feedback inhibition on serine is released, was prepared and named pCL-Ptrc-serA*(G336V). Sequences of the primers used to prepare the vectors are shown in Table 1 below.

TABLE 1

| Gene | Primer (5'->3') | SEQ ID NO | Vector |
|---|---|---|---|
| Ptrc | AGGTCGACTCTAGAGGATCCCCCGC TTGCTGCAACTCTCT | 2 | pCL-Ptrc-serA(Avn), |
|  | GATATCTTTCCTGTGTGA | 3 | pCL-Ptrc-serA* (G336V) |
| serA (Avn) | AATTTCACACAGGAAAGATATCATGA GTAAGACCTCCCTG | 4 | pCL-Ptrc-serA(Avn) |
|  | GTGAATTCGAGCTCGGTACCCTCAG AACAGAACCCGTGAG | 5 |  |
| serA* (G336V) | AATTTCACACAGGAAAGATATCATGG CAAAGGTATCGCTG | 6 | pCL-Ptrc-serA* (G336V) |
|  | GTGAATTCGAGCTCGGTACCCTTAGT ACAGCAGACGGGCG | 7 |  |

PCR for Ptrc, which was used in preparation of both vectors, was performed using primers of SEQ ID NOS: 2 and 3. Specifically, PCR for foreign serA(Avn) was performed using primers of SEQ ID NOS: 4 and 5 and PCR for serA*(G336V) was performed using primers of SEQ ID NOS: 6 and 7. Amplified Ptrc and serA(Avn) and serA* (G336V) fragments of the respective genes were cloned into the pCL1920 vector treated with restriction enzyme SmaI by Gibson assembly, respectively, thereby constructing pCL-Ptrc-serA(Avn) and pCL-Ptrc-serA*(G336V).

Example 2: Preparation of Strain by Introducing Azotobacter-Derived serA(Avn) into Wild-Type E. coli and Evaluation of Serine-Producing Ability By using wild-type E. coli strain W3110 as a platform strain, strains were prepared by introducing each of the two types of plasmids prepared in Example 1 into the W3110 strain, and then serine-producing abilities of these strains were evaluated.

Each of the strains was plated on an LB solid medium and cultured overnight in an incubator at 33° C. The strain, which was cultured overnight in the LB solid medium, was inoculated into a 25-mL titer medium as shown in Table 2 below and cultured in an incubator at 34.5° C. at 200 rpm for 40 hours. The results are shown in Table 3 below.

TABLE 2

| Composition | Concentration (/L) |
|---|---|
| Glucose | 40 g |
| $KH_2PO_4$ | 4 g |
| $(NH_4)_2SO_4$ | 17 g |
| $MgSO_4 \cdot 7H_2O$ | 1 g |
| $FeSO_4 \cdot 7H_2O$ | 10 mg |
| $MnSO_4 \cdot 4H_2O$ | 10 mg |
| Yeast extract | 2 g |
| Calcium carbonate | 30 g |
| pH | 6.8 |

TABLE 3

| Strain | OD562 nm | Glucose consumption (g/L) | L-serine (g/L) |
|---|---|---|---|
| E. coli W3110 | 19.5 | 40.0 | 0.05 |
| W3110/pCL-Ptrc-serA*(G336V) | 18.2 | 38.2 | 0.08 |
| W3110/pCL-Ptrc-serA(Avn) | 18.1 | 37.6 | 0.13 |

As shown in Table 3, the W3110/pCL-Ptrc-serA* (G336V) strain, in which the feedback inhibition on serine is released and serA activity is enhanced, showed an increase in serine production by 60% compared to the wild-type strain. In comparison, it was confirmed that the W3110/pCL-Ptrc-serA(Avn) strain including Azotobacter-derived serA (Avn) showed an increase in serine production by 160% compared to the wild-type strain W3110, and also showed an increase by 62.5% compared to the strain W3110/pCL-Ptrc-serA*(G336V).

Example 3: Preparation of Strain in which serB Activity is Weakened and Introduced with Foreign Azotobacter-Derived serA(Avn) and Evaluation of OPS-Producing Ability of the Strain An O-phosphoserine (OPS)-producing microorganism was prepared by weakening endogenous phosphoserine phosphatase (SerB) in wild-type E. coli strain W3110 (also named 'CA07-0012', accession number: KCCM11212P, disclosed in Korean Patent No. 10-1381048 and US Patent Application Publication No. 2012-0190081).

Each of the two types of plasmids prepared in Example 1 was introduced into CA07-0012, and OPS-producing ability of the prepared strains was evaluated.

Each of the strains was plated on an LB solid medium and cultured overnight in an incubator at 33° C. The strain, which was cultured overnight in the LB solid medium, was inoculated into a 25 mL titer medium as shown in Table 4 below and cultured in an incubator at 34.5° C. at 200 rpm for 40 hours. The results are shown in Table 5 below.

TABLE 4

| Composition | Concentration (/L) |
|---|---|
| Glucose | 40 g |
| KH$_2$PO$_4$ | 4 g |
| (NH$_4$)$_2$SO$_4$ | 17 g |
| MgSO$_4$•7H$_2$O | 1 g |
| FeSO$_4$•7H$_2$O | 10 mg |
| MnSO$_4$•4H$_2$O | 10 mg |
| L-glycine | 2.5 g |
| Yeast extract | 2 g |
| Calcium carbonate | 30 g |
| pH | 6.8 |

TABLE 5

| Strain | OD562 nm | Glucose consumption (g/L) | O-phosphoserine (g/L) |
|---|---|---|---|
| CA07-0012 | 21.1 | 40.0 | 1.4 |
| CA07-0012/pCL-Ptrc-serA*(G336V) | 20.5 | 38.6 | 2.2 |
| CA07-0012/pCL-Ptrc-serA(Avn) | 20.0 | 37.8 | 2.9 |

As shown in Table 5 above, the CA07-0012/pCL-Ptrc-serA*(G336V), in which the feedback inhibition on serine is released and serA activity is enhanced, showed an increase in OPS production by 57% compared to the wild-type strain. It was confirmed that the CA07-0012/pGL-Ptrc-serA(Avn) strain including the Azotobacter-derived serA(Avn) showed an increase in OPS production by 107% compared to the wild-type strain, and also showed an increase by 32% compared to the CA07-0012/pGL-Ptrc-serA*(G336V) strain.

Example 4: Preparation of Vector for Co-Overexpression of Azotobacter-Derived serA(Avn) and E. coli-Derived serC In order to identify whether the abilities to produce serine and OPS were further improved by introducing serA(Avn) into a strain, in which E. Co/i-derived 3-phosphoserine aminotransferase (serC) was overexpressed, a vector in the form of pCL-Ptrc-serA(Avn)-(RBS)serC for expressing serA(Avn) and serC as operons was prepared.

As a positive control thereof, pCL-Ptrc-serA*(G336V)-(RBS)serC vector was constructed to prepare a microorganism co-expressing serA*(G336V) and serC derived from E. coli. Sequences of primers used to prepare the vectors are shown in Table 6 below.

TABLE 6

| Gene | Sequence (5'->3') | SEQ ID NO | Vector |
|---|---|---|---|
| Ptrc_serA) (Avn) | CCTCACCA CGTTGCGT CTCGAGTC AGAACAGA ACCCGTGA | 8 | pCL-Ptrc-serA(Avn)-(RBS)serC |

TABLE 6-continued

| Gene | Sequence (5'->3') | SEQ ID NO | Vector |
|---|---|---|---|
| (RBS)serC | CTCGAGAC GCAACGTG GTGA | 9 | pCL-Ptrc-serA(Avn)-(RBS)serC, |
|  | AGTGAATT CGAGCTCG GTACCCTT AACCGTGA CGGCGTTC | 10 | pCL-Ptrc-serA*(G336V)-(RBS)serC |
| Ptrc_serA* (G336V) | CTCACCAC GTTGCGTC TCGAGTTA GTACAGCA GACGGGCG | 11 | pCL-Ptrc-serA*(G336V)-(RBS)serC |

PCR for Ptrc_serA(Avn) was performed using the pCL-Ptrc-serA(Avn) prepared in Example 1, as a template, and primers of SEQ ID NOS: 2 and 8, and PCR for Ptrc serA*(G336V) was performed using the pCL-Ptrc-serA*(G336V), as a template, and primers of SEQ ID NOS: 2 and 11. E. coli-derived (RBS)serC, used in both vectors, was obtained via PCR performed using genomic DNA of w3110, as a template, and primers of SEQ ID NOS: 9 and 10.

Amplified Ptrc_serA(Avn) and (RBS)serC fragments and Ptrc_serA*(G336V) and (RBS)serC fragments were cloned with the pCL1920 vector treated with SmaI restriction enzyme by Gibson assembly (DG Gibson et al., NATURE METHODS, VOL. 6, NO. 5, May 2009, NEBuilder HiFi DNA Assembly Master Mix), respectively, thereby constructing pCL-Ptrc-serA(Avn)-(RBS)serC and pCL-Ptrc-serA*(G336V)-(RBS)serC.

Example 5: Preparation of Strain in which serC Activity is Enhanced and Introduced with Azotobacter-Derived serA(Avn) Azotobacter-Derived serA(Avn) and Evaluation of Serine-Producing Ability of the Strain In order to evaluate the serine-producing ability when Azotobacter-derived serA(Avn) was introduced into a strain in which serC was overexpressed, the two types of plasmids prepared in Example 4 were introduced into W3110, respectively.

Each of the strains was plated on an LB solid medium and cultured overnight in an incubator at 33° C. The strain, which was cultured overnight in the LB solid medium, was inoculated into a 25 mL titer medium as shown in Table 7 below, and cultured in an incubator at 34.5° C. at 200 rpm for 40 hours. The results are shown in Table 8 below.

TABLE 7

| Composition | Concentration (/L) |
|---|---|
| Glucose | 40 g |
| KH$_2$PO$_4$ | 4 g |
| (NH4)$_2$SO$_4$ | 17 g |
| MgSO$_4$•7H$_2$O | 1 g |
| FeSO$_4$•7H$_2$O | 10 mg |
| MnSO$_4$•4H$_2$O | 10 mg |
| Yeast extract | 2 g |
| Calcium carbonate | 30 g |
| pH | 6.8 |

TABLE 8

| Strain | OD562 nm | Glucose consumption (g/L) | L-serine (g/L) |
|---|---|---|---|
| E. coli w3110 | 19.5 | 40.0 | 0.05 |
| w3110/pCL-Ptrc-serA*(G336V)-(RBS)serC | 19.0 | 39.2 | 0.21 |
| w3110/pCL-Ptrc-serA(Avn)-(RBS)serC | 18.1 | 38.1 | 0.29 |

As shown in Table 8 above, it was confirmed that the w3110/pCL-Ptrc-serA(Avn)-(RBS)serC strain including Azotobacter-derived serA(Avn) showed an increase in L-serine production compared to the w3110/pCL-Ptrc-serA*(G336V)-(RBS)serC strain including serA*(G336V). That is, it was confirmed that the L-serine-producing ability was further increased by including the Azotobacter-derived serA(Avn) in the strain in which the L-serine-producing ability was increased.

The w3110/pCL-Ptrc-serA(Avn)-(RBS)serC strain was named CA07-4383 and deposited at the Korean Culture Center of Microorganisms (KCCM) under the Budapest Treaty and designated Accession No. of KCCM12381P on Nov. 9, 2018.

Example 6: Preparation of Strain in which serB Activity is Weakened, serC Activity is Enhanced, and Azotobacter-Derived serA(Avn) is Introduced and Evaluation of OPS-Producing Ability of the Strain In order to evaluate the serine-producing ability in the case where Azotobacter-derived serA(Avn) was introduced into a strain in which the serB activity was weakened and the serC was overexpressed, the two types of plasmids prepared in Example 4 were introduced into CA07-0012, respectively, and the OPS-producing ability of these strains was evaluated.

Each of the strains was plated on an LB solid medium and cultured overnight in an incubator at 33° C. The strain, which was cultured overnight in the LB solid medium, was inoculated into a 25 mL titer medium as shown in Table 9 below, and cultured in an incubator at 34.5° C. at 200 rpm for 40 hours. The results are shown in Table 10 below.

TABLE 9

| Composition | Concentration (/L) |
|---|---|
| Glucose | 40 g |
| KH$_2$PO$_4$ | 4 g |
| (NH4)$_2$SO$_4$ | 17 g |
| MgSO$_4$•7H$_2$O | 1 g |
| FeSO$_4$•7H$_2$O | 10 mg |
| MnSO$_4$•4H$_2$O | 10 mg |
| L-glycine | 2.5 g |
| Yeast extract | 2 g |
| Calcium carbonate | 30 g |
| pH | 6.8 |

TABLE 10

| Strain | OD562 nm | Glucose consumption (g/L) | O-phosphoserine (g/L) |
|---|---|---|---|
| CA07-0012 | 21.1 | 40.0 | 1.4 |
| CA07-0012/pCL-Ptrc-serA*(G336V)-(RBS)serC | 20.5 | 38.3 | 2.5 |
| CA07-0012/pCL-Ptrc-serA(Avn)-(RBS)serC | 19.8 | 37.5 | 3.3 |

As shown in Table 10 above, it was confirmed that the CA07-0012/pCL-Ptrc-serA(Avn)-(RBS)serC strain including Azotobacter-derived serA(Avn) had higher OPS production than the CA07-0012/pCL-Ptrc-serA*(G336V)-(RBS)serC strain including serA*(G336V). That is, it was confirmed that the OPS-producing ability was further increased by including the Azotobacter-derived serA(Avn) in the strain in which the OPS-producing ability was increased.

Example 7: Preparation of Strain of the Genus Escherichia Introduced with Azotobacter-Derived serA(Avn) and Evaluation of Tryptophan-Producing Ability of the Strain Example 7-1: Preparation of Microorganism of the Genus Escherichia Producing L-Tryptophan An L-tryptophan-producing strain of the genus Escherichia was developed from the wild-type E. coli W3110. In order to identify whether L-tryptophan production significantly increases by modification to express a protein having the activity of exporting L-tryptophan, a strain prepared to produce L-tryptophan was used as a parent strain. Specifically, the expression of L-tryptophan biosynthesis genes (trpEDCBA), which are involved in the production of L-tryptophan from chorismate, is inhibited by TrpR. Thus, trpR gene encoding TrpR was removed. In addition, in order to release the feedback inhibition of TrpE polypeptide in accordance with increased production of L-tryptophan, proline, the 21$^{st}$ amino acid from the N-terminus of TrpE, was substituted with serine (J. Biochem. Mol. Biol. 32, 20-24 (1999)).

Mtr membrane protein plays a role in transporting extracellular L-tryptophan into a cell, and TnaA protein plays a role in degrading intracellular L-tryptophan and water molecules into indole, pyruvate, and ammonia (NH$_3$). Thus, the mtr and tnaA genes which inhibit L-tryptophan production and degrade L-tryptophan were removed.

For the removal of these genes, the λ-red recombination method (One-step inactivation of chromosomal genes in Escherichia coli K-12 using PCR products, Datsenko K A, Wanner B L., Proc Natl Acad Sci USA. 2000 Jun. 6; 97(12):6640-5) was used. To remove the mtr gene, PCR was performed using pKD4 vector, as a template, and primers of SEQ ID NOS: 12 and 13 to prepare a gene fragment (1,580 bp) in which an FRT-kanamycin-FRT cassette and a homologous base pair of 50 bp flanking the mtr gene, where chromosomal homologous recombination occurs therebetween, are bound. A kanamycin antibiotic marker of the pKD4 vector was used for confirmation of removal of a target gene and insertion of an antibiotic gene, and the FRT region plays a role in removing the antibiotic marker after the removal of the target gene. Solg™TM Pfu-X DNA polymerase was used as a polymerase, and the PCR was performed under the following amplification conditions: denaturation at 95° C. for 2 minutes; 27 cycles of denaturation at 95° C. for 20 seconds, annealing at 62° C. for 40 seconds, and polymerization at 72° C. for 1 minute; and polymerization at 72° C. for 5 minutes.

TABLE 11

| SEQ ID NO | Primer | Sequence (5'-3') |
|---|---|---|
| 12 | ΔMtr cassette - 1 | TGCAATGCATAACAAC GCAGTCGCACTATTTT TCACTGGAGAGAAGCC CTGTGTAGGCTGGAGC TGCTTC |
| 13 | ΔMtr cassette - 2 | TGCAATGCATAACAAC GCAGTCGCACTATTTT TCACTGGAGAGAAGCC CTGTCCATATGAATAT CCTCCT |

The *E. coli* strain W3110 was transformed with the pKD46 vector which expresses A-red recombinase (gam, bet, and exo) by electroporation and plated on an LB solid medium containing 50 mg/L kanamycin. In the *E. coli* strain W3110, which was confirmed to have been transformed with the pKD46 vector, expression of a recombinant enzyme was induced by adding 10 mM L-arabinose thereto when the OD600 reached about 0.1 at 30° C. When the OD600 reached about 0.6, the strain was prepared as competent cells and transformed by electroporation with the linear gene fragment obtained in the above process, in which the FRT-kanamycin-FRT cassette and the homologous base pair of 50 bp flanking the mtr gene were bound. For colonies grown on an LB solid medium containing 25 mg/L kanamycin, colony PCR was performed using primers of SEQ ID NOS: 14 and 15 and the colonies where a 782-bp gene fragment was prepared were selected.

TABLE 12

| SEQ ID NO | Primer | Sequence (5'->3') |
|---|---|---|
| 14 | Confirm_Cassette - 1 | GGGCAGGATC TCCTGTCATC |
| 15 | Confirm_ΔMtr - 2 | AAATGTCGGA TAAGGCACCG |

The strain from which the mtr gene was removed by homologous recombination was prepared as competent cells to remove the kanamycin antibiotic marker and then transformed with the pCP20 vector by electroporation. The pCP20 vector to recognize the FRT sites flanking the kanamycin antibiotic and bind thereto on the chromosome by expressing the FLP protein, thereby removing the antibiotic marker between the FRT sites. The strain transformed with the pCP20 vector and grown on the LB solid medium containing 100 mg/L ampicillin and 25 mg/L chloramphenicol was cultured in an LB liquid medium at 30° C. for 1 hour, further cultured at 42° C. for 15 hours, and plated on an LB solid medium. The grown colonies were cultured in a LB solid medium containing 100 mg/L ampicillin and 25 mg/L chloramphenicol, an LB solid medium containing 12.5 mg/L kanamycin, and an LB solid medium containing no antibiotic. Only the colonies grown in the LB solid medium containing no antibiotic were selected. The removal of the mtr gene was finally confirmed by genome sequencing and the strain was named CA04-9300.

Genetic manipulation was performed by the method as described above to remove the tnaA gene. PCR was performed using the pKD4 vector, as a template, and primers of SEQ ID NOS: 16 and 17 to prepare a gene fragment (1,580 bp) in which an FRT-kanamycin-FRT cassette and a homologous base pair of 50 bp flanking the tnaA gene where chromosomal homologous recombination occurs are bound. Solg™ Pfu-X DNA polymerase was used as a polymerase, and the PCR was performed under the following amplification conditions: denaturation at 95° C. for 2 minutes; 27 cycles of denaturation at 95° C. for 20 seconds, annealing at 62° C. for 40 seconds, and polymerization at 72° C. for 1 minute; and polymerization at 72° C. for 5 minutes.

TABLE 13

| SEQ ID NO: | Primer | Sequence (5'->3') |
|---|---|---|
| 16 | ΔtnaA cassette - 1 | TGTAATATTCACAGGGA TCACTGTAATTAAAATA AATGAAGGATTATGTAG TGTAGGCTGGAGCTGCT TC |
| 17 | ΔtnaA cassette - 2 | TGTAGGGTAAGAGAGTG GCTAACATCCTTATAGC CACTCTGTAGTATTAAG TCCATATGAATATCCTC CT |
| 18 | Confirm_ΔtnaA - 2 | ACATCCTTATAGCCACT CTG |

Transformation with the pKD46 vector was confirmed, and the CA04-9300 strain in which recombinases were expressed by adding 10 mM L-arabinose was transformed by electroporation with the linear gene fragment in which the FRT-kanamycin-FRT cassette and the homologous base pair of 50 bp flanking the tnaA gene were bound. For colonies grown on an LB solid medium containing 25 mg/L kanamycin, colony PCR was performed using primers of SEQ ID NOS: 14 and 18 and colonies where a 787-bp gene fragment was prepared were selected.

The strain from which the tnaA gene was removed by homologous recombination was prepared as competent cells and transformed with the pCP20 vector to remove the kanamycin antibiotic marker, and a strain from which the kanamycin antibiotic marker was removed was prepared by the expression of the FLP protein. The removal of the tnaA gene was finally confirmed by genome sequencing and the strain was named CA04-9301.

To remove the trpR gene, PCR was performed using the pKD4 vector, as a template, and primers of SEQ ID NOS: 19 and 20 to prepare a gene fragment (1,580 bp) in which the FRT-kanamycin-FRT cassette and a homologous pair of 50 bp flanking the trpR gene where chromosomal homologous recombination occurs were bound. Solg™ Pfu-X DNA polymerase was used as a polymerase, and the PCR was performed under the following amplification conditions: denaturation at 95° C. for 2 minutes; 27 cycles of denaturation at 95° C. for 20 seconds, annealing at 62° C. for 40 seconds, and polymerization at 72° C. for 1 minute; and polymerization at 72° C. for 5 minutes.

TABLE 14

| SEQ ID NO | Primer | Sequence (5'->3') |
|---|---|---|
| 19 | ΔtrpR cassette - 1 | TACAACCGGGGGAGGCATTTTGCTTCCCCCGCTAACAATGGCGACATATTGTGTAGGCTGGAGCTGCTTC |
| 20 | ΔtrpR cassette - 2 | GCATTCGGTGCACGATGCCTGATGCGCCACGTCTTATCAGGCCTACAAAGTCCATATGAATATCCTCCT |
| 21 | Confirm_ΔtrpR - 2 | AGGACGGATAAGGCGTTCAC |

Transformation with the pKD46 vector was confirmed, and the CA04-9301 strain in which recombinases were expressed by adding 10 mM L-arabinose was transformed by electroporation with the linear gene fragment, obtained in the above-described process, in which the FRT-kanamycin-FRT cassette and the homologous base pair of 50 bp flanking the trpR gene are bound. For colonies grown on an LB solid medium containing 25 mg/L kanamycin, colony PCR was performed using primers of SEQ ID NOS: 14 and 21 and the colonies where a 838-bp gene fragment was prepared were selected.

The strain from which the trpR gene was removed by homologous recombination was prepared as competent cells and then transformed with the pCP20 vector to remove the kanamycin antibiotic marker, and a strain from which the kanamycin antibiotic marker was removed by expression of the FLP protein was prepared. The removal of the trpR gene was finally confirmed by genome sequencing and the strain was named CA04-9307.

To provide the strain CA04-9307 with a feedback resistant trpE trait, PCR was performed using gDNA of E. coli W3110, as a template, and primers of SEQ ID NOS: 22 and 23 containing an EcoRI restriction enzyme site, thereby obtaining a trpE gene fragment containing an EcoRI sequence (1,575 bp). Solg™ Pfu-X DNA polymerase was used as a polymerase, and the PCR was performed under the following amplification conditions: denaturation at 95° C. for 2 minutes; 27 cycles of denaturation at 95° C. for 20 seconds, annealing at 62° C. for 1 minute, and polymerization at 72° C. for 1 minute; and polymerization at 72° C. for 5 minutes.

TABLE 15

| SEQ ID NO | Primer | Sequence (5'->3') |
|---|---|---|
| 22 | trpE - 1 | GAATTCATGCAAACACAAAAACCGAC |
| 23 | trpE - 2 | GAATTCTCAGAAAGTCTCCTGTGCA |

The trpE gene obtained by the method described above and pSG76-C plasmid (JOURNAL OF BACTERIOLOGY, July 1997, p. 4426-4428) were treated with EcoRI restriction enzyme and cloned. E. coli DH5a was transformed with the cloned plasmid by electroporation, and the transformed E. coli DH5a was selected from an LB plate containing 25 μg/mL chlororamphenocol to obtain pSG76-C-trpE plasmid.

Site directed mutagenesis (Stratagene, USA) was performed using the obtained pSG76-C-trpE plasmid and primers of SEQ ID NOS: 24 and 25 to prepare pSG76-C-trpE (P21 S).

TABLE 16

| SEQ ID NO: | Name | Primer (5'->3') |
|---|---|---|
| 24 | trpE(P21S) - 1 | CGCTTATCGCGACAATTCCACCGCGCTTTTTCACCAG |
| 25 | trpE(P21S) - 2 | CTGGTGAAAAAGCGCGGTGGAATTGTCGCGATAAGCG |

The strain CA04-9307 was transformed with the pSG76-C-trpE(P21S) plasmid and cultured in an LB-Cm medium (10 g/L yeast extract, 5 g/L NaCl, 10 g/L tryptone, and 25 μg/L chloramphenicol), and colonies resistant to chloramphenicol were selected. The selected transformants are strains in which the pSG76-C-trpE(P21 S) plasmid is incorporated into the trpE region of the genome by the first insertion. The strain into which the obtained trpE(P21 S) gene is inserted was transformed with pAScep plasmid (Journal of Bacteriology, July 1997, p. 4426 to 4428), which expresses restriction enzyme I-SceI that cleaves an I-SceI region present in the pSG76-C plasmid, and the strain grown in an LB-Ap medium (10 g/L yeast extract, 5 g/L NaCl, 10 g/L tryptone, and 100 μg/L ampicillin) was selected. The trpE gene was amplified in the selected strain using primers of SEQ ID NOS: 22 and 23, and substitution with the trpE(P21S) gene was confirmed by sequencing. The prepared strain was named CA04-4303.

Example 7-2: Preparation of Microorganism of the Genus *Escherichia* within which *Azotobacter*-Derived serA(Avn) is Introduced and Evaluation of Tryptophan-Producing Ability of the Microorganism The pCL-Ptrc-serA(Avn) vector prepared in Example 1 and a pCL1920 vector as a control were introduced into CA04-4303 prepared in Example 1, respectively, to prepare CA04-4303/pCL1920 and CA04-4303/pCL-Ptrc-serA(Avn) strains. To examine the L-tryptophan production of CA04-4303/pCL1920 and CA04-4303/pCL-Ptrc-serA(Avn) strains, the two strains were cultured in an LB liquid medium containing 50 mg/L spectinomycin for 12 hours. Subsequently, each of the strains was inoculated onto a 250 ml corner-baffle flask containing 25 ml of a production medium such that an initial OD600 value reached 0.01 and cultured while shaking at 37° C. for 48 hours at 200 rpm. Upon completion of the cultivation, the amount of L-tryptophan production was measured by HPLC.

The results of L-tryptophan production by the CA04-4303/pCL1920 and CA04-4303/pCL-Ptrc-serA(Avn) strains in the culture media are shown in Table 17 below. The CA04-4303/pCL1920 strain showed an L-tryptophan production of 1.2 g/L and an accumulation of indole, which is an intermediate product, in an amount of 37 mg/L. However, the strain introduced with serA(Avn) showed an L-tryptophan production of 1.7 g/L with no accumulation of indole.
<Production Medium (pH 7.0)>

70 g of glucose, 20 g of $(NH_4)_2SO_4$, 1 g of $MgSO_4 \cdot 7H_2O$, 2 g of $KH_2PO_4$, 2.5 g of yeast extract, 5 g of Na-citrate, 1 g of NaCl, and 40 g of $CaCO_3$ (based on 1 L of distilled water).

TABLE 17

Confirmation of L-tryptophan Production Containing serA(Avn)

| Strain | OD | L-tryptophan (g/L) | Indole (mg/L) |
| --- | --- | --- | --- |
| CA04-4303/pCL1920 | 37.9 | 1.2 | 37 |
| CA04-4303/pCL-Ptrc-serA(Avn) | 38.4 | 1.7 | 0 |

As can be seen in the above results, it was estimated that the supply of L-serine was sufficient by introducing serA (Avn), and it was confirmed that the yield of L-tryptophan was increased with no accumulation of indole, that is an intermediate product, in the final step of the biosynthesis of L-tryptophan.

Example 7-3: Preparation of *Corynebacterium glutamicum* Strain Producing Tryptophan in which Foreign *Azotobacter*-Derived serA(Avn) is Introduced In order to identify the effect of the *Azotobacter*-derived serA(Avn) gene on a strain of the genus *Corynebacterium* producing tryptophan, KCCM12218P (Korean Patent Application Publication No. 2018-0089329) was used as the strain of the genus *Corynebacterium* producing L-tryptophan.

The strain was prepared by substituting *Corynebacterium glutamicum* serA (hereinafter, referred to as serA(Cgl)) gene with the *Azotobacter*-derived serA(Avn) gene to be expressed by the gapA promoter.

For this genetic manipulation, first, a region upstream of the promoter and a region downstream of the an OFR of the serA (Cgl) gene, where chromosomal homologous recombination occurs, were obtained. Specifically, a gene fragment of the promoter upstream region was obtained by performing PCR using the chromosomal DNA of *Corynebacterium glutamicum*, as a template, and primers of SEQ ID NOS: 26 and 27 and a gene fragment of the downstream region was obtained by performing PCR using primers of SEQ ID NOS: 28 and 29. Additionally, the gapA promoter region was obtained by performing PCR using the chromosomal DNA of *Corynebacterium glutamicum*, as a template, and primers of SEQ ID NOS: 30 and 31.

Solg™ Pfu-X DNA polymerase was used as a polymerase, and the PCR was performed under the following amplification conditions: denaturation at 95° C. for 5 minutes; 30 cycles of denaturation at 95° C. for 30 seconds, annealing at 58° C. for 30 seconds, and polymerization at 72° C. for 60 seconds; and polymerization at 72° C. for 5 minutes.

The *Azotobacter*-derived serA(Avn) gene region was obtained by performing PCR using the pCL-Ptrc_-serA (Avn) vector prepared in Example 1, as a template, and primers of SEQ ID NOS: 32 and 33.

Solg™ Pfu-X DNA polymerase was used as a polymerase, and the PCR was performed under the following amplification conditions: denaturation at 95° C. for 5 minutes; 30 cycles of denaturation at 95° C. for 30 seconds, annealing at 58° C. for 30 seconds, and polymerization at 72° C. for 30 seconds; and polymerization at 72° C. for 5 minutes.

A recombinant plasmid was obtained via cloning using the amplified upstream and downstream regions for the chromosomal homologous recombination, the gapA promoter, the *Azotobacter*-derived serA(Avn) gene, and a pDZ vector for chromosomal transformation cleaved by the SmaI restriction enzyme by Gibson assembly and named pDZ-PgapA-serA(Avn). The cloning was performed by mixing a Gibson assembly reagent and each of the gene fragments in calculated numbers of moles, followed by incubation at 50° C. for 1 hour.

The *Corynebacterium glutamicum* strain KCCM12218P producing L-tryptophan was transformed with the prepared pDZ-PgapA-serA(Avn) vector by electroporation and subjected to a second crossover process to obtain a strain in which the serA(cgl) gene was substituted with the *Azotobacter* serA gene expressed by the gapA promoter. This genetic manipulation was confirmed by performing PCR and genome sequencing using primers SEQ ID NOS: 34 and 35 respectively amplifying the outer regions of the upstream and downstream regions of the homologous recombination in which the gene was inserted, and the resulting strain was named KCCM12218P-PgapA-serA(Avn).

Sequences of the primers used in this example are shown in Table 18 below.

TABLE 18

| SEQ ID NO | Primer | Sequence (5'->3') |
| --- | --- | --- |
| 26 | SerA(Cgl)-up-F | TCGAGCTCGGTACCCGG AAGATCTAGTCGGATAC G |
| 27 | SerA(Cgl)-up-R | TCGTTTTTAGGCCTCCG ACTACTTTGGGCAATCC T |
| 28 | SerA(Cgl)-down-F | TCTGTTCTGATTAGAGA TCCATTTGCTTGAAC |
| 29 | SerA(Cgl)-down-R | CTCTAGAGGATCCCCTC ACCCAGCTCAAAGCTGA T |
| 30 | PgapA-F | TGCCCAAAGTAGTCGGA GGCCTAAAAACGACCGA G |
| 31 | PgapA-R | TCTTACTCATGTTGTGT CTCCTCTAAAG |
| 32 | serA(Avn)-F | GAGACACAACATGAGTA AGACCTCCCTG |
| 33 | serA(Avn)-R | GGATCTCTAATCAGAAC AGAACCCGTGAG |
| 34 | Confirm-serA-F | ACCAAGAGTTCGAAGAC CAG |
| 35 | Confirm-serA-R | TTCAGTGGCTTCCACAT CGC |

Example 7-4: Evaluation of Tryptophan-Producing Ability of *Corynebacterium glutamicum* Strain in which *Azotobacter*-Derived serA(Avn) is Introduced The KCCM12218P-PgapA-serA(Avn) strain prepared in Example 7-3 and the parent strain KCCM12218P were cultured according to the following method to identify tryptophan production thereof. Each of the strains was inoculated onto a 250 ml corner-baffle flask containing 25 ml of a seed medium and cultured while shaking at 30° C. for 20 hours at 200 rpm. Then, 1 ml of the seed medium was inoculated onto a 250 ml corner-baffle flask containing 25 ml of a production medium and cultured while shaking at 30° C. for 24 hours at 200 rpm. Upon completion of the cultivation, the L-tryptophan production by each strain was measured by HPLC.

<Seed Medium (pH 7.0)>

20 g of glucose, 10 g of peptone, 5 g of yeast extract, 1.5 g of urea, 4 g of $KH_2PO_4$, 8 g of $K_2HPO_4$, 0.5 g of $MgSO_4·7H_2O$, 100 μg of biotin, 1,000 μg of thiamine HCl, 2,000 μg of calcium pantothenate, and 2,000 μg of nicotinamide (based on 1 L of distilled water).

<Production Medium (pH 7.0)>

30 g of glucose, 15 g of $(NH_4)_2SO_4$, 1.2 g of $MgSO_4·7H_2O$, 1 g of $KH_2PO_4$, 5 g of yeast extract, 900 μg of biotin, 4,500 μg of thiamine HCl, 4,500 μg of calcium pantothenate, and 30 g of $CaCO_3$ (based on 1 L of distilled water)

TABLE 19

Confirmation of Tryptophan Production of *Corynebacterium Glutamicum* Strain Introduced with Foreign *Azotobacter*-derived serA(Avn)

| | OD | Glucose consumption (g/L) | Tryptophan production (g/L) | Indole (mg/L) |
|---|---|---|---|---|
| KCCM12218P | 43.6 | 30 | 2.5 | 59 |
| KCCM12218P-PgapA-serA(Avn) | 42.3 | 30 | 3.1 | 0 |

The evaluation results of L-tryptophan production of the KCCM12218P and KCCM12218P-PgapA-serA(Avn) strains are shown in Table 19 above.

While the parent strain KCCM12218P showed an L-tryptophan production of 2.5 g/L and the intermediate product of indole was accumulated in an amount of 59 mg/L, the strain introduced with serA(Avn) showed a L-tryptophan production of 3.1 g/L with no accumulation of indole.

Based on the results, it was estimated that the supply of L-serine was also sufficient by introducing *Azotobacter*-derived serA(Avn) into *Corynebacterium glutamicum* producing L-tryptophan, and it was confirmed that the yield of L-tryptophan was also increased with no accumulation of indole that is an intermediate product in the final step of the biosynthesis of L-tryptophan. Therefore, it can be seen that synergistic effects on tryptophan production are improved when production of the precursor is improved together.

The strain KCCM12218P-PgapA-serA(Avn) was named CM05-8935 and deposited at the Korean Culture Center of Microorganisms (KCCM) under the Budapest Treaty and designated Accession No. of KCCM12414P on Nov. 27, 2018.

Example 8: Preparation of *Corynebacterium glutamicum* Strain Introduced with *Azotobacter*-Derived serA(Avn) and Evaluation of Histidine-Producing Ability of the Strain Example 8-1: Preparation of Histidine-Producing *Corynebacterium glutamicum* Strain An L-histidine-producing *Corynebacterium glutamicum* strain was developed from a wild-type strain ATCC13032.

In order to release feedback inhibition of HisG polypeptide, which is the first enzyme of the L-histidine biosynthetic pathway, glycine at the $233^{rd}$ position from the N-terminus of HisG was substituted with histidine and threonine at the $235^{th}$ position from the N-terminus was substituted with glutamine, simultaneously (SEQ ID NO: 88) (ACS Synth. Biol., 2014, 3 (1), pp 21-29). Additionally, in order to enhance the L-histidine biosynthetic pathway, biosynthesis genes (hisD-hisC-hisB-hisN) split into 4 operons in total were prepared in a cluster form where the promoter was substituted and introduced into the strain (SEQ ID NO: 89).

For this genetic manipulation, first, the upstream and downstream regions of the modifications of the $233^{rd}$ and $235^{th}$ amino acids of hisG where chromosomal homologous recombination occurs were obtained. Specifically, a gene fragment of the upstream and downstream regions of the modifications of the $233^{rd}$ and $235^{th}$ amino acids of hisG was obtained by performing PCR using the chromosomal DNA of *Corynebacterium glutamicum* ATCC13032, as a template, and primers of SEQ ID NOS: 36 and 37, and a gene fragment of the upstream and downstream regions of the modifications of the $233^{rd}$ and $235^{th}$ amino acids of hisG was obtained by performing PCR using primers of SEQ ID NOS: 38 and 39.

Solg™ Pfu-X DNA polymerase was used as a polymerase, and the PCR was performed under the following amplification conditions: denaturation at 95° C. for 5 minutes; 30 cycles of denaturation at 95° C. for 30 seconds, annealing at 60° C. for 30 seconds, and polymerization at 72° C. for 60 seconds; and polymerization at 72° C. for 5 minutes.

A recombinant plasmid was obtained via cloning using the amplified the upstream and downstream regions of the modifications of the $233^{rd}$ and $235^{th}$ amino acids of hisG and the pDZ vector (Korean Patent No. 10-0924065) for chromosomal transformation cleaved by the SmaI restriction enzyme by Gibson assembly (DG Gibson et al., NATURE METHODS, VOL. 6, NO. 5, May 2009, NEBuilder HiFi DNA Assembly Master Mix) and named pDZ-hisG(G233H, T235Q). The cloning was performed by mixing a Gibson assembly reagent and each of the gene fragments in calculated number of moles, followed by incubation at 50° C. for 1 hour.

The wild-type *Corynebacterium glutamicum* strain ATCC13032 was transformed with the prepared pDZ-hisG (G233H, T235Q) vector by electroporation and subjected to a second crossover process to obtain a strain having substitutions of amino acids of HisG from glycine to histidine at the $233^{rd}$ position and from threonine to glutamine at the $235^{th}$ position on the chromosome (SEQ ID NO: 88). This genetic manipulation was confirmed by performing PCR and genome sequencing using primers SEQ ID NOS: 40 and 41 respectively amplifying the outer regions of the upstream and downstream regions of the homologous recombination in which the gene was inserted and the resulting strain was named CA14-0011.

Sequences of the primers used in this example are shown in Table 20 below.

TABLE 20

| SEQ ID NO | Primer | Sequence (5'->3') |
|---|---|---|
| 36 | (hisG(G233H, T235Q) F-1) | TCGAGCTCGGTACCCAT CGCCATCTACGTTGCTG G |
| 37 | (hisG(G233H, T235Q) R-1) | GTGCCAGTGGGGATACC tgTGGGtgGGATAAGCC TGGGGTTACTG |
| 38 | (hisG(G233H, T235Q) F-2) | AACCCCAGGCTTATCCc aCCCAcaGGTATCCCCA CTGGCACGCGA |
| 39 | (hisG(G233H, T235Q) R-2) | CTCTAGAGGATCCCCGG GACGTGGTTGATGGTGG T |
| 40 | (hisG CF) | ATGGAAATCCTCGCCGA AGC |
| 41 | (hisG CR) | ATCGATGGGGAACTGAT CCA |

Additionally, in order to enhance the L-histidine biosynthetic pathway, the biosynthesis genes split into 4 operons in total were introduced in the form of cluster where the promoter was substituted. Specifically, the L-histidine biosynthesis cluster was split into four operons (hisE-hisG, hisA-impA-hisF-hisI, hisD-hisC-hisB, and cg0911-hisN) in total, and a vector simultaneously introducing the biosynthesis genes into the microorganism was prepared.

In addition, Ncgl108 gene encoding gamma-aminobutyrate permease (Microb Biotechnol. 2014 January; 7 (1): 5-25)) was used as an insertion site of the biosynthesis cluster.

For this genetic manipulation, first, upstream and downstream regions of the Ncgl108 gene where chromosomal homologous recombination occurs were obtained. Specifically, a gene fragment of the upstream region of the Ncgl108 gene was obtained by performing PCR using the chromosomal DNA of *Corynebacterium glutamicum* ATCC13032, as a template, and primers of SEQ ID NOS: 42 and 43, and a gene fragment of the downstream region of the Ncgl108 gene was obtained by performing PCR using primers of SEQ ID NOS: 44 and 45.

Solg™ Pfu-X DNA polymerase was used as a polymerase, and the PCR was performed under the following amplification conditions: denaturation at 95° C. for 5 minutes; 30 cycles of denaturation at 95° C. for 30 seconds, annealing at 60° C. for 30 seconds, and polymerization at 72° C. for 60 seconds; and polymerization at 72° C. for 5 minutes.

A recombinant plasmid was obtained via cloning using the amplified upstream and downstream regions of the NCgl108 gene and the pDZ vector (Korean Patent No. 10-0924065) for chromosomal transformation cleaved by the SmaI restriction enzyme by Gibson assembly (DG Gibson et al., NATURE METHODS, VOL. 6, NO. 5, May 2009, NEBuilder HiFi DNA Assembly Master Mix) and named pDZ-ΔNcgl108. The cloning was performed by mixing a Gibson assembly reagent and the gene fragments in calculated numbers of moles, followed by incubation at 50° C. for 1 hour.

The CA14-0011 strain was transformed with the prepared pDZ-ΔNcgl108 vector by electroporation and subjected to a second crossover process to obtain a strain in which the Ncgl108 gene is disrupted. This genetic manipulation was confirmed by performing PCR and genome sequencing using primers SEQ ID NOS: 46 and 47 respectively amplifying the outer regions of the upstream and downstream regions of homologous recombination where the gene was disrupted and the resulting strain was named CA14-0736.

Sequences of the primers used in this example are shown in Table 21 below.

TABLE 21

| SEQ ID NO | Primer | Sequence (5'->3') |
|---|---|---|
| 42 | (KO Ncgl1108 F-1) | TCGAGCTCGGTACCCAT CGCCATCTACGTTGCTG G |
| 43 | (KO Ncgl1108 R-1) | GAGTCTAGAAGTACTCG AGATGCTGACCTCGTTT C |
| 44 | (KO Ncgl1108 F-2) | AGCATCTCGAGTACTTC TAGACTCGCACGAAAAA G |
| 45 | (KO Ncgl1108 R-2) | CTCTAGAGGATCCCCTT TGGGCAGAGCTCAAATT C |
| 46 | (KO hisG CF) | AGTTTCGTAACCCACCT TGC |
| 47 | (KO hisG CR) | CGCTTCTCAATCTGATG AGA |

Additionally, in order to enhance the biosynthesis cluster, a promoter region to be substituted with a group of 4 operon genes was obtained. An enhanced lysC promoter (hereinafter, referred to as lysCP1, Korean Patent No. 10-0930203) region and a hisE-hisG region, a gapA promoter region and a hisA-impA-hisF-hisI region, a SPL13 synthesized promoter (Korean Patent No. 10-1783170) region and a hisD-hisC-hisB region, and a CJ7 synthesized promoter (Korean Patent No. 10-0620092 and WO2006/065095) region and a cg0911-hisN region were obtained. Specifically, PCR was performed using the chromosome of KCCM10919P strain (Korean Patent No. 10-0930203), as a template, and primers of SEQ ID NOS: 48 and 49. PfuUltra™ high-fidelity DNA polymerase (Stratagene) was used as a polymerase for PCR, and PCR products amplified thereby were purified by using a PCR Purification kit manufactured by QIAGEN to obtain the lysCP1 promoter region. A gene fragment of the hisE-hisG region was obtained by performing PCR using the chromosomal DNA of the *Corynebacterium glutamicum* CA14-0011, as a template, and primers of SEQ ID NOS: 50 and 51. A gene fragment of the gapA promoter region was obtained by performing PCR using primers of SEQ ID NOS: 52 and 53 and a gene fragment of the hisA-impA-hisF-hisI region was obtained by performing PCR using primers of SEQ ID NOS: 54 and 55. Additionally, PCR was performed using the SPL13 synthesized promoter, as a template, and primers of SEQ ID NOS: 56 and 57, and a gene fragment of the hisD-hisC-hisB region was obtained by performed PCR using the chromosomal DNA of *Corynebacterium glutami-* cum CA14-0011, as a template, and primers of SEQ ID NOS: 58 and 59. Then, PCR was performed using the CJ7 synthesized promoter, as a temperature, and primers of SEQ ID NOS: 60 and 61, and a gene fragment of the cg0911-hisN region was obtained by performing using the chromosomal DNA of *Corynebacterium glutamicum* CA14-0011, as a template, and primers of SEQ ID NOS: 62 and 63.

Sequences of the primers used in this example are shown in Table 22 below.

TABLE 22

| SEQ ID NO | Primer | Sequence (5'->3') |
|---|---|---|
| 48 | (his cluster F-1) | GTCAGCATCTCGAGTGCT CCTTAGGGAGCCATCTT |
| 49 | (his cluster R-1) | GTCAAATGTCTTCACATG TGTGCACCTTTCGATCT |
| 50 | (his cluster F-2) | GAAAGGTGCACACATGTG AAGACATTTGACTCGCT |
| 51 | (his cluster R-2) | TCGTTTTTAGGCCTCCTA GATGCGGGCGATGCGGA |
| 52 | (his cluster F-3) | ATCGCCCGCATCTAGGAG GCCTAAAAACGACCGAG |
| 53 | (his cluster R-3) | GACAGTTTTGGTCATGTT GTGTCTCCTCTAAAGAT |
| 54 | (his cluster F-4) | TAGAGGAGACACAACATG ACCAAAACTGTCGCCCT |
| 55 | (his cluster R-4) | TGAAGCGCCGGTACCGCT TACAGCAAAACGTCATT |
| 56 | (his cluster F-5) | CGTTTTGCTGTAAGCGGT ACCGGCGCTTCATGTCA |
| 57 | (his cluster R-5) | AGTGACATTCAACATTGT TTTGATCTCCTCCAATA |
| 58 | (his cluster F-6) | GAGGAGATCAAAACAATG TTGAATGTCACTGACCT |
| 59 | (his cluster R-6) | CGCTGGGATGTTTCTCTA GAGCGCTCCCTTAGTGG |
| 60 | (his cluster F-7) | AAGGGAGCGCTCTAGAGA AACATCCCAGCGCTACT |
| 61 | (his cluster R-7) | AGTCATGCCTTCCATGAG TGTTTCCTTTCGTTGGG |
| 62 | (his cluster F-8) | CGAAAGGAAACACTCATG GAAGGCATGACTAATCC |
| 63 | (his cluster R-8) | CGAGTCTAGAAGTGCCTA TTTTAAACGATCCAGCG |

Solg™TM Pfu-X DNA polymerase was used as a polymerase, and the PCR was performed under the following amplification conditions: denaturation at 95° C. for 5 minutes; 30 cycles of denaturation at 95° C. for 30 seconds, annealing at 60° C. for 30 seconds, and polymerization at 72° C. for 180 seconds; and polymerization at 72° C. for 5 minutes.

A recombinant plasmid was obtained via cloning using the amplified lysCP1 region and hisE-hisG region, gapA promoter region and hisA-impA-hisF-hisI region, SPL13 synthesized promoter region and hisD-hisC-hisB region, CJ7 synthesized promoter region and cg0911-hisN region, and the pDZ vector-ΔNCgl1108 vector for chromosomal transformation cleaved by the ScaI restriction enzyme by Gibson assembly (DG Gibson et al., NATURE METHODS, VOL. 6, NO. 5, May 2009, NEBuilder HiFi DNA Assembly Master Mix) and named pDZ-ΔNCgl1108::lysCP1_hisEG-PgapA_hisA-impA-hisFI-SPL13_HisDCB-CJ7_cg0 911-hisN. The cloning was performed by mixing a Gibson assembly reagent and each of the gene fragments in calculated number of moles, followed by incubation at 50° C. for 1 hour.

The CA14-0011 strain was transformed with the prepared pDZ-ΔNcgl108::PlysCm1_hisEG-PgapA_hisA-impA-hisFI-SPL13_HisDCB-CJ7_cg 0911-hisN vector by electroporation and subjected to a second crossover process to obtain a strain into which the biosynthesis genes were inserted. This genetic manipulation was confirmed by performing PCR and genome sequencing using primers SEQ ID NOS: 46 and 47 respectively amplifying outer regions of the upstream and downstream regions of the homologous recombination into which the gene was inserted and the transformed strain was named CA14-0737.

The CA14-0737 strain was deposited at the Korean Culture Center of Microorganisms (KCCM) under the Budapest Treaty and designated Accession No. of KCCM 12411P on Nov. 27, 2018.

Example 8-2: Preparation of his-Producing *Corynebacterium glutamicum* Strain Introduced with Foreign *Azotobacter*-Derived serA(Avn)

In order to identify the effect of the *Azotobacter*-derived serA(Avn) gene on an increase in L-histidine production, the CA14-0737 strain was used.

A strain was prepared by substituting the serA(Cgl) gene with the *Azotobacter*-derived serA(Avn) gene to be expressed by the gapA promoter using the pDZ-PgapA-serA (Avn) prepared in Example 7-3.

The *Corynebacterium glutamicum* strain CA14-0737 producing L-histidine was transformed with the pDZ-PgapA-serA(Avn) vector by electroporation and subjected to a second crossover process to obtain a strain in which the serA(Cgl) gene was substituted with the *Azotobacter* serA gene expressed by a strong promoter of the gapA promoter. This genetic manipulation was confirmed by performing PCR and genome sequencing using primers SEQ ID NOS: 34 and 35 respectively amplifying outer regions of the upstream and downstream regions of the homologous recombination into which the gene was inserted and the resulting strain was named CA14-0738.

Example 8-3: Evaluation of L-Histidine-Producing *Corynebacterium glutamicum* Strain Introduced with *Azotobacter*-Derived serA(Avn)

The CA14-0011, CA14-0736, CA14-0737, and CA14-0738 strains prepared in Examples 8-1 and 8-2 above were cultured according to the following method to identify the L-histidine-producing ability. Each of the strains was inoculated onto a 250 ml corner-baffle flask containing 25 ml of a seed medium and cultured while shaking at 30° C. for 20 hours at 200 rpm. Then, 1 ml of the seed medium was inoculated onto a 250 ml corner-baffle flask containing 25 ml of a production medium and cultured while shaking at 30° C. for 24 hours at 200 rpm. Upon completion of the cultivation, the L-histidine production was measured by HPLC.

<Seed Medium (pH 7.0)>

20 g of glucose, 10 g of peptone, 5 g of yeast extract, 1.5 g of urea, 4 g of $KH_2PO_4$, 8 g of $K_2HPO_4$, 0.5 g of $MgSO_4·7H_2O$, 100 µg of biotin, 1,000 µg of thiamine HCl, 2,000 µg of calcium pantothenate, and 2,000 µg of nicotinamide (based on 1 L of distilled water).

<Production Medium (pH 7.0)>

100 g of glucose, 40 g of $(NH_4)_2SO_4$, 3 g of yeast extract, 1 g of $KH_2PO_4$, 0.4 g of $MgSO_4·7H_2O$, 0.01 g of $FeSO_4·7H_2O$, 50 µg of biotin, 100 µg of thiamine, and 30 g of $CaCO_3$ (based on 1 L of distilled water)

TABLE 23

Confirmation of L-histidine Production of *Corynebacterium Glutamicum* Strain Introduced with Foreign *Azotobacter*-derived serA(Avn)

| | OD | Glucose consumption (g/L) | Histidine production (g/L) |
|---|---|---|---|
| CA14-0011 | 113.6 | 100 | 0.51 |
| CA14-0736 | 115.1 | 100 | 0.50 |
| CA14-0737 | 88.9 | 100 | 4.09 |
| CA14-0738 | 84.7 | 100 | 5.07 |

The evaluation results of L-histidine production of the L-histidine-producing *Corynebacterium glutamicum* strains are shown in Table 24 above.

While the parent strain CA14-0737 having enhanced histidine-producing ability showed an L-histidine production of 4.09 g/L, the CA14-0738 strain introduced with serA(Avn) showed an L-histidine production of 5.07 g/L, indicating an increase in L-histidine production by 20% compared to the parent strain CA14-0737.

Based on the results, it was confirmed that the ability to produce L-histidine was enhanced by introducing the *Azotobacter*-derived serA(Avn). The CA14-0738 strain was deposited at the Korean Culture Center of Microorganisms (KCCM) under the Budapest Treaty and designated Accession No. of KCCM 12412P on Nov. 27, 2018.

Example 9: Preparation and Evaluation of Methionine (Met)-Producing Strain Introduced with *Azotobacter* serA Example 9-1: Preparation of Recombinant Vector for Deletion of mcbR Gene In order to prepare a methionine-producing strain, ATCC13032 strain was used to prepare a vector for inactivating the mcbR gene encoding methionine/cysteine transcriptional regulator (J. Biotechnol. 103:51-65, 2003).

Specifically, in order to delete the mcbR gene from the chromosome of the *Corynebacterium glutamicum* strain ATCC13032, a recombinant plasmid vector was prepared according to the following method. Based on nucleotide sequences deposited in the U.S. National Institutes of Health (NIH) GenBank, the mcbR gene and flanking sequences of *Corynebacterium glutamicum* (SEQ ID NO: 91) were obtained.

In order to obtain the deleted mcbR gene, PCR was performed using the chromosomal DNA of *Corynebacterium glutamicum* ATCC13032, as a template, and primers of SEQ ID NOS: 64, 65, 66, and 67. The PCR was performed under the following amplification conditions: denaturation at 95° C. for 5 minutes; 30 cycles of denaturation at 95° C. for 30 seconds, annealing at 53° C. for 30 seconds, and polymerization at 72° C. for 30 seconds; and polymerization at 72° C. for 7 minutes. As a result, DNA fragments of 700 bp were obtained, respectively.

A pDZ vector (Korean Patent No. 10-0924065) unable to replicate in *Corynebacterium glutamicum* and the amplified mcbR gene fragments were treated with the restriction enzyme SmaI for introduction into the chromosome and ligated using a DNA ligase. *E. coli* DH5a was transformed with the vector and plated on an LB solid medium containing 25 mg/L kanamycin. Colonies transformed with the vector into which a fragment having deletion of the target gene was inserted were selected. Then, a plasmid was obtained by a plasmid extraction method and named pDZ-ΔmcbR.

Sequences of the primers used in this example are shown in Table 24 below.

TABLE 24

| SEQ ID NO | Primer | Sequence (5'->3') |
|---|---|---|
| 64 | | TCGAGCTCGGTACCCCT GCCTGGTTTGTCTTGTA |
| 65 | | CGGAAAATGAAGAAAGT TCGGCCACGTCCTTTCG G |
| 66 | | AGGACGTGGCCGAACTT TCTTCATTTTCCGAAGG G |
| 67 | | CTCTAGAGGATCCCCGT TTCGATGCCCACTGAGC A |

Example 9-2: Preparation of Recombinant Vector in which metH and CysI are Simultaneously Enhanced In order to prepare a methionine-producing strain, the ATCC13032 strain was used to prepare a vector in which both metH gene (Ncgl450) encoding methionine synthase and cysI gene (Ncgl2718) encoding sulfite reductase well known in the art were enhanced.

Specifically, in order to additionally insert the metH and cysI genes into the chromosome of *Corynebacterium glutamicum* ATCC13032, a recombinant plasmid vector was prepared according to the following method. Based on nucleotide sequences deposited in the U.S. National Institutes of Health (NIH) GenBank, the metH gene and flanking sequences (SEQ ID NO: 92) and the cysI gene and flanking sequences (SEQ ID NO: 93) of *Corynebacterium glutamicum* were obtained.

First, a vector for removing the Ncgl021 (transposase) was prepared to insert these genes. Based on nucleotide sequences deposited in the U.S. National Institutes of Health (NIH) GenBank, Ncgl021 and flanking sequences (SEQ ID NO: 94) of *Corynebacterium glutamicum* were obtained. In order to obtain the deleted Ncgl021 gene, PCR was performed using the chromosomal DNA of *Corynebacterium glutamicum* ATCC13032, as a template, and primers of SEQ ID NOS: 68, 69, 70, and 71. The PCR was performed under the following amplification conditions: denaturation at 95° C. for 5 minutes; 30 cycles of denaturation at 95° C. for 30 seconds, annealing at 53° C. for 30 seconds, and polymerization at 72° C. for 30 seconds; and polymerization at 72° C. for 7 minutes. As a result, DNA fragments were obtained. The pDZ vector unable to replicate in *Corynebacterium*

*glutamicum* (Korean Patent No. 10-0924065) and the amplified Ncgl021 gene fragments were treated with the restriction enzyme xbaI for introduction into chromosome and cloned by Gibson assembly. *E. coli* DH5a was transformed with the vector and plated on a LB solid medium containing 25 mg/L kanamycin. Colonies transformed with the vector into which a fragment having deletion of the target gene was inserted were selected. Then, a plasmid was obtained by a plasmid extraction method and named pDZ-ΔNcgl021.

Subsequently, in order to obtain the metH and cysI genes, PCR was performed using the chromosomal DNA of *Corynebacterium glutamicum* ATCC13032, as a template, and primers of SEQ ID NOS: 72, 73, 74, and 75. Additionally, Pcj7 promoter was used to enhance the expression of the metH gene and Pspl1 promoter was used to enhance the expression of the cysI gene. For the purpose of obtaining these genes, first, the Pcj7 promoter was obtained by performing PCR using the chromosomal DNA of *Corynebacterium ammoniagenes* ATCC 6872, as a template, and primers of SEQ ID NOS: 76 and 77, and the Pspl1 promoter was obtained by performing PCR using the DNA of spl1-GFP vector known in the art (Korean Patent No. 10-1783170), as a template, and primers of SEQ ID NOS: 78 and 79. The PCR was performed under the following amplification conditions: denaturation at 95° C. for 5 minutes; 30 cycles of denaturation at 95° C. for 30 seconds, annealing at 53° C. for 30 seconds, and polymerization at 72° C. for 30 seconds; and polymerization at 72° C. for 7 minutes. As a result, DNA fragments of the metH gene, the cysI gene, the Pcj7 promoter, and the Pspl1 promoter were obtained.

After a pDZ-ΔNcgl1021 vector unable to replace in *Corynebacterium glutamicum* was treated with the restriction enzyme ScaI and the amplified 4 DNA fragments were treated with the restriction enzyme ScaI and cloned by Gibson assembly. *E. coli* DH5a was transformed with the vector and plated on an LB solid medium containing 25 mg/L kanamycin. Colonies transformed with the vector into which a fragment having deletion of the target gene was inserted were selected. Then, a plasmid was obtained by a plasmid extraction method and named pDZ-ΔNcgl1021-Pcj7metH-Pspl1cysI.

Sequences of the primers used in this example are shown in Table 25 below.

TABLE 25

| SEQ ID NO | Primer | Sequence (5'->3') |
|---|---|---|
| 68 | | ACCCGGGGATCCTCTAGA ATGTTTGTGATGCGCAG |
| 69 | | GTCAGAGAGTACTTACGC TGATCGGGAGGGAAAGC |
| 70 | | ATCAGCGTAAGTACTCTC TGACTAGCGTCACCCTC |
| 71 | | CTGCAGGTCGACTCTAGA AAAGGGATTGGAGTGTT |
| 72 | | CAACGAAAGGAAACAATG TCTACTTCAGTTACTTC |
| 73 | | TCGAGCTCGGTACCCCTG CGACAGCATGGAACTC |
| 74 | | ATCAAAACAGATATCATG ACAACAACCACCGGAAG |

TABLE 25-continued

| SEQ ID NO | Primer | Sequence (5'->3') |
|---|---|---|
| 75 | | CGCTAGTCAGAGAGTTCA CACCAAATCTTCCTCAG |
| 76 | | CCGATCAGCGTAAGTAGA AACATCCCAGCGCTACT |
| 77 | | AACTGAAGTAGACATTGT TTCCTTTCGTTGGGTAC |
| 78 | | TACTTTAACGTCTAAGGT ACCGGCGCTTCATGTCA |
| 79 | | GGTGGTTGTTGTCATGAT ATCTGTTTTGATCTCCT |

Example 9-3: Development of L-Methionine-Producing Strain and L-Methionine Production Using the Strain The ATGG13032 strain was transformed with each of the pDG-ΔmcBR, pDZ-ΔNcgl1021, and pDZ-ΔNcgl1021-Pcj7metH-Pspl1cysI vectors prepared as described above by electroporation via chromosomal homologous recombination (van der Rest et al., Appl Microbiol Biotechnol 52-541-545, 1999). Then, second recombination was performed in a solid medium containing sucrose. Upon completion of the second recombination, a transformed *Corynebacterium glutamicum* strain having deletion of the mcBR gene was identified by performing PCR using primers of SEQ ID NOS: 80 and 81, and a transformed strain having deletion of the Ncgl1021 gene and insertion of the Pcj7-metH-Pspl1cysI gene into the Ncgl1021 site was identified by performing PCR using primers of SEQ ID NOS: 82 and 83. The recombinant strains were each named *Corynebacterium glutamicum* 13032/ΔmcbR, 13032/ΔNcgl1021, and 13032/ΔNcgl1021-Pcj7metH-Pspl1cysI.

Sequences of the primers used in this example are shown in Table 26 below.

TABLE 26

| SEQ ID NO | Primer | Sequence (5'->3') |
|---|---|---|
| 80 | | AATCTGGATTTCCGCCAGGT |
| 81 | | CTTCCTAACTCCTGAGGAAG |
| 82 | | ATCCCCATCGGCATCTTTAT |
| 83 | | CGATCACACTGGGCTGATCT |

In order to evaluate the L-methionine-producing ability of the prepared 13032/ΔmcbR, 13032/ΔNcgl021, and CJP13032/ΔNcgl021-Pcj7metH-Pspl1cysI strains, these strains and the parent strain *Corynebacterium glutamicum* ATCC13032 were cultured according to the following method.

Each of the *Corynebacterium glutamicum* strain ATCC13032 and the *Corynebacterium glutamicum* strains 13032/ΔmcbR, 13032/ΔNcgl021, and 13032/ΔNcgl021-Pcj7metH-Pspl1cysI of the present invention was inoculated onto a 250 ml corner-baffle flask containing 25 ml of a seed medium below and cultured while shaking at 30° C. for 20 hours at 200 rpm. Then, 1 ml of the seed culture was inoculated onto a 250 ml corner-baffle flask containing 24 ml of a production medium and cultured while shaking at 30° C. for 48 hours at 200 rpm. Compositions of the seed medium and the production medium are as follows.

<Seed Medium (pH 7.0)>

20 g of glucose, 10 g of peptone, 5 g of yeast extract, 1.5 g of urea, 4 g of $KH_2PO_4$, 8 g of $K_2HPO_4$, 0.5 g of $MgSO_4·7H_2O$, 100 µg of biotin, 1,000 µg of thiamine HCl, 2,000 µg of calcium pantothenate, and 2,000 µg of nicotinamide (based on 1 L of distilled water).

<Production Medium (pH 8.0)>

50 g of glucose, 12 g of $(NH_4)_2S_2O_3$, 5 g of yeast extract, 1 g of $KH_2PO_4$, 1.2 g of $MgSO_4·7H_2O$, 100 µg of biotin, 1,000 µg of thiamine HCl, 2,000 µg of calcium pantothenate, 3,000 µg of nicotinamide, and 30 g of $CaCO_3$ (based on 1 L of distilled water).

Concentrations of L-methionine contained in the cultures obtained by culturing the strains according to the method described above were analyzed and shown in Table 27 below.

TABLE 27

Evaluation of Prepared Strains

| Strain | L-methionine (g/L) |
|---|---|
| Corynebacterium glutamicum ATCC13032 (wild-type) | 0.00 |
| 13032/ΔmcbR | 0.12 |
| 13032/ΔNcgl1021 | 0.00 |
| 13032/ΔNcgl1021-Pcj7metH-Pspl1cysI | 0.18 |

As a result, it was confirmed that the strain in which only the mcbR gene was deleted showed an L-methionine production of 0.12 g/L indicating an increase compared to the control strain. In addition, the strain in which the metH and cysI genes were overexpressed with no deletion of the mcBR showed an L-methionine production of 0.18 g/L indicating an increase compared to the control strain.

Example 9-4: Preparation of Azotobacter-Derived D-3-Phosphoglycerate Dehydrogenase (serA(Avn))-Overexpressing Vector An expression vector was prepared in order to identify whether the methionine-producing ability is improved by enhancing the Azotobacter-derived D-3-phosphoglycerate dehydrogenase (hereinafter, referred to as serA(Avn)).

In order to express the serA(Avn) gene (SEQ ID NO: 1) encoding SerA(Avn), a shuttle vector pECCG117 (Biotechnology letters vol 13, No. 10, p. 721-726 1991 or Korean Patent Publication No. 92-7401) available in transformation of Corynebacterium glutamicum was used. As an expression promoter, a spl1 promoter (hereinafter, Pspl1) was used to prepare a pECCG117-Pspl1-serA(Avn) vector. PCR for the Pspl1 was performed using primers of SEQ ID NOS: 84 and 85 and PCR for the foreign serA(Avn) was performed using primers of SEQ ID NOS: 86 and 87. The amplified Pspl1 and serA(Avn) gene fragments were cloned by Gibson assembly using the pECCG117 vector treated with a restriction enzyme EcoRV, thereby preparing pECCG117-Pspl1-serA (Avn).

Sequences of the primers used in this example are shown in Table 28 below.

TABLE 28

| SEQ ID NO | Primer | Sequence (5'->3') |
|---|---|---|
| 84 | | ATCGATAAGCTTGATGGT ACCGGCGCTTCATGTCA |
| 85 | | GGAGGTCTTACTCATGAT ATCTGTTTTGATCTCCT |
| 86 | | ATCAAAACAGATATCATG AGTAAGACCTCCCTGGA |
| 87 | | CTGCAGGAATTCGATTCA GAACAGAACCCGTGAGC |

Example 9-5: Preparation of L-Methionine-Producing Strain Introduced with Azotobacter-Derived serA(Avn) Using Wild-Type Strain E. coli and Evaluation of L-Methionine-Producing Ability 13032/ΔmcbR and 13032/ΔNcgl021-Pcj7metH-Pspl1cysI strains were transformed with the pECCG117-Pspl1-serA(Avn) vector described above by electroporation, respectively (van der Rest et al., Appl Microbiol Biotechnol 52:541-545, 1999). The recombinant strains were named Corynebacterium glutamicum 13032/ΔmcbR (pECCG117-Pspl1-serA(Avn)) and 13032/ΔNcgl021-Pcj7metH-Pspl1cysI (pECCG117-Pspl1-serA(Avn)), respectively.

In order to evaluate the L-methionine-producing ability of the prepared recombinant strains of 13032/ΔmcbR (pECCG117-Pspl1-serA(Avn)) and 13032/ΔNcgl021-Pcj7metH-Pspl1cysI (pECCG117-Pspl1-serA(Avn)), these strains and parent strains thereof (13032/ΔmcbR and 13032/ΔNcgl021-Pcj7metH-Pspl1cysI) were cultured according to the following method.

Each of the Corynebacterium glutamicum ATCC13032 and the prepared strains Corynebacterium glutamicum 13032/ΔmcbR, 13032/ΔNcgl021, 13032/ΔNcgl021-Pcj7metH-Pspl1cysI strains according to the present disclosure was inoculated onto a 250 ml corner-baffle flask containing 25 ml of a seed medium below and cultured while shaking at 30° C. for 20 hours at 200 rpm. Then, 1 ml of the seed culture was inoculated onto a 250 ml corner-baffle flask containing 24 ml of a production medium and cultured while shaking at 30° C. for 48 hours at 200 rpm. In particular, the strains in which the vector was included were cultured after additionally adding kanamycin (25 mg/l) thereto. Compositions of the seed medium and the production medium are as follows.

<Seed Medium (pH 7.0)>

20 g of glucose, 10 g of peptone, 5 g of yeast extract, 1.5 g of urea, 4 g of $KH_2PO_4$, 8 g of $K_2HPO_4$, 0.5 g of $MgSO_4·7H_2O$, 100 µg of biotin, 1,000 µg of thiamine HCl, 2,000 µg of calcium pantothenate, and 2,000 µg of nicotinamide (based on 1 L of distilled water).

<Production Medium (pH 8.0)>

50 g of glucose, 12 g of $(NH_4)_2S_2O_3$, 5 g of yeast extract, 1 g of $KH_2PO_4$, 1.2 g of $MgSO_4·7H_2O$, 100 µg of biotin, 1,000 µg of thiamine HCl, 2,000 µg of calcium pantothenate, 3,000 µg of nicotinamide, and 30 g of $CaCO_3$ (based on 1 L of distilled water).

Concentrations of the L-methionine contained in the culture obtained by culturing the strains according to the method described above were analyzed and shown in Table 29 below.

TABLE 29

Evaluation of Prepared Strains

| Strain | L-methionine (g/L) |
| --- | --- |
| 13032/ΔmcbR | 0.12 |
| 13032/ΔNcgl1021-Pcj7metH-Pspl1cysI | 0.18 |
| 13032/ΔmcbR (pECCG117-Pspl1-serA(Avn)) | 0.22 |
| 13032/ΔNcgl1021 -Pcj7metH-Pspl1cysI (pECCG117-Pspl1-serA(Avn)) | 0.32 |

As a result, it was confirmed that both strains transformed with the pECCG117-Pspl1-serA(Avn) showed an increase in L-methionine production compared to the control strain. In addition, the 13032/ΔmcbR (pECCG117-Pspl1-serA(Avn)) strain showed an increase in L-methionine production by 83% compared with the control strain and the 13032/ΔNcgl021-Pcj7metH-Pspl1cysI pECCG117-Pspl1-serA (Avn)) strain showed an increase in L-methionine production by 78% compared with the control strain. Thus, according to this example, it was confirmed that the L-methionine-producing ability of microorganisms was improved by introducing the *Azotobacter*-derived serA(Avn) thereinto.

The 13032/ΔmcbR strain was named CM02-0618 and deposited at the Korean Culture Center of Microorganisms (KCCM) under the Budapest Treaty and designated Accession No. of KCCM12425P on Jan. 4, 2019. In addition, the 13032/ΔmcbR (pECCG117-Pspl1-serA(Avn)) strain was named CM02-0693 and deposited at the Korean Culture Center of Microorganisms (KCCM) under the Budapest Treaty and designated Accession No. of KCCM12413P on Nov. 27, 2018.

While the present disclosure has been described with reference to the particular illustrative embodiments, it will be understood by those skilled in the art to which the present disclosure pertains that the present disclosure may be embodied in other specific forms without departing from the technical spirit or essential characteristics of the present disclosure. Therefore, the embodiments described above are considered to be illustrative in all respects and not restrictive. Furthermore, the scope of the present disclosure should be defined by the appended claims rather than the detailed description, and it should be understood that all modifications or variations derived from the meanings and scope of the present disclosure and equivalents thereof are included in the scope of the present disclosure.

The invention claimed is:

1. A modified microorganism belonging to the genus *Corynebacterium* or the genus *Escherichia* and producing an L-amino acid or a precursor thereof, wherein a protein comprising the amino acid sequence of SEQ ID NO: 1 and being derived from *Azotobacter vinelandii* is introduced thereinto, and wherein the modified microorganism shows an increased production of the L-amino acid or the precursor thereof compared to a wild-type microorganism belonging to the genus *Corynebacterium* or the genus *Escherichia*.

2. The modified microorganism of claim 1, wherein the microorganism further has i) weakened phosphoserine phosphatase activity, ii) enhanced 3-phosphoserine aminotransferase activity, or iii) both weakened phosphoserine phosphatase activity and enhanced 3-phosphoserine aminotransferase activity.

3. The modified microorganism of claim 1, wherein the microorganism is further modified by enhancement of trp operon, inactivation of tryptophanase (TnaA), inactivation of Mtr membrane protein (Mtr), or any combination thereof.

4. The modified microorganism of claim 1, wherein the microorganism further has enhanced his operon.

5. The modified microorganism of claim 1, wherein the microorganism is further modified by inactivation of McbR (transcriptional regulator; mcbR), enhancement of methionine synthase (meth), enhancement of sulfite reductase [NADPH] hemoprotein beta-component (cysI), or any combination thereof.

6. The modified microorganism of claim 1, wherein the microorganism is *Corynebacterium glutamicum* or *Escherichia coli*.

7. The modified microorganism of claim 1, wherein the L-amino acid or the precursor thereof is selected from the group consisting of L-serine, L-tryptophan, L-histidine, L-methionine, L-cysteine, O-succinylhomoserine, O-acetylhomoserine, L-homoserine, acetylserine, L-cystathionine, L-homocysteine, and O-phosphoserine.

8. A method of producing an L-amino acid or a precursor thereof, the method comprising culturing the modified microorganism according to claim 1 in a medium.

9. The method of claim 8, further comprising recovering an L-amino acid or a precursor thereof from the cultured microorganism or the culture medium.

10. The method of claim 8, wherein the L-amino acid or the precursor thereof is selected from the group consisting of serine, tryptophan, histidine, methionine, L-cysteine, O-succinylhomoserine, O-acetylhomoserine, L-homoserine, acetylserine, L-cystathionine, L-homocysteine, and O-phosphoserine.

11. A composition for producing an L-amino acid or a precursor thereof, wherein the composition comprises the modified microorganism of claim 1.

12. A method of producing an L-amino acid or a precursor thereof using the composition of claim 11.

* * * * *

SEQUENCE LISTING

```
<160> NUMBER OF SEQ ID NOS: 95

<210> SEQ ID NO 1
<211> LENGTH: 409
<212> TYPE: PRT
<213> ORGANISM: Unknown
<220> FEATURE:
<223> OTHER INFORMATION: polypeptide

<400> SEQUENCE: 1

Met Ser Lys Thr Ser Leu Asp Lys Ser Lys Ile Arg Phe Leu Leu Leu
1               5                   10                  15

Glu Gly Val His Gln Thr Ala Leu Asp Thr Leu Lys Ala Ala Gly Tyr
            20                  25                  30

Thr Asn Ile Glu Tyr Leu Thr Gly Ser Leu Pro Glu Glu Gln Leu Lys
        35                  40                  45

Glu Lys Ile Ala Asp Ala His Phe Ile Gly Ile Arg Ser Arg Thr Gln
    50                  55                  60

Leu Thr Glu Glu Val Phe Asp Arg Ala Lys Lys Leu Val Ala Val Gly
65                  70                  75                  80

Cys Phe Cys Ile Gly Thr Asn Gln Val Asp Leu Glu Ala Ala Arg Glu
                85                  90                  95

Arg Gly Ile Ala Val Phe Asn Ala Pro Tyr Ser Asn Thr Arg Ser Val
            100                 105                 110

Ala Glu Leu Val Leu Ala Glu Ala Ile Leu Leu Leu Arg Gly Ile Pro
        115                 120                 125

Glu Lys Asn Ala Ala Ser His Arg Gly Gly Trp Leu Lys Ser Ala Ser
    130                 135                 140

Asn Ser Tyr Glu Ile Arg Gly Lys Lys Leu Gly Ile Ile Gly Tyr Gly
145                 150                 155                 160

Ser Ile Gly Thr Gln Leu Ser Val Leu Ala Glu Ser Leu Gly Met Gln
                165                 170                 175

Val Leu Phe Tyr Asp Val Val Thr Lys Leu Pro Leu Gly Asn Ala Ala
            180                 185                 190

Gln Val Gly Asn Leu Tyr Asp Leu Leu Gly Gln Ala Asp Ile Val Thr
```

-continued

```
                195                 200                 205

Leu His Val Pro Glu Thr Ala Ala Thr Lys Trp Met Ile Gly Glu Lys
    210                 215                 220

Glu Ile Arg Ala Met Lys Lys Gly Ala Ile Leu Leu Asn Ala Ala Arg
225                 230                 235                 240

Gly Thr Val Val Asp Ile Asp Ala Leu Ala Ala Ala Leu Arg Asp Lys
                245                 250                 255

His Leu Asn Gly Ala Ala Ile Asp Val Phe Pro Val Glu Pro Arg Ser
                260                 265                 270

Asn Asn Asp Glu Phe Val Ser Pro Leu Arg Glu Phe Asp Asn Val Ile
                275                 280                 285

Leu Thr Pro His Val Gly Gly Ser Thr Met Glu Ala Gln Ala Asn Ile
                290                 295                 300

Gly Ser Glu Val Ala Glu Lys Leu Val Lys Tyr Ser Asp Asn Gly Thr
305                 310                 315                 320

Ser Val Ser Ser Val Asn Phe Pro Glu Val Ala Leu Pro Ser His Pro
                325                 330                 335

Gly Lys His Arg Leu Leu His Ile His Lys Asn Ile Pro Gly Val Met
                340                 345                 350

Ser Glu Ile Asn Lys Val Phe Ala Glu Asn Gly Ile Asn Ile Ser Gly
                355                 360                 365

Gln Phe Leu Gln Thr Asn Glu Thr Val Gly Tyr Val Val Ile Asp Val
            370                 375                 380

Asp Ala Glu Tyr Ser Glu Met Ala Leu Glu Lys Leu Gln Gln Val Asn
385                 390                 395                 400

Gly Thr Ile Arg Ser Arg Val Leu Phe
                    405

<210> SEQ ID NO 2
<211> LENGTH: 40
<212> TYPE: DNA
<213> ORGANISM: Artificial Sequence
<220> FEATURE:
<223> OTHER INFORMATION: primer

<400> SEQUENCE: 2
aggtcgactc tagaggatcc cccgcttgct gcaactctct                              40

<210> SEQ ID NO 3
<211> LENGTH: 18
<212> TYPE: DNA
<213> ORGANISM: Artificial Sequence
<220> FEATURE:
<223> OTHER INFORMATION: primer

<400> SEQUENCE: 3
gatatctttc ctgtgtga                                                     18

<210> SEQ ID NO 4
<211> LENGTH: 40
<212> TYPE: DNA
<213> ORGANISM: Artificial Sequence
<220> FEATURE:
<223> OTHER INFORMATION: primer

<400> SEQUENCE: 4
aatttcacac aggaaagata tcatgagtaa gacctccctg                              40

<210> SEQ ID NO 5
```

```
<211> LENGTH: 40
<212> TYPE: DNA
<213> ORGANISM: Artificial Sequence
<220> FEATURE:
<223> OTHER INFORMATION: primer

<400> SEQUENCE: 5
gtgaattcga gctcggtacc ctcagaacag aacccgtgag                             40

<210> SEQ ID NO 6
<211> LENGTH: 40
<212> TYPE: DNA
<213> ORGANISM: Artificial Sequence
<220> FEATURE:
<223> OTHER INFORMATION: primer

<400> SEQUENCE: 6
aatttcacac aggaaagata tcatggcaaa ggtatcgctg                             40

<210> SEQ ID NO 7
<211> LENGTH: 40
<212> TYPE: DNA
<213> ORGANISM: Artificial Sequence
<220> FEATURE:
<223> OTHER INFORMATION: primer

<400> SEQUENCE: 7
gtgaattcga gctcggtacc cttagtacag cagacgggcg                             40

<210> SEQ ID NO 8
<211> LENGTH: 40
<212> TYPE: DNA
<213> ORGANISM: Artificial Sequence
<220> FEATURE:
<223> OTHER INFORMATION: primer

<400> SEQUENCE: 8
cctcaccacg ttgcgtctcg agtcagaaca gaacccgtga                             40

<210> SEQ ID NO 9
<211> LENGTH: 20
<212> TYPE: DNA
<213> ORGANISM: Artificial Sequence
<220> FEATURE:
<223> OTHER INFORMATION: primer

<400> SEQUENCE: 9
ctcgagacgc aacgtggtga                                                   20

<210> SEQ ID NO 10
<211> LENGTH: 40
<212> TYPE: DNA
<213> ORGANISM: Artificial Sequence
<220> FEATURE:
<223> OTHER INFORMATION: primer

<400> SEQUENCE: 10
agtgaattcg agctcggtac ccttaaccgt gacggcgttc                             40

<210> SEQ ID NO 11
<211> LENGTH: 40
<212> TYPE: DNA
<213> ORGANISM: Artificial Sequence
<220> FEATURE:
<223> OTHER INFORMATION: primer

<400> SEQUENCE: 11
```

```
ctcaccacgt tgcgtctcga gttagtacag cagacgggcg                          40
```

<210> SEQ ID NO 12
<211> LENGTH: 70
<212> TYPE: DNA
<213> ORGANISM: Artificial Sequence
<220> FEATURE:
<223> OTHER INFORMATION: primer

<400> SEQUENCE: 12

```
tgcaatgcat aacaacgcag tcgcactatt tttcactgga gagaagccct gtgtaggctg    60
gagctgcttc                                                          70
```

<210> SEQ ID NO 13
<211> LENGTH: 70
<212> TYPE: DNA
<213> ORGANISM: Artificial Sequence
<220> FEATURE:
<223> OTHER INFORMATION: primer

<400> SEQUENCE: 13

```
tgcaatgcat aacaacgcag tcgcactatt tttcactgga gagaagccct gtccatatga    60
atatcctcct                                                          70
```

<210> SEQ ID NO 14
<211> LENGTH: 20
<212> TYPE: DNA
<213> ORGANISM: Artificial Sequence
<220> FEATURE:
<223> OTHER INFORMATION: primer

<400> SEQUENCE: 14

```
gggcaggatc tcctgtcatc                                               20
```

<210> SEQ ID NO 15
<211> LENGTH: 20
<212> TYPE: DNA
<213> ORGANISM: Artificial Sequence
<220> FEATURE:
<223> OTHER INFORMATION: primer

<400> SEQUENCE: 15

```
aaatgtcgga taaggcaccg                                               20
```

<210> SEQ ID NO 16
<211> LENGTH: 70
<212> TYPE: DNA
<213> ORGANISM: Artificial Sequence
<220> FEATURE:
<223> OTHER INFORMATION: primer

<400> SEQUENCE: 16

```
tgtaatattc acagggatca ctgtaattaa aataaatgaa ggattatgta gtgtaggctg    60
gagctgcttc                                                          70
```

<210> SEQ ID NO 17
<211> LENGTH: 70
<212> TYPE: DNA
<213> ORGANISM: Artificial Sequence
<220> FEATURE:
<223> OTHER INFORMATION: primer

<400> SEQUENCE: 17

```
tgtagggtaa gagagtggct aacatcctta tagccactct gtagtattaa gtccatatga    60
atatcctcct                                                          70

<210> SEQ ID NO 18
<211> LENGTH: 20
<212> TYPE: DNA
<213> ORGANISM: Artificial Sequence
<220> FEATURE:
<223> OTHER INFORMATION: primer

<400> SEQUENCE: 18
acatccttat agccactctg                                               20

<210> SEQ ID NO 19
<211> LENGTH: 70
<212> TYPE: DNA
<213> ORGANISM: Artificial Sequence
<220> FEATURE:
<223> OTHER INFORMATION: primer

<400> SEQUENCE: 19
tacaaccggg ggaggcattt tgcttccccc gctaacaatg gcgacatatt gtgtaggctg    60
gagctgcttc                                                          70

<210> SEQ ID NO 20
<211> LENGTH: 70
<212> TYPE: DNA
<213> ORGANISM: Artificial Sequence
<220> FEATURE:
<223> OTHER INFORMATION: primer

<400> SEQUENCE: 20
gcattcggtg cacgatgcct gatgcgccac gtcttatcag gcctacaaaa gtccatatga    60
atatcctcct                                                          70

<210> SEQ ID NO 21
<211> LENGTH: 20
<212> TYPE: DNA
<213> ORGANISM: Artificial Sequence
<220> FEATURE:
<223> OTHER INFORMATION: primer

<400> SEQUENCE: 21
aggacggata aggcgttcac                                               20

<210> SEQ ID NO 22
<211> LENGTH: 26
<212> TYPE: DNA
<213> ORGANISM: Artificial Sequence
<220> FEATURE:
<223> OTHER INFORMATION: primer

<400> SEQUENCE: 22
gaattcatgc aaacacaaaa accgac                                        26

<210> SEQ ID NO 23
<211> LENGTH: 25
<212> TYPE: DNA
<213> ORGANISM: Artificial Sequence
<220> FEATURE:
<223> OTHER INFORMATION: primer

<400> SEQUENCE: 23
gaattctcag aaagtctcct gtgca                                         25
```

<210> SEQ ID NO 24
<211> LENGTH: 37
<212> TYPE: DNA
<213> ORGANISM: Artificial Sequence
<220> FEATURE:
<223> OTHER INFORMATION: primer

<400> SEQUENCE: 24
cgcttatcgc gacaattcca ccgcgctttt tcaccag          37

<210> SEQ ID NO 25
<211> LENGTH: 37
<212> TYPE: DNA
<213> ORGANISM: Artificial Sequence
<220> FEATURE:
<223> OTHER INFORMATION: primer

<400> SEQUENCE: 25
ctggtgaaaa agcgcggtgg aattgtcgcg ataagcg          37

<210> SEQ ID NO 26
<211> LENGTH: 35
<212> TYPE: DNA
<213> ORGANISM: Artificial Sequence
<220> FEATURE:
<223> OTHER INFORMATION: primer

<400> SEQUENCE: 26
tcgagctcgg tacccggaag atctagtcgg atacg            35

<210> SEQ ID NO 27
<211> LENGTH: 35
<212> TYPE: DNA
<213> ORGANISM: Artificial Sequence
<220> FEATURE:
<223> OTHER INFORMATION: primer

<400> SEQUENCE: 27 tcgttttag gcctccgact actttgggca atcct             35

<210> SEQ ID NO 28
<211> LENGTH: 32
<212> TYPE: DNA
<213> ORGANISM: Artificial Sequence
<220> FEATURE:
<223> OTHER INFORMATION: primer

<400> SEQUENCE: 28
tctgttctga ttagagatcc atttgcttga ac               32

<210> SEQ ID NO 29
<211> LENGTH: 35
<212> TYPE: DNA
<213> ORGANISM: Artificial Sequence
<220> FEATURE:
<223> OTHER INFORMATION: primer

<400> SEQUENCE: 29
ctctagagga tcccctcacc cagctcaaag ctgat            35

<210> SEQ ID NO 30
<211> LENGTH: 35
<212> TYPE: DNA
<213> ORGANISM: Artificial Sequence
<220> FEATURE:

<223> OTHER INFORMATION: primer

<400> SEQUENCE: 30
tgcccaaagt agtcggaggc ctaaaaacga ccgag                               35

<210> SEQ ID NO 31
<211> LENGTH: 28
<212> TYPE: DNA
<213> ORGANISM: Artificial Sequence
<220> FEATURE:
<223> OTHER INFORMATION: primer

<400> SEQUENCE: 31
tcttactcat gttgtgtctc ctctaaag                                       28

<210> SEQ ID NO 32
<211> LENGTH: 28
<212> TYPE: DNA
<213> ORGANISM: Artificial Sequence
<220> FEATURE:
<223> OTHER INFORMATION: primer

<400> SEQUENCE: 32
gagacacaac atgagtaaga cctccctg                                       28

<210> SEQ ID NO 33
<211> LENGTH: 29
<212> TYPE: DNA
<213> ORGANISM: Artificial Sequence
<220> FEATURE:
<223> OTHER INFORMATION: primer

<400> SEQUENCE: 33
ggatctctaa tcagaacaga acccgtgag                                      29

<210> SEQ ID NO 34
<211> LENGTH: 20
<212> TYPE: DNA
<213> ORGANISM: Artificial Sequence
<220> FEATURE:
<223> OTHER INFORMATION: primer

<400> SEQUENCE: 34
accaagagtt cgaagaccag                                                20

<210> SEQ ID NO 35
<211> LENGTH: 20
<212> TYPE: DNA
<213> ORGANISM: Artificial Sequence
<220> FEATURE:
<223> OTHER INFORMATION: primer

<400> SEQUENCE: 35
ttcagtggct tccacatcgc                                                20

<210> SEQ ID NO 36
<211> LENGTH: 35
<212> TYPE: DNA
<213> ORGANISM: Artificial Sequence
<220> FEATURE:
<223> OTHER INFORMATION: primer

<400> SEQUENCE: 36
tcgagctcgg tacccatcgc catctacgtt gctgg                               35

```
<210> SEQ ID NO 37
<211> LENGTH: 45
<212> TYPE: DNA
<213> ORGANISM: Artificial Sequence
<220> FEATURE:
<223> OTHER INFORMATION: primer

<400> SEQUENCE: 37
gtgccagtgg ggatacctgt gggtgggata agcctggggt tactg            45

<210> SEQ ID NO 38
<211> LENGTH: 45
<212> TYPE: DNA
<213> ORGANISM: Artificial Sequence
<220> FEATURE:
<223> OTHER INFORMATION: primer

<400> SEQUENCE: 38
aaccccaggc ttatcccacc cacaggtatc cccactggca cgcga            45

<210> SEQ ID NO 39
<211> LENGTH: 35
<212> TYPE: DNA
<213> ORGANISM: Artificial Sequence
<220> FEATURE:
<223> OTHER INFORMATION: primer

<400> SEQUENCE: 39
ctctagagga tccccgggac gtggttgatg gtggt                       35

<210> SEQ ID NO 40
<211> LENGTH: 20
<212> TYPE: DNA
<213> ORGANISM: Artificial Sequence
<220> FEATURE:
<223> OTHER INFORMATION: primer

<400> SEQUENCE: 40
atggaaatcc tcgccgaagc                                        20

<210> SEQ ID NO 41
<211> LENGTH: 20
<212> TYPE: DNA
<213> ORGANISM: Artificial Sequence
<220> FEATURE:
<223> OTHER INFORMATION: primer

<400> SEQUENCE: 41
atcgatgggg aactgatcca                                        20

<210> SEQ ID NO 42
<211> LENGTH: 35
<212> TYPE: DNA
<213> ORGANISM: Artificial Sequence
<220> FEATURE:
<223> OTHER INFORMATION: primer

<400> SEQUENCE: 42
tcgagctcgg tacccatcgc catctacgtt gctgg                       35

<210> SEQ ID NO 43
<211> LENGTH: 35
<212> TYPE: DNA
<213> ORGANISM: Artificial Sequence
<220> FEATURE:
<223> OTHER INFORMATION: primer
```

```
<400> SEQUENCE: 43
gagtctagaa gtactcgaga tgctgacctc gtttc                                 35

<210> SEQ ID NO 44
<211> LENGTH: 35
<212> TYPE: DNA
<213> ORGANISM: Artificial Sequence
<220> FEATURE:
<223> OTHER INFORMATION: primer

<400> SEQUENCE: 44
agcatctcga gtacttctag actcgcacga aaaag                                 35

<210> SEQ ID NO 45
<211> LENGTH: 35
<212> TYPE: DNA
<213> ORGANISM: Artificial Sequence
<220> FEATURE:
<223> OTHER INFORMATION: primer

<400> SEQUENCE: 45
ctctagagga tcccctttgg gcagagctca aattc                                 35

<210> SEQ ID NO 46
<211> LENGTH: 20
<212> TYPE: DNA
<213> ORGANISM: Artificial Sequence
<220> FEATURE:
<223> OTHER INFORMATION: primer

<400> SEQUENCE: 46
agtttcgtaa cccaccttgc                                                  20

<210> SEQ ID NO 47
<211> LENGTH: 20
<212> TYPE: DNA
<213> ORGANISM: Artificial Sequence
<220> FEATURE:
<223> OTHER INFORMATION: primer

<400> SEQUENCE: 47
cgcttctcaa tctgatgaga                                                  20

<210> SEQ ID NO 48
<211> LENGTH: 35
<212> TYPE: DNA
<213> ORGANISM: Artificial Sequence
<220> FEATURE:
<223> OTHER INFORMATION: primer

<400> SEQUENCE: 48
gtcagcatct cgagtgctcc ttagggagcc atctt                                 35

<210> SEQ ID NO 49
<211> LENGTH: 35
<212> TYPE: DNA
<213> ORGANISM: Artificial Sequence
<220> FEATURE:
<223> OTHER INFORMATION: primer

<400> SEQUENCE: 49
gtcaaatgtc ttcacatgtg tgcacctttc gatct                                 35

<210> SEQ ID NO 50
<211> LENGTH: 35
```

```
<212> TYPE: DNA
<213> ORGANISM: Artificial Sequence
<220> FEATURE:
<223> OTHER INFORMATION: primer

<400> SEQUENCE: 50
gaaaggtgca cacatgtgaa gacatttgac tcgct                              35

<210> SEQ ID NO 51
<211> LENGTH: 35
<212> TYPE: DNA
<213> ORGANISM: Artificial Sequence
<220> FEATURE:
<223> OTHER INFORMATION: primer

<400> SEQUENCE: 51
tcgtttttag gcctcctaga tgcgggcgat gcgga                              35

<210> SEQ ID NO 52
<211> LENGTH: 35
<212> TYPE: DNA
<213> ORGANISM: Artificial Sequence
<220> FEATURE:
<223> OTHER INFORMATION: primer

<400> SEQUENCE: 52
atcgcccgca tctaggaggc ctaaaaacga ccgag                              35

<210> SEQ ID NO 53
<211> LENGTH: 35
<212> TYPE: DNA
<213> ORGANISM: Artificial Sequence
<220> FEATURE:
<223> OTHER INFORMATION: primer

<400> SEQUENCE: 53
gacagttttg gtcatgttgt gtctcctcta aagat                              35

<210> SEQ ID NO 54
<211> LENGTH: 35
<212> TYPE: DNA
<213> ORGANISM: Artificial Sequence
<220> FEATURE:
<223> OTHER INFORMATION: primer

<400> SEQUENCE: 54
tagaggagac acaacatgac caaaactgtc gccct                              35

<210> SEQ ID NO 55
<211> LENGTH: 35
<212> TYPE: DNA
<213> ORGANISM: Artificial Sequence
<220> FEATURE:
<223> OTHER INFORMATION: primer

<400> SEQUENCE: 55
tgaagcgccg gtaccgctta cagcaaaacg tcatt                              35

<210> SEQ ID NO 56
<211> LENGTH: 35
<212> TYPE: DNA
<213> ORGANISM: Artificial Sequence
<220> FEATURE:
<223> OTHER INFORMATION: primer

<400> SEQUENCE: 56
```
cgttttgctg taagcggtac cggcgcttca tgtca                35

<210> SEQ ID NO 57
<211> LENGTH: 35
<212> TYPE: DNA
<213> ORGANISM: Artificial Sequence
<220> FEATURE:
<223> OTHER INFORMATION: primer

<400> SEQUENCE: 57
agtgacattc aacattgttt tgatctcctc caata                35

<210> SEQ ID NO 58
<211> LENGTH: 35
<212> TYPE: DNA
<213> ORGANISM: Artificial Sequence
<220> FEATURE:
<223> OTHER INFORMATION: primer

<400> SEQUENCE: 58
gaggagatca aacaatgtt gaatgtcact gacct                35

<210> SEQ ID NO 59
<211> LENGTH: 35
<212> TYPE: DNA
<213> ORGANISM: Artificial Sequence
<220> FEATURE:
<223> OTHER INFORMATION: primer

<400> SEQUENCE: 59
cgctgggatg tttctctaga gcgctccctt agtgg                35

<210> SEQ ID NO 60
<211> LENGTH: 35
<212> TYPE: DNA
<213> ORGANISM: Artificial Sequence
<220> FEATURE:
<223> OTHER INFORMATION: primer

<400> SEQUENCE: 60
aagggagcgc tctagagaaa catcccagcg ctact                35

<210> SEQ ID NO 61
<211> LENGTH: 35
<212> TYPE: DNA
<213> ORGANISM: Artificial Sequence
<220> FEATURE:
<223> OTHER INFORMATION: primer

<400> SEQUENCE: 61
agtcatgcct tccatgagtg tttcctttcg ttggg                35

<210> SEQ ID NO 62
<211> LENGTH: 35
<212> TYPE: DNA
<213> ORGANISM: Artificial Sequence
<220> FEATURE:
<223> OTHER INFORMATION: primer

<400> SEQUENCE: 62
cgaaaggaaa cactcatgga aggcatgact aatcc                35

<210> SEQ ID NO 63
<211> LENGTH: 35
<212> TYPE: DNA
<213> ORGANISM: Artificial Sequence

```
<220> FEATURE:
<223> OTHER INFORMATION: primer

<400> SEQUENCE: 63
cgagtctaga agtgcctatt ttaaacgatc cagcg                              35

<210> SEQ ID NO 64
<211> LENGTH: 34
<212> TYPE: DNA
<213> ORGANISM: Artificial Sequence
<220> FEATURE:
<223> OTHER INFORMATION: primer

<400> SEQUENCE: 64
tcgagctcgg tacccctgcc tggtttgtct tgta                               34

<210> SEQ ID NO 65
<211> LENGTH: 35
<212> TYPE: DNA
<213> ORGANISM: Artificial Sequence
<220> FEATURE:
<223> OTHER INFORMATION: primer

<400> SEQUENCE: 65
cggaaaatga agaaagttcg gccacgtcct ttcgg                              35

<210> SEQ ID NO 66
<211> LENGTH: 35
<212> TYPE: DNA
<213> ORGANISM: Artificial Sequence
<220> FEATURE:
<223> OTHER INFORMATION: primer

<400> SEQUENCE: 66
aggacgtggc cgaactttct tcattttccg aaggg                              35

<210> SEQ ID NO 67
<211> LENGTH: 35
<212> TYPE: DNA
<213> ORGANISM: Artificial Sequence
<220> FEATURE:
<223> OTHER INFORMATION: primer

<400> SEQUENCE: 67
ctctagagga tccccgtttc gatgcccact gagca                              35

<210> SEQ ID NO 68
<211> LENGTH: 35
<212> TYPE: DNA
<213> ORGANISM: Artificial Sequence
<220> FEATURE:
<223> OTHER INFORMATION: primer

<400> SEQUENCE: 68
acccggggat cctctagaat gtttgtgatg cgcag                              35

<210> SEQ ID NO 69
<211> LENGTH: 35
<212> TYPE: DNA
<213> ORGANISM: Artificial Sequence
<220> FEATURE:
<223> OTHER INFORMATION: primer

<400> SEQUENCE: 69
gtcagagagt acttacgctg atcgggaggg aaagc                              35
```

<210> SEQ ID NO 70
<211> LENGTH: 35
<212> TYPE: DNA
<213> ORGANISM: Artificial Sequence
<220> FEATURE:
<223> OTHER INFORMATION: primer

<400> SEQUENCE: 70
atcagcgtaa gtactctctg actagcgtca ccctc                          35

<210> SEQ ID NO 71
<211> LENGTH: 35
<212> TYPE: DNA
<213> ORGANISM: Artificial Sequence
<220> FEATURE:
<223> OTHER INFORMATION: primer

<400> SEQUENCE: 71
ctgcaggtcg actctagaaa agggattgga gtgtt                          35

<210> SEQ ID NO 72
<211> LENGTH: 35
<212> TYPE: DNA
<213> ORGANISM: Artificial Sequence
<220> FEATURE:
<223> OTHER INFORMATION: primer

<400> SEQUENCE: 72
caacgaaagg aaacaatgtc tacttcagtt acttc                          35

<210> SEQ ID NO 73
<211> LENGTH: 34
<212> TYPE: DNA
<213> ORGANISM: Artificial Sequence
<220> FEATURE:
<223> OTHER INFORMATION: primer

<400> SEQUENCE: 73
tcgagctcgg tacccctgcg acagcatgga actc                           34

<210> SEQ ID NO 74
<211> LENGTH: 35
<212> TYPE: DNA
<213> ORGANISM: Artificial Sequence
<220> FEATURE:
<223> OTHER INFORMATION: primer

<400> SEQUENCE: 74
atcaaaacag atatcatgac aacaaccacc ggaag                          35

<210> SEQ ID NO 75
<211> LENGTH: 35
<212> TYPE: DNA
<213> ORGANISM: Artificial Sequence
<220> FEATURE:
<223> OTHER INFORMATION: primer

<400> SEQUENCE: 75
cgctagtcag agagttcaca ccaaatcttc ctcag                          35

<210> SEQ ID NO 76
<211> LENGTH: 35
<212> TYPE: DNA
<213> ORGANISM: Artificial Sequence
<220> FEATURE:
<223> OTHER INFORMATION: primer -continued

<400> SEQUENCE: 76
ccgatcagcg taagtagaaa catcccagcg ctact                                  35

<210> SEQ ID NO 77
<211> LENGTH: 35
<212> TYPE: DNA
<213> ORGANISM: Artificial Sequence
<220> FEATURE:
<223> OTHER INFORMATION: primer

<400> SEQUENCE: 77
aactgaagta gacattgttt cctttcgttg ggtac                                  35

<210> SEQ ID NO 78
<211> LENGTH: 35
<212> TYPE: DNA
<213> ORGANISM: Artificial Sequence
<220> FEATURE:
<223> OTHER INFORMATION: primer

<400> SEQUENCE: 78
tactttaacg tctaaggtac cggcgcttca tgtca                                  35

<210> SEQ ID NO 79
<211> LENGTH: 35
<212> TYPE: DNA
<213> ORGANISM: Artificial Sequence
<220> FEATURE:
<223> OTHER INFORMATION: primer

<400> SEQUENCE: 79
ggtggttgtt gtcatgatat ctgttttgat ctcct                                  35

<210> SEQ ID NO 80
<211> LENGTH: 20
<212> TYPE: DNA
<213> ORGANISM: Artificial Sequence
<220> FEATURE:
<223> OTHER INFORMATION: primer

<400> SEQUENCE: 80
aatctggatt tccgccaggt                                                   20

<210> SEQ ID NO 81
<211> LENGTH: 20
<212> TYPE: DNA
<213> ORGANISM: Artificial Sequence
<220> FEATURE:
<223> OTHER INFORMATION: primer

<400> SEQUENCE: 81
cttcctaact cctgaggaag                                                   20

<210> SEQ ID NO 82
<211> LENGTH: 20
<212> TYPE: DNA
<213> ORGANISM: Artificial Sequence
<220> FEATURE:
<223> OTHER INFORMATION: primer

<400> SEQUENCE: 82
atccccatcg gcatctttat                                                   20

<210> SEQ ID NO 83

<210> SEQ ID NO 83
<211> LENGTH: 20
<212> TYPE: DNA
<213> ORGANISM: Artificial Sequence
<220> FEATURE:
<223> OTHER INFORMATION: primer

<400> SEQUENCE: 83
cgatcacact gggctgatct                                                    20

<210> SEQ ID NO 84
<211> LENGTH: 35
<212> TYPE: DNA
<213> ORGANISM: Artificial Sequence
<220> FEATURE:
<223> OTHER INFORMATION: primer

<400> SEQUENCE: 84
atcgataagc ttgatggtac cggcgcttca tgtca                                   35

<210> SEQ ID NO 85
<211> LENGTH: 35
<212> TYPE: DNA
<213> ORGANISM: Artificial Sequence
<220> FEATURE:
<223> OTHER INFORMATION: primer

<400> SEQUENCE: 85
ggaggtctta ctcatgatat ctgttttgat ctcct                                   35

<210> SEQ ID NO 86
<211> LENGTH: 35
<212> TYPE: DNA
<213> ORGANISM: Artificial Sequence
<220> FEATURE:
<223> OTHER INFORMATION: primer

<400> SEQUENCE: 86
atcaaaacag atatcatgag taagacctcc ctgga                                   35

<210> SEQ ID NO 87
<211> LENGTH: 35
<212> TYPE: DNA
<213> ORGANISM: Artificial Sequence
<220> FEATURE:
<223> OTHER INFORMATION: primer

<400> SEQUENCE: 87
ctgcaggaat tcgattcaga acagaacccg tgagc                                   35

<210> SEQ ID NO 88
<211> LENGTH: 281
<212> TYPE: PRT
<213> ORGANISM: Unknown
<220> FEATURE:
<223> OTHER INFORMATION: polypeptide

<400> SEQUENCE: 88

Met Leu Lys Ile Ala Val Pro Asn Lys Gly Ser Leu Ser Glu Arg Ala
1               5                   10                  15

Met Glu Ile Leu Ala Glu Ala Gly Tyr Ala Gly Arg Gly Asp Ser Lys
            20                  25                  30

Ser Leu Asn Val Phe Asp Glu Ala Asn Asn Val Glu Phe Phe Phe Leu
        35                  40                  45

Arg Pro Lys Asp Ile Ala Ile Tyr Val Ala Gly Gly Gln Leu Asp Leu
    50                  55                  60

Gly Ile Thr Gly Arg Asp Leu Ala Arg Asp Ser Gln Ala Asp Val His
65                  70                  75                  80

Glu Val Leu Ser Leu Gly Phe Gly Ser Ser Thr Phe Arg Tyr Ala Ala
            85                  90                  95

Pro Ala Asp Glu Glu Trp Ser Ile Glu Lys Leu Asp Gly Lys Arg Ile
        100                 105                 110

Ala Thr Ser Tyr Pro Asn Leu Val Arg Asp Leu Ala Ala Arg Gly
    115                 120                 125

Leu Ser Ala Glu Val Leu Arg Leu Asp Gly Ala Val Glu Val Ser Ile
130                 135                 140

Lys Leu Gly Val Ala Asp Ala Ile Ala Asp Val Val Ser Thr Gly Arg
145                 150                 155                 160

Thr Leu Arg Gln Gln Gly Leu Ala Pro Phe Gly Glu Val Leu Cys Thr
            165                 170                 175

Ser Glu Ala Val Ile Val Gly Arg Lys Asp Glu Lys Val Thr Pro Glu
        180                 185                 190

Gln Gln Ile Leu Leu Arg Arg Ile Gln Gly Ile Leu His Ala Gln Asn
    195                 200                 205

Phe Leu Met Leu Asp Tyr Asn Val Asp Arg Asp Asn Leu Asp Ala Ala
210                 215                 220

Thr Ala Val Thr Pro Gly Leu Ser His Pro Gln Val Ser Pro Leu Ala
225                 230                 235                 240

Arg Asp Asn Trp Val Ala Val Arg Ala Met Val Pro Arg Arg Ser Ala
            245                 250                 255

Asn Ala Ile Met Asp Lys Leu Ala Gly Leu Gly Ala Glu Ala Ile Leu
        260                 265                 270

Ala Ser Glu Ile Arg Ile Ala Arg Ile
    275                 280

<210> SEQ ID NO 89
<211> LENGTH: 10676
<212> TYPE: DNA
<213> ORGANISM: Unknown
<220> FEATURE:
<223> OTHER INFORMATION: polynucleotide

<400> SEQUENCE: 89
gctccttagg gagccatctt ttggggtgcg gagcgcgatc cggtgtctga ccacggtgcc    60
ccatgcgatt gttaatgccg atgctagggc gaaaagcacg gcgagcagat tgctttgcac   120
ttgattcagg gtagttgact aaagagttgc tcgcgaagta gcacctgtca cttttgtctc   180
aaatattaaa tcgaatatca atatatggtc tgtttattgg aacgcgtccc agtggctgag   240
acgcatccgc taaagcccca ggaaccctgt gcagaaagaa acactcctc tggctaggta    300 gacacagttt attgtggtag agttgagcgg gtaactgtca gcacgtagat cgaaaggtgc   360
acacatgtga agacatttga ctcgctgtac gaagaacttc ttaaccgtgc tcagacccgc   420 cctgaaggt ctggaaccgt ggccgccttg ataaaggca tccatcatct aggtaagaag     480
gtcatcgaag aagccggaga ggtctggatt gcagccgagt atgagaccga tgaagagcta   540
gccggagaaa tctcccagct catttattgg acccaggtca tcatggttgc tcgcggcctg   600
aagccagaag atatctacaa gaacctgtag gagttttaaa gcaatcatgt tgaaaatcgc   660
tgtcccaaac aaaggctcgc tgtccgagcg cgccatggaa atcctcgccg aagcaggcta   720
cgcaggccgt ggagattcca aatccctcaa cgttttgat gaagcaaaca acgttgaatt    780

```
cttcttcctt cgccctaaag atatcgccat ctacgttgct ggtggccagc tcgatttggg    840
tatcaccggc cgcgaccttg ctcgcgattc ccaggctgat gtccacgaag ttctttccct    900
cggcttcggt tcctccactt tccgttacgc agcaccagct gatgaagagt ggagcatcga    960
aaagctcgac ggcaagcgca tcgctacctc ttaccccaac cttgttcgcg atgacctcgc   1020
agcacgtggg ctttccgctg aggtgctccg cctcgacggt gcagtagagg tatccatcaa   1080
gcttggtgtc gcagatgcca tcgccgatgt tgtatccacc ggccgcacgc tgcgtcagca   1140
aggtcttgca cctttcggcg aggttctgtg cacctctgag gctgtcattg ttggccgcaa   1200
ggatgaaaag gtcaccccag agcagcagat cctgcttcgc cgcatccagg aattttgca    1260
cgcgcagaac ttcctcatgc tggattacaa cgtcgaccgc gacaacctgg acgctgccac   1320
tgcagtaacc ccaggcttat cccacccaca ggtatcccca ctggcacgcg acaactgggt   1380
tgctgtacgc gccatggtgc cacgcaggtc agctaacgcc atcatggata gcttgctgg    1440
actcggcgct gaagccatcc tggcttctga atccgcatc gcccgcatct aggaggccta    1500
aaaacgaccg agcctattgg gattaccatt gaagccagtg tgagttgcat cacattggct   1560
tcaaatctga gactttaatt tgtggattca cggggggtgta atgtagttca taattaaccc   1620
cattcggggg agcagatcgt agtgcgaacg atttcaggtt cgttccctgc aaaaactatt   1680
tagcgcaagt gttggaaatg ccccccgtttg gggtcaatgt ccatttttga atgtgtctgt   1740
atgattttgc atctgctgcg aaatcttgt ttccccgcta agttgagga caggttgaca    1800
cggagttgac tcgacgaatt atccaatgtg agtaggtttg gtgcgtgagt tggaaaaatt   1860
cgccatactc gcccttgggt tctgtcagct caagaattct tgagtgaccg atgctctgat   1920
tgacctaact gcttgacaca ttgcatttcc tacaatcttt agaggagaca caacatgacc   1980
aaaactgtcg cccttctcga ctacggatct ggaaaccttc gttctgctca acgcgcacta   2040
gagcgtgccg gtgcagaagt tatcgtgagc tccgatccag aagtttgcac caacgctgat   2100
ggcctcctag ttcctggagt gggcgcattt gatgcctgca tgaagggttt gaaaaacgtc   2160
ttcggacatc gcattatcgg acagcgtctt gctggtggac gtccagtgat gggtatttgt   2220
gtgggcatgc agatcctgtt cgatgaaggc gatgagcacg gcattaagtc agctggttgc   2280
ggcgagtggc ctggcaaagt ggaacgcctc caagcggaga tcctgcctca catggggtgg   2340
aacacacttg aaatgcctac caactcacca atgtttgagg gaatttcacc tgatgagcgt   2400
ttctacttcg tgcactccta tggtgtgcgc aagtggacgt tggaaaccga cgatctgacc   2460
acgcctccag aggttgtgtg ggcgaagcac gaaaatgatc gttttgtggc agctgtggaa   2520
aacggcacgc tgtgggctac tcaattccac ccagaaaaat caggtgacgc aggcgcacag   2580
ctactgcgaa actggatcaa ctacatctaa cagataggat caatattcat gaccttcact   2640
attcttcctg cagtcgatgt agttaacgga caagcagttc gcctagatca gggcgaggcc   2700
ggcactgaaa agtcttatgg caccccttg gaatccgcac tgaagtggca ggagcagggt   2760
gcaaagtggt tgcactttgt ggacctggac gcagcgttca accgtggttc caaccatgag   2820
atgatggcgg aaattgtcgg caagctcgat gttgatgtgg agctcactgg cggtatccgt   2880
gatgatgagt ctctgagcg cgcgctggca accggtgcac gtcgtgtaaa cattggtacc   2940
gctgctctgg agaagccaga gtggattgct tctgcgattc aacgctatgg cgagaagatt   3000
gctgtcgata tcgctgtgcg tttggaagat ggtgaatggc gcaccgtgg aaacggttgg   3060
gtctccgatg tggcgatct gtgggaagtt ctcgagcgtt tggattccca aggttgtgca   3120
cgtttcgtgg ttaccgatgt gtccaaggac ggcaccttga gtggtccaaa tgttgagctg   3180
```

```
ctgcgtgagg ttgctgcagc tacagacgca cctatcgtgg catctggtgg aatttctgtt    3240
ttggaagatg ttttggaact agccaagtac caggatgagg cattgattc cgtcatcatt     3300
ggcaaggcac tttatgagca caagttcacc ctcgaagagg ctttggctgc agtagaaaag    3360
ctcggttaat acatggatgc tcgtgggatg ttggccattg cggaggccgt tgtagatgat    3420
gccgaagccc tcttcatgca gggcttcgga gctgcacctg cccatatgaa atccccgggg    3480
gattttgcca cggaagtgga tatggccatc gaatcccata tgcgttcgat gctgaacatg    3540
atgacaggca ttgctgtcat cggtgaagaa ggtggcggtg cgacctccgg cacgcgctgg    3600
gtgattgatc ccatcgacgg caccgccaac ttcgcggcgt ccaacccgat gagcgcgatc    3660
ctggtgtctt tgcttgtcga cgaccagccc gtcctgggta ttacctccat gcccatgctg    3720
ggtaaacgcc tcaccgcttt tgaaggttca ccgctgatga tcaacggtga acctcaggaa    3780
ccattgcaag aacaatccag tttggtatcc acattggtt ttagttccat ggcctccccg     3840
cgcaatacag cgtttcctgt ggagttgcgt cgggatcttc tgaccgagct cacggaatcg    3900
tatcttcgtc cccgcattac aggttcggtg ggtgttgatc tcgcgttcac tgcgcagggc    3960
attttggag catgcgtatc gtttagtcct catgtttggg acaattccgc aggcgtgatg     4020
ttgatgcgcg ctgctggtgc acaagttact gacaccgaag gccatccgtg gcaccaggt    4080
aggggagtcg tggccggaac aaaaagggct cacgatgtgc tgttaagtaa gattgaaaaa    4140
gttcggttga tgcatgcaga tgcaggtaat gaccagtcgt taaatgagga gtacaagtaa    4200
aatgggcgtg gcaattcgag ttattccttg cctggacgtg gacaacggcc gggttgttaa    4260
aggcgtgaac tttgaaaacc tccgcgatgc tggcgatcct gtggagttgg caaagcgcta    4320
tgacgaggaa ggggcagatg agctgacctt cctggatgtc accgcctcga agcatggtcg    4380
cggcaccatg ctggatgttg ttcgacgcac cgctgatcag gtgttcatcc ctctgactgt    4440
cggtggcggc gtgcgcagcg aagaagatgt tgatcaattg ctgcgcgctg cgccgacaa    4500
ggtttcggtg aacacgtctg cgattgcccg tccagaactg ctgtcagagc tgtccaagcg    4560
ttttggtgct cagtgcatcg tgttgtctgt ggatgccagg cgcgttcctg aaggtggaac    4620
tcctcagcca tctggttttg aagtcaccac ccacggcggt tccaagtccg cagaacttga    4680
tgcaatcgag tgggcaaagc gcggcgaaga gctgggcgtt ggcgaaattc tgctcaactc    4740
catgacggc gacggcacca aaaacggctt tgacctagag ctgctggaaa aagttcgcgc     4800
agccgtatcc attcctgtaa tcgcctccgg cggcgctggc aaggcggagc atttcccacc    4860
agctgttgca gctggcgcca acgcagtgct tgccgcgacc attttccact tccgcgaagt    4920
aaccatcgcc gaagtaaagg gagccattaa agatgcagga tttgaggtgc ggaaatgagt    4980
gacaatccac aagagtatga gctggattgg gacgtcgaaa agcgattaaa gcttaacgac    5040
gccggcctgg tgccggcaat cgtccaggcc gacgggacca acgaggtcct catgatggcc    5100
tggatggata cccacgcgct agcctatact ttggcgaccc gccgtggaac ctattttcct    5160
aggtcccgca acgagtactg gatcaagggc ctgacctctg gaaacgtcca agaagtcacc    5220
ggacttgccc tcgactgcga cggcgacacc gtccttctga ccgtgaaaca aaccggcggt    5280
gcgtgccaca ctggtgccca cacatgtttc gacaatgacg ttttgctgta gcggtaccg    5340
gcgcttcatg tcaacaatct ttaacgtttt caagttcaca agtcgtgttc aaatggtgac    5400
aagattggac actgtgctga attggcacca agccctcata aatgatagat ctaaatcgaa    5460
tatcaatata tggtctgttt attggaacgc gtcccagtgg ctgagacgca tccgctaaag    5520
```

```
ccccaggaac cctgtgcaga aagaacaaat aatcgtgaat tttggcagca acagcggggc    5580
ctggtataat tgaaaacgtg caaaagcata gattattgga ggagatcaaa acaatgttga    5640
atgtcactga cctgcgaggt caaacaccat ccaagagcga catccgacgt gctttgccac    5700
gtggtggcac tgacgtgtgg tctgtgcttc ccatagtgca gcctgttgta gaagatgtcc    5760
aaaaccgcgg cgctgaagct gctttggatt acggcgagaa gttcgaccat attcgccccg    5820
cctcggtgcg ggtgccagct gaggttattg ctgcagcaga aaacaccttg gatccgttgg    5880
tgcgtgaatc gattgaagag tcgattcgtc gcgtccgcaa ggttcacgct gagcaaaagc    5940
catccgagca caccactgaa ctttcaccag gtggcaccgt cactgagcgt ttcatgccga    6000
ttgatcgcgt gggactgtac gttccaggcg gcaatgcggt gtacccatca agcgtgatta    6060
tgaatactgt cccagctcaa gaggctggtg tgaactccct tgtggttgcg tcgcctcctc    6120
aggctgagca cggtggctgg cctcacccca ccattttggc ggcgtgttcc atcttgggtg    6180
ttgatgaggt gtgggctgtc ggcggcggtc aggccgtggc gttgctggct tatggtgatg    6240
acgctgcagg tctcgagcct gtggatatga tcactggacc tggcaatatc tttgtcaccg    6300
ctgcgaagcg cctggtcagg ggagtggtag gtactgattc tgaggctggc cctacagaaa    6360
tcgctgtgct tgctgatgcc tctgccaacg ccgtcaacgt tgcctacgat ctgatcagcc    6420
aagcagaaca cgatgtcatg gctgcgtccg tgctcatcac tgactccgag cagcttgcca    6480
aggacgtaaa cagggaaatc gaggcgcgtt actcaatcac gcgcaacgcc gagcgcgtcg    6540
cagaagcttt gcgcggggcc cagagtggca tcgtgcttgt cgacgacatt ccgtgggta    6600
tccaagtagc cgatcaatac gcagcggaac acctggaaat ccacactgag aacgcgcgcg    6660
ccgtagcaga gcagatcacc aacgcgggtg cgatcttcgt gggcgatttc tcaccagtac    6720
cactgggtga ttactccgca ggatccaacc acgtgctgcc aacctctgga tccgctcgtt    6780
tctccgcagg tctatccacg cacacgttcc ttcgcccagt caacctcatt gaatacgatg    6840
aggctgctct gaaggacgtc tcgcaggttg tcatcaactt tgccaacgcc gaagatcttc    6900
cagcgcacgg cgaagcaatc cgtgcacgct ttgaaaacct ccccaccacc gacgaggcct    6960
aagaaaaatg accaaaatta ctttgagcga tttgccattg cgtgaagaac tgcgcggtga    7020
gcacgcttac ggcgcacccc agctcaacgt tgatattcgc ctcaacacca acgaaaaccc    7080
ttacccaccg tcagaggcat tggtcgctga cttggttgcc accgtggata agatcgccac    7140
cgagctgaac cgctacccag agcgcgatgc tgtggaactg cgtgatgagt tggctgcgta    7200
catcaccaag caaaccggcg tggctgtcac cagggataac ctgtgggctg ccaatggttc    7260
caatgaaatt ctgcagcagc tgctgcaggc ttttggtgga cctggacgca ccgcgttggg    7320
attccaaccc agctattcca tgcacccaat tttggctaaa ggcacccaca ctgaattcat    7380
tgcggtgtcc cgaggtgctg atttccgcat cgatatggat gtggcgctgg aagaaattcg    7440
tgcaaagcag cctgacattg tttttgtcac caccccgaac aacccgaccg gtgatgtgac    7500
ctcgctggac gatgttgagc gcatcatcaa cgttgcccca ggcatcgtga tcgtggatga    7560
agcttatgcg gaattctccc catcaccttc agcaaccact cttctggaga agtacccaac    7620
caagctggtg gtgtcccgca ccatgagtaa ggcttttgat ttcgcaggtg gacgcctcgg    7680
ctacttcgtg gccaacccag cgtttatcga cgccgtgatg ctagtccgcc ttccgtatca    7740
tctttcagcg ctgagccaag cagccgcaat cgtagcgctg cgtcactccg ctgacacgct    7800
gggaaccgtc gaaaagctct ctgtagagcg tgttcgcgtg gcagcacgct tggaggaact    7860
gggctacgct gtggttccaa gtgagtccaa cttttgtgttc tttggagatt ctccgatca    7920
```

```
gcacgcggca tggcaggcat ttttggatag gggagtgctc atccgcgatg tgggaatcgc   7980
tgggcacttg cgcactacca ttggtgtgcc tgaggaaaat gatgcgtttt tggacgcagc   8040
tgcagagatc atcaagctga acctgtaaga gagaagaatt tttcatgact gtcgcaccaa   8100
gaattggtac cgcaacccgc accaccagcg aatccgacat caccgtcgag atcaacctgg   8160
acggcaccgg caaagtagat atcgataccg gcctgccatt tttcgaccac atgctcactg   8220
cattcggcgt gcacggcagt tttgatctga agtccatgc caagggcgac atcgagatcg   8280
acgcacacca caccgtggaa gataccgcca tcgtgctcgg ccaagcactc cttgacgcta   8340
ttggcgacaa gaaaggcatc cgccgtttcg catcctgcca gctgcccatg gatgaggcat   8400
tagtggagtc cgtggtggat atctccggtc gcccatactt cgtgatctcc ggcgaaccag   8460
accacatgat cacctccgtg atcggtggac actacgcaac cgtgatcaac gagcacttct   8520
ttgaaaccct cgcgctcaac tcccgaatca ccctccacgt gatctgccac tacggccgcg   8580
accctcacca catcaccgaa gcagagtaca aggctgttgc ccgtgcgctg cgcggtgccg   8640
tagagatgga tcctcgtcaa acaggaatcc catccactaa gggagcgctc tagagaaaca   8700
tcccagcgct actaataggg agcgttgacc ttccttccac ggaccggtaa tcggagtgcc   8760
taaaaccgca tgcggcttag gctccaagat aggttctgcg cggccgggta atgcatcttc   8820
tttagcaaca agttgagggg taggtgcaaa taagaacgac atagaaatcg tctcctttct   8880 gttttaatc aacatacacc accacctaaa aattccccga ccagcaagtt cacagtattc   8940
gggcacaata tcgttgccaa atatattgttt cggaatatca tgggatacgt acccaacgaa   9000
aggaaacact catggaaggc atgactaatc cagagcagac acatcccgct gcaagcctcg   9060 aagcatgat caaaaccatc acaaagacct tcgtgattgc tcacgatcag gattctgatg   9120
agcatcttgc gcaggcactg gtgtacaacg ctggacgttt ggcatggcgc atgcgcgaaa   9180
acggtgtgga tacggattac aagacttctg tgtctgatgt ggtcacggat gccgatcgtg   9240
cggccgaggc cttcgtcgca ggcgttcttg aagcgttgcg gcctgaggac ggcgtgcttg   9300
gcgaggaagg cgcggaccgg gcgtcgaaaa gcggaaaaac ctgggtcatc gacccggttg   9360
atggcaccta caacttcacc cagggctcag attattggtg ctcggcgctc gcgctggtcg   9420
agggcgatcc atccgcgcca tcgcgcgtgc ttttcggcgc cgtacaccgc ccagccatgg   9480
gttatacgtg gttcggtggc ccgggaatcc gcaccacgct cgacggcaag gagctagatt   9540
tgcttgtcga cgcccccctc aatcaaatct ccctggccac ctacatccac ccgtcacgca   9600
tcgcggaacc tgatattcaa aaggcgtgga tgagcgttgc cacccaccct gcaacgctgc   9660
gcatgttcgg cgccggctcc atcgatttgg ccaacatcgc cgacggcagc atcggcgcat   9720
gggtgcagca cagcgtcgca gattgggact ggctaccccgg ccgcgcactc atcgaaggcg   9780
tcggcggagc atgcatcaaa gtgaccgccg gcggcgtcga atggtccgtt gcaggaaacg   9840
cggaagcagt tagtgagatc tccgaaactt taagcgcact agactaacaa cacatgagca   9900
aatatgcaga cgatttagcc ttagccctcg aacttgccga acttgccgat ccatcaccc   9960 tcgaccgctt cgaagcctct gacctggaag tatcctccaa gccagacatg actcccgtca  10020
gcgatgccga cctggcgacc gaagaagcac tccgtgagaa aatcgccacc gcccgccccg  10080
ccgactccat cctcggtgaa gaattcggtg gcgacgtaga attcagcggc cgccagtgga  10140
tcatcgaccc catcgacggc accaaaaaact acgtccgcgg cgtccccgta tgggcaaccc  10200
tgatcgcgct gctcgacaac ggcaaacccg tcgcaggtgt catctccgca cccgcactgg  10260
```

| | | |
|---|---|---|
| ctaggcgttg gtgggcatcc gaaggggccg gcgcatggcg caccttcaac ggcagctccc | 10320 |
| cacgcaaact gtccgtgtcc caggtgtcca agcttgacga cgcctccctc tccttctcct | 10380 |
| ccctctccgg ctgggccgaa cgagatttgc gcgatcagtt cgtctccctc actgatacca | 10440 |
| cctggcgact ccgcggctac ggcgacttct tctcctactg cctcgtcgcc gaaggtgccg | 10500 |
| tcgatatcgc cgctgaacca gaagtcagcc tctgggatct tgctcccctg tccatcctgg | 10560 |
| tcaccgaagc cggaggaaag ttcacctcac tggctggcgt cgatggacca cacggtggcg | 10620 |
| atgcagtagc caccaacggc atcctgcacg atgagacgct ggatcgttta aaatag | 10676 |

<210> SEQ ID NO 90

<400> SEQUENCE: 90

000

<210> SEQ ID NO 91
<211> LENGTH: 2642
<212> TYPE: DNA
<213> ORGANISM: Unknown
<220> FEATURE:
<223> OTHER INFORMATION: polynucleotide

<400> SEQUENCE: 91

| | | |
|---|---|---|
| ctcccgcgca ctgctgcaat ccgcaccgtg cccaatgatg gtggttcgcc cacctgagaa | 60 |
| gattaagaag tagtttcttt taagtttcga tgccccggtt tcctgatttt gtgcagggag | 120 |
| gccggggcat tggtgtttgc gggttagttc gggccattcg aaagggagaa accaagggca | 180 |
| gccagacaga cgtgccaaga atctggattt ccgccaggtt ttggcacgcc cgtctggttt | 240 |
| aggcaatgag ataccgaaca cacgtgccaa aagttcggct ttttcgccga tcttgtcacg | 300 |
| cctgcctggt ttgtcttgta aagagtgatt tcatggccga gactcctaaa agtttgacct | 360 |
| cacaggattg cttctaaggg cctctccaat ctccactgag gtacttaatc cttccgggga | 420 |
| attcgggcgc ttaaatcgag aaattaggcc atcaccttt aataacaata caatgaataa | 480 |
| ttggaatagg tcgacacctt tggagcggag ccggttaaaa ttggcagcat tcaccgaaag | 540 |
| aaaaggagaa ccacatgctt gccctaggtt ggattacatg gatcattatt ggtggtctag | 600 |
| ctggttggat tgcctccaag attaaaggca ctgatgctca gcaaggaatt ttgctgaaca | 660 |
| tagtcgtcgg tattatcggt ggtttgttag gcggctggct gcttggaatc ttcggagtgg | 720 |
| atgttgccgg tggcggcttg atcttcagct tcatcacatg tctgattggt gctgtcattt | 780 |
| tgctgacgat cgtgcagttc ttcactcgga agaagtaatc tgctttaaat ccgtagggcc | 840 |
| tgttgatatt tcgatatcaa caggcctttt ggtcattttg gggtggaaaa agcgctagac | 900 |
| ttgcctgtgg attaaaacta tacgaaccgg tttgtctata ttggtgttag acagttcgtc | 960 |
| gtatcttgaa acagaccaac ccgaaaggac gtggccgaac gtggctgcta gcgcttcagg | 1020 |
| caagagtaaa acaagtgccg gggcaaaccg tcgtcgcaat cgaccaagcc cccgacagcg | 1080 |
| tctcctcgat agcgcaacca accttttcac cacagaaggt attcgcgtca tcggtattga | 1140 |
| tcgtatcctc cgtgaagctg acgtggcgaa ggcgagcctc tattcccttt tcggatcgaa | 1200 |
| ggacgccttg gttattgcat acctggagaa cctcgatcag ctgtggcgtg aagcgtggcg | 1260 |
| tgagcgcacc gtcggtatga aggatccgga agataaaatc atcgcgttct tgatcagtg | 1320 |
| cattgaggaa gaaccagaaa agatttccg cggctcgcac tttcagaatg cggctagtga | 1380 |
| gtaccctcgc cccgaaactg atagcgaaaa gggcattgtt gcagcagtgt tagagcaccg | 1440 |

| | |
|---|---:|
| cgagtggtgt cataagactc tgactgattt gctcactgag aagaacggct acccaggcac | 1500 |
| cacccaggcg aatcagctgt tggtgttcct tgatggtgga cttgctggat ctcgattggt | 1560 |
| ccacaacatc agtcctcttg agacggctcg cgatttggct cggcagttgt tgtcggctcc | 1620 |
| acctgcggac tactcaattt agtttcttca ttttccgaag gggtatcttc gttggggag | 1680 |
| gcgtcgataa gccccttctt tttagcttta acctcagcgc gacgctgctt taagcgctgc | 1740 |
| atggcggcgc ggttcatttc acgttgcgtt tcgcgcctct tgttcgcgat ttctttgcgg | 1800 |
| gcctgttttg cttcgttgat ttcggcagta cgggttttgg tgagttccac gtttgttgcg | 1860 |
| tgaagcgttg aggcgttcca tggggtgaga atcatcaggg cgcggttttt gcgtcgtgtc | 1920 |
| cacaggaaga tgcgcttttc tttttgtttt gcgcggtaga tgtcgcgctg ctctaggtgg | 1980 |
| tgcactttga atcgtcggt aagtgggtat ttgcgttcca aaatgaccat catgatgatt | 2040 |
| gtttggagga gcgtccacag gttgttgctg acccaataga gtgcgattgc tgtggggaat | 2100 |
| ggtcctgtga ggccaaggga cagtgggaag atcggcgcga ggatcgacat cacgatcatg | 2160 |
| aacttcagca tgccgttaga gaatccggat gcgtaatcgt tggtttggaa gctgcggtac | 2220 |
| atggacatcg ccatgttgat tgcggtgagg attgcggctg tgatgaacag tggcaaaacg | 2280 |
| aaactaagaa cttccgcctg cgtggtgctc aaatatttta gctgctcagt gggcatcgaa | 2340 |
| acataagcgg gcagaggcac attgctcacg cgaccagcga ggaaagattc cacttcctca | 2400 |
| ggagttagga agccgatcga ctggaagacg ggattttcca aaccaccttc agggcgagcc | 2460 |
| atgcggagaa gtgcccagta aagaccaagg acaatcggta tctggatcag cccaggcaca | 2520 |
| caacctgcca gcgggttaat gccgtattcc ttattcaaat cattctggcg cttctgcaac | 2580 |
| tcccgaatgg acgcttcatc gtactttccc ttgtattctt cccggagcgc agcgcggtga | 2640 |
| gg | 2642 |

<210> SEQ ID NO 92
<211> LENGTH: 5666
<212> TYPE: DNA
<213> ORGANISM: Unknown
<220> FEATURE:
<223> OTHER INFORMATION: polynucleotide

<400> SEQUENCE: 92

| | |
|---|---:|
| tgtcatgctt ccggaggtgc gcagggctcg agactccgga aagctatttg ccactccgat | 60 |
| gtttgggtca ctcgacgaga tacgtgctga tcacctaatt tggtgcacag ggtttcggcc | 120 |
| ggcgattagg ccagttcgtc aacttctcaa acacggacaa ccaaaggttc ctggtcttta | 180 |
| tttagtaggc tacggagatt ggacgggacc tgggtctgcg actatcacag gggtcgggct | 240 |
| ttatgccaag cgagcagcca aagagattgc cgcgtcagtc ggcaaagtcg ttaaatagtt | 300 |
| tgaaggctaa gaacttaatg ttaaagcgaa aattgttttg acacctcaac taatgcagcg | 360 |
| atgcgttctt tccagaatgc tttcatgaca gggatgctgt cttgatcagg caggcgtctg | 420 |
| tgctggatgc cgaagctgga tttattgtcg cctttggagg tgaagttgac gctcactcga | 480 |
| gaatcatcgg ccaaccattt ggcattgaat gttctaggtt cggaggcgga ggttttctca | 540 |
| attagtgcgg gatcgagcca ctgcgcccgc aggtcatcgt ctccgaagag cttccacact | 600 |
| ttttcgaccg gcaggttaag ggttttggag gcattggccg cgaacccatc gctggtcatc | 660 |
| ccggggtttgc gcatgccacg ttcgtattca taaccaatcg cgatgccttg agcccaccag | 720 |
| ccactgacat caaagttgtc cacgatgtgc tttgcgatgt gggtgtgagt ccaagaggtg | 780 |
| gcttttacgt cgtcaagcaa ttttagccac tcttcccacg gctttccggt gccgttgagg | 840 |

```
atagcttcag gggacatgcc tggtgttgag ccttgcggag tggagtcagt catgcgaccg    900
agactagtgg cgctttgcct gtgttgctta ggcggcgttg aaaatgaact acgaatgaaa    960
agttcgggaa ttgtctaatc cgtactaagc tgtctacaca atgtctactt cagttacttc   1020
accagcccac aacaacgcac attcctccga attttggat gcgttggcaa accatgtgtt   1080
gatcggcgac ggcgccatgg gcacccagct ccaaggcttt gacctggacg tggaaaagga   1140
tttccttgat ctggaggggt gtaatgagat tctcaacgac acccgccctg atgtgttgag   1200
gcagattcac cgcgcctact ttgaggcggg agctgacttg gttgagacca atacttttgg   1260
ttgcaacctg ccgaacttgg cggattatga catcgctgat cgttgccgtg agcttgccta   1320
caagggcact gcagtggcta gggaagtggc tgatgagatg gggccgggcc gaaacggcat   1380
gcggcgtttc gtggttggtt ccctgggacc tggaacgaag cttccatcgc tgggccatgc   1440
accgtatgca gatttgcgtg ggcactacaa ggaagcagcg cttggcatca tcgacggtgg   1500
tggcgatgcc tttttgattg agactgctca ggacttgctt caggtcaagg ctgcggttca   1560
cggcgttcaa gatgccatgg ctgaacttga tacattcttg cccattattt gccacgtcac   1620
cgtagagacc accggcacca tgctcatggg ttctgagatc ggtgccgcgt tgacagcgct   1680
gcagccactg ggtatcgaca tgattggtct gaactgcgcc accggcccag atgagatgag   1740
cgagcacctg cgttacctgt ccaagcacgc cgatattcct gtgtcggtga tgcctaacgc   1800
aggtcttcct gtcctgggta aaaacggtgc agaatacccca cttgaggctg aggatttggc   1860
gcaggcgctg gctggattcg tctccgaata tggcctgtcc atggtgggtg gttgttgtgg   1920
caccacacct gagcacatcc gtgcggtccg cgatgcggtg gttggtgttc cagagcagga   1980
aacctccaca ctgaccaaga tccctgcagg ccctgttgag caggcctccc gcaggtgga   2040 gaaagaggac tccgtcgcgt cgctgtacac ctcggtgcca ttgtcccagg aaaccggcat   2100
ttccatgatc ggtgagcgca ccaactccaa cggttccaag gcattccgtg aggcaatgct   2160
gtctggcgat tgggaaaagt gtgtggatat tgccaagcag caaacccgcg atggtgcaca   2220
catgctggat cttgtgtgg attacgtggg acgagacggc accgcgata tggcgaccttt   2280 ggcagcactt cttgctacca gctccactt gccaatcatg attgactcca ccgagccaga   2340
ggttattcgc acaggccttg agcacttggg tggacgaagc atcgttaact ccgtcaactt   2400
tgaagacggc gatggccctg agtcccgcta ccagcgcatc atgaaactgg taaagcagca   2460
cggtgcggcc gtggttgcgc tgaccattga tgaggaaggc caggcacgta ccgctgagca   2520
caaggtgcgc attgctaaac gactgattga cgatatcacc ggcagctacg gcctggatat   2580
caaagacatc gttgtggact gcctgacctt cccgatctct actggccagg aagaaaccag   2640
gcgagatggc attgaaacca tcgaagccat ccgcagctg aagaagctct acccagaaat   2700
ccacaccacc ctgggtctgt ccaatatttc cttcggcctg aaccctgctg cacgccaggt   2760
tcttaactct gtgttcctca atgagtgcat tgaggctggt ctggactctg cgattgcgca   2820
cagctccaag attttgccga tgaaccgcat tgatgatcgc cagcgcgaag tggcgttgga   2880
tatggtctat gatcgccgca ccgaggatta cgatccgctg caggaattca tgcagctgtt   2940
tgagggcgtt tctgctgccg atgccaagga tgctcgcgct gaacagctgg ccgctatgcc   3000 tttgttgag cgtttggcac agcgcatcat cgacggcgat aagaatggcc ttgaggatga   3060
tctggaagca ggcatgaagg agaagtctcc tattgcgatc atcaacgagg accttctcaa   3120
cggcatgaag accgtgggtg agctgtttgg ttccggacag atgcagctgc cattcgtgct   3180
```

```
gcaatcggca gaaaccatga aaactgcggt ggcctatttg gaaccgttca tggaagagga   3240
agcagaagct accggatctg cgcaggcaga gggcaagggc aaaatcgtcg tggccaccgt   3300
caagggtgac gtgcacgata tcggcaagaa cttggtggac atcattttgt ccaacaacgg   3360
ttacgacgtg gtgaacttgg gcatcaagca gccactgtcc gccatgttgg aagcagcgga   3420
agaacacaaa gcagacgtca tcggcatgtc gggacttctt gtgaagtcca ccgtggtgat   3480
gaaggaaaac cttgaggaga tgaacaacgc cggcgcatcc aattacccag tcattttggg   3540
tggcgctgcg ctgacgcgta cctacgtgga aaacgatctc aacgaggtgt acaccggtga   3600
ggtgtactac gcccgtgatg ctttcgaggg cctgcgcctg atggatgagg tgatggcaga   3660
aaagcgtggt gaaggacttg atcccaactc accagaagct attgagcagg cgaagaagaa   3720
ggcggaacgt aaggctcgta tgagcgttc ccgcaagatt gccgcggagc gtaaagctaa   3780
tgcggctccc gtgattgttc cggagcgttc tgatgtctcc accgatactc caaccgcggc   3840
accaccgttc tggggaaccc gcattgtcaa gggtctgccc ttggcggagt tcttgggcaa   3900
ccttgatgag cgcgccttgt tcatgggca gtggggtctg aaatccaccc gcggcaacga   3960
gggtccaagc tatgaggatt tggtggaaac tgaaggccga ccacgcctgc gctactggct   4020
ggatcgcctg aagtctgagg gcattttgga ccacgtggcc ttggtgtatg gctacttccc   4080
agcggtcgcg gaaggcgatg acgtggtgat cttggaatcc ccggatccac acgcagccga   4140
acgcatgcgc tttagcttcc cacgccagca gcgcggcagg ttcttgtgca tcgcggattt   4200
cattcgccca cgcgagcaag ctgtcaagga cggccaagtg gacgtcatgc cattccagct   4260
ggtcaccatg ggtaatccta ttgctgattt cgccaacgag ttgttcgcag ccaatgaata   4320
ccgcgagtac ttggaagttc acggcatcgg cgtgcagctc accgaagcat tggccgagta   4380
ctggcactcc cgagtgcgca gcgaactcaa gctgaacgac ggtggatctg tcgctgattt   4440
tgatccagaa gacaagacca agttcttcga cctggattac cgcggcgccc gcttctcctt   4500
tggttacggt tcttgccctg atctggaaga ccgcgcaaag ctggtggaat tgctcgagcc   4560
aggccgtatc ggcgtggagt tgtccgagga actccagctg cacccagagc agtccacaga   4620
cgcgtttgtg ctctaccacc cagaggcaaa gtactttaac gtctaacacc tttgagaggg   4680
aaaactttcc cgcacattgc agatcgtgcc actttaacta aggttgacgg catgattaag   4740
gcgattttct gggacatgga cggcacgatg gtggactctg agccacagtg gggcattgct   4800
acctacgagc tcagcgaagc catgggccgc cgcctcaccc cggagctccg ggaactcacc   4860
gtcggctcga gcctgccgcg caccatgcgc ttatgcgcag agcacgcagg cattacattg   4920
agcgacgcgg actacgagcg ctaccgggct ggcatgttcg cccgggtcca tgagcttttc   4980
gacgaatccc tcgtcccaaa tccaggcgtc accgaactcc tgacagagtt gaaggccctc   5040
gagatcccca tgttggtcac caccaacaca gagcgcgatc tcgcgacccg ttcagtcgca   5100
gccgtgggaa atgagttctt catcggttct atcgctggtg atgaagtccc aacagcaaag   5160
ccagccccg acatgtacct cgaagcagca cgacgtgtgg gctttgaccc atcagagtgc   5220
ctcgtgttcg aagattccta caacggcatg ctgggcgctg ttactgcagg ttgccgcgtc   5280
attggtctgc acccagaaga agtccaagcg ccagaaggtg tagtgccttt gcgttccctc   5340
cacggtaaaa actctttcga aggtgtcacc gctgagatgg tcactgcctg gtaccaccag   5400
atcgagccgg caggtgtcgc aaaataaaac caggtggggg agtgaaatta ttcgactaat   5460
atcctccccc aaacacacat tgataactgt tgtgtggaag aatgtaccga gtgaagacat   5520
ttgactcgct gtacgaagaa cttcttaacc gtgctcagac ccgccctgaa gggtctggaa   5580
```

```
ccgtggccgc cttggataaa ggcatccatc atctaggtaa gaaggtcatc gaagaagccg    5640
gagaggtctg gattgcagcc gagtat                                        5666

<210> SEQ ID NO 93
<211> LENGTH: 11332
<212> TYPE: DNA
<213> ORGANISM: Unknown
<220> FEATURE:
<223> OTHER INFORMATION: polynucleotide

<400> SEQUENCE: 93
tgtcatgctt ccggaggtgc gcagggctcg agactccgga aagctatttg ccactccgat     60
gtttgggtca ctcgacgaga tacgtgctga tcacctaatt tggtgcacag ggtttcggcc    120
ggcgattagg ccagttcgtc aacttctcaa acacggacaa ccaaaggttc ctggtcttta    180
tttagtaggc tacggagatt ggacgggacc tgggtctgcg actatcacag ggtcgggct     240 ttatgccaag cgagcagcca aagagattgc cgcgtcagtc ggcaaagtcg ttaaatagtt    300
tgaaggctaa gaacttaatg ttaaagcgaa aattgttttg cacctcaac taatgcagcg     360 atgcgttctt tccagaatgc tttcatgaca gggatgctgt cttgatcagg caggcgtctg    420
tgctggatgc cgaagctgga tttattgtcg cctttggagg tgaagttgac gctcactcga    480
gaatcatcgg ccaaccattt ggcattgaat gttctaggtt cggaggcgga ggttttctca    540
attagtgcgg gatcgagcca ctgcgcccgc aggtcatcgt ctccgaagag cttccacact    600
ttttcgaccg gcaggttaag ggttttggag gcattggccg cgaacccatc gctggtcatc    660
ccgggtttgc gcatgccacg ttcgtattca taaccaatcg cgatgccttg agcccaccag    720
ccactgacat caaagttgtc cacgatgtgc tttgcgatgt gggtgtgagt ccaagaggtg    780
gcttttacgt cgtcaagcaa ttttagccac tcttcccacg gctttccggt gccgttgagg    840
atagcttcag gggacatgcc tggtgttgag ccttgcggag tggagtcagt catgcgaccg    900
agactagtgg cgcttttgcct gtgttgctta ggcggcgttg aaaatgaact acgaatgaaa    960
agttcgggaa ttgtctaatc cgtactaagc tgtctacaca atgtctactt cagttacttc   1020
accagcccac aacaacgcac attcctccga atttttggat gcgttggcaa accatgtgtt   1080
gatcggcgac ggcgccatgg gcacccagct ccaaggcttt gacctggacg tggaaaagga   1140
tttccttgat ctgagggggt gtaatgagat tctcaacgac acccgccctg atgtgttgag   1200
gcagattcac cgcgcctact ttgaggcggg agctgacttg gttgagacca atacttttgg   1260
ttgcaacctg ccgaacttgg cggattatga catcgctgat cgttgccgtg agcttgccta   1320
caagggcact gcagtggcta gggaagtggc tgatgagatg gggccgggcc gaaacggcat   1380
gcggcgtttc gtggttggtt ccctgggacc tggaacgaag cttccatcgc tgggccatgc   1440
accgtatgca gatttgcgtg ggcactacaa ggaagcagcg cttggcatca tcgacggtgg   1500
tggcgatgcc ttttttgattg agactgctca ggacttgctt caggtcaagg ctgcggttca   1560
cggcgttcaa gatgccatgg ctgaacttga tacattcttg cccattattt gccacgtcac   1620
cgtagagacc accggcacca tgctcatggg ttctgagatc ggtgccgcgt tgacagcgct   1680
gcagccactg ggtatcgaca tgattggtct gaactgcgcc accggcccag atgagatgag   1740
cgagcacctg cgttacctgt ccaagcacgc cgatattcct gtgtcggtga tgcctaacgc   1800
aggtcttcct gtcctgggta aaaacggtgc agaatacca cttgaggctg aggatttggc   1860
gcaggcgctg gctggattcg tctccgaata tggcctgtcc atggtgggtg gttgttgtgg   1920
```

```
caccacacct gagcacatcc gtgcggtccg cgatgcggtg gttggtgttc cagagcagga    1980
aacctccaca ctgaccaaga tccctgcagg ccctgttgag caggcctccc gcgaggtgga    2040
gaaagaggac tccgtcgcgt cgctgtacac ctcggtgcca ttgtcccagg aaaccggcat    2100
ttccatgatc ggtgagcgca ccaactccaa cggttccaag gcattccgtg aggcaatgct    2160
gtctggcgat tgggaaaagt gtgtggatat tgccaagcag caaacccgcg atggtgcaca    2220
catgctggat ctttgtgtgg attacgtggg acgagacggc accgccgata tggcgacctt    2280
ggcagcactt cttgctacca gctccacttt gccaatcatg attgactcca ccgagccaga    2340
ggttattcgc acaggccttg agcacttggg tggacgaagc atcgttaact ccgtcaactt    2400
tgaagacggc gatggccctg agtcccgcta ccagcgcatc atgaaactgg taaagcagca    2460
cggtgcggcc gtggttgcgc tgaccattga tgaggaaggc caggcacgta ccgctgagca    2520
caaggtgcgc attgctaaac gactgattga cgatatcacc ggcagctacg gcctggatat    2580
caaagacatc gttgtggact gcctgacctt cccgatctct actggccagg aagaaaccag    2640
gcgagatggc attgaaacca tcgaagccat ccgcgagctg aagaagctct acccagaaat    2700
ccacaccacc ctgggtctgt ccaatatttc cttcggcctg aaccctgctg cacgccaggt    2760
tcttaactct gtgttcctca atgagtgcat tgaggctggt ctggactctg cgattgcgca    2820
cagctccaag attttgccga tgaaccgcat tgatgatcgc cagcgcgaag tggcgttgga    2880
tatggtctat gatcgccgca ccgaggatta cgatccgctg caggaattca tgcagctgtt    2940
tgagggcgtt tctgctgccg atgccaagga tgctcgcgct gaacagctgg ccgctatgcc    3000
tttgtttgag cgtttggcac agcgcatcat cgacggcgat aagaatggcc ttgaggatga    3060
tctggaagca ggcatgaagg agaagtctcc tattgcgatc atcaacgagg accttctcaa    3120
cggcatgaag accgtgggtg agctgtttgg ttccggacag atgcagctgc cattcgtgct    3180
gcaatcggca gaaaccatga aaactgcggt ggcctatttg gaaccgttca tggaagagga    3240
agcagaagct accggatctg cgcaggcaga gggcaagggc aaaatcgtcg tggccaccgt    3300
caagggtgac gtgcacgata tcggcaagaa cttggtggac atcatttttgt ccaacaacgg    3360
ttacgacgtg gtgaacttgg gcatcaagca gccactgtcc gccatgttgg aagcagcgga    3420
agaacacaaa gcagacgtca tcggcatgtc gggacttctt gtgaagtcca ccgtggtgat    3480
gaaggaaaac cttgaggaga tgaacaacgc cggcgcatcc aattacccag tcatttttggg    3540
tggcgctgcg ctgacgcgta cctacgtgga aaacgatctc aacgaggtgt acaccggtga    3600
ggtgtactac gcccgtgatg ctttcgaggg cctgcgcctg atggatgagg tgatggcaga    3660
aaagcgtggt gaaggacttg atcccaactc accagaagct attgagcagg cgaagaagaa    3720
ggcggaacgt aaggctcgta tgagcgttcc gcaagatt gccgcggagc gtaaagctaa    3780
tgcggctccc gtgattgttc cggagcgttc tgatgtctcc accgatactc caaccgcggc    3840
accaccgttc tggggaaccc gcattgtcaa gggtctgccc ttggcggagt tcttgggcaa    3900
ccttgatgag cgcgccttgt tcatgggca gtggggtctg aaatccaccc gcggcaacga    3960
gggtccaagc tatgaggatt tggtggaaac tgaaggccga ccacgcctgc gctactggct    4020
ggatcgcctg aagtctgagg gcattttgga ccacgtggcc ttggtgtatg ctacttccc    4080
agcggtcgcg gaaggcgatg acgtggtgat cttggaatcc ccggatccac acgcagccga    4140
acgcatcgc tttagcttcc cacgccagca gcgcggcagg ttcttgtgca tgcggattt    4200
cattcgccca cgcgagcaag ctgtcaagga cggccaagtg gacgtcatgc cattccagct    4260
ggtcaccatg ggtaatccta ttgctgattt cgccaacgag ttgttcgcag ccaatgaata    4320
```

```
ccgcgagtac ttggaagttc acggcatcgg cgtgcagctc accgaagcat tggccgagta    4380
ctggcactcc cgagtgcgca gcgaactcaa gctgaacgac ggtggatctg tcgctgattt    4440
tgatccagaa gacaagacca agttcttcga cctggattac cgcggcgccc gcttctcctt    4500
tggttacggt tcttgccctg atctggaaga ccgcgcaaag ctggtggaat tgctcgagcc    4560
aggccgtatc ggcgtggagt tgtccgagga actccagctg cacccagagc agtccacaga    4620
cgcgtttgtg ctctaccacc cagaggcaaa gtactttaac gtctaacacc tttgagaggg    4680
aaaactttcc cgcacattgc agatcgtgcc actttaacta aggttgacgg catgattaag    4740
gcgattttct gggacatgga cggcacgatg gtggactctg agccacagtg gggcattgct    4800
acctacgagc tcagcgaagc catgggccgc cgcctcaccc cggagctccg ggaactcacc    4860
gtcggctcga gcctgccgcg caccatgcgc ttatgcgcag agcacgcagg cattacattg    4920
agcgacgcgg actacgagcg ctaccgggct ggcatgttcg cccgggtcca tgagcttttc    4980
gacgaatccc tcgtcccaaa tccaggcgtc accgaactcc tgacagagtt gaaggccctc    5040
gagatcccca tgttggtcac caccaacaca gagcgcgatc tcgcgacccg ttcagtcgca    5100
gccgtgggaa atgagttctt catcggttct atcgctggtg atgaagtccc aacagcaaag    5160
ccagcccccg acatgtacct cgaagcagca cgacgtgtgg gctttgaccc atcagagtgc    5220
ctcgtgttcg aagattccta caacggcatg ctgggcgctg ttactgcagg ttgccgcgtc    5280
attggtctgc acccagaaga agtccaagcg ccagaaggtg tagtgccttt gcgttccctc    5340
cacggtaaaa actcttttcga aggtgtcacc gctgagatgg tcactgcctg gtaccaccag    5400
atcgagccgg caggtgtcgc aaaataaaac caggtggggg agtgaaatta ttcgactaat    5460 atcctcccccc aaacacacat tgataactgt tgtgtggaag aatgtaccga gtgaagacat    5520
ttgactcgct gtacgaagaa cttcttaacc gtgctcagac ccgccctgaa gggtctggaa    5580
ccgtggccgc cttggataaa ggcatccatc atctaggtaa gaaggtcatc gaagaagccg    5640
gagaggtctg gattgcagcc gagtattgtc atgcttccgg aggtgcgcag ggctcgagac    5700
tccggaaagc tatttgccac tccgatgttt gggtcactcg acgagatacg tgctgatcac    5760
ctaatttggt gcacagggtt tcggccggcg attaggccag ttcgtcaact tctcaaacac    5820
ggacaaccaa aggttcctgg tctttattta gtaggctacg gagattggac gggacctggg    5880
tctgcgacta tcacaggggt cgggcttat gccaagcgag cagccaaaga gattgccgcg    5940
tcagtcggca aagtcgttaa atagtttgaa ggctaagaac ttaatgttaa agcgaaaatt    6000
gttttgacac ctcaactaat gcagcgatgc gttctttcca gaatgctttc atgacaggga    6060
tgctgtcttg atcaggcagg cgtctgtgct ggatgccgaa gctggattta ttgtcgcctt    6120
tggaggtgaa gttgacgctc actcgagaat catcggccaa ccatttggca ttgaatgttc    6180
taggttcgga ggcggaggtt ttctcaatta gtgcgggatc gagccactgc gcccgcaggt    6240
catcgtctcc gaagagcttc cacactttt cgaccggcag gttaagggtt ttggaggcat    6300
tggccgcgaa cccatcgctg gtcatcccgg gtttgcgcat gccacgttcg tattcataac    6360
caatcgcgat gccttgagcc caccagccac tgacatcaaa gttgtccacg atgtgctttg    6420
cgatgtgggt gtgagtccaa gaggtggctt ttacgtcgtc aagcaatttt agccactctt    6480
cccacggctt tccggtgccg ttgaggatag cttcagggga catgcctggt gttgagcctt    6540
gcggagtgga gtcagtcatg cgaccagac tagtggcgct ttgcctgtgt tgcttaggcg    6600
gcgttgaaaa tgaactacga atgaaaagtt cgggaattgt ctaatccgta ctaagctgtc    6660
```

```
tacacaatgt ctacttcagt tacttcacca gcccacaaca acgcacattc ctccgaattt   6720
ttggatgcgt tggcaaacca tgtgttgatc ggcgacggcg ccatgggcac ccagctccaa   6780
ggctttgacc tggacgtgga aaaggatttc cttgatctgg aggggtgtaa tgagattctc   6840
aacgacaccc gccctgatgt gttgaggcag attcaccgcg cctactttga ggcgggagct   6900
gacttggttg agaccaatac ttttggttgc aacctgccga acttggcgga ttatgacatc   6960
gctgatcgtt gccgtgagct tgcctacaag ggcactgcag tggctaggga agtggctgat   7020
gagatggggc cgggccgaaa cggcatgcgg cgtttcgtgg ttggttccct gggacctgga   7080
acgaagcttc catcgctggg ccatgcaccg tatgcagatt tgcgtgggca ctacaaggaa   7140
gcagcgcttg gcatcatcga cggtggtggc gatgccttt tgattgagac tgctcaggac   7200
ttgcttcagg tcaaggctgc ggttcacggc gttcaagatg ccatggctga acttgataca   7260
ttcttgccca ttatttgcca cgtcaccgta gagaccaccg gcaccatgct catgggttct   7320
gagatcggtg ccgcgttgac agcgctgcag ccactgggta tcgacatgat tggtctgaac   7380
tgcgccaccg gcccagatga gatgagcgag cacctgcgtt acctgtccaa gcacgccgat   7440
attcctgtgt cggtgatgcc taacgcaggt cttcctgtcc tgggtaaaaa cggtgcagaa   7500
tacccacttg aggctgagga tttggcgcag gcgctggctg gattcgtctc cgaatatggc   7560
ctgtccatgg tgggtggttg ttgtggcacc acacctgagc acatccgtgc ggtccgcgat   7620
gcggtggttg gtgttccaga gcaggaaacc tccacactga ccaagatccc tgcaggccct   7680
gttgagcagg cctcccgcga ggtggagaaa gaggactccg tcgcgtcgct gtacacctcg   7740
gtgccattgt cccaggaaac cggcatttcc atgatcggtg agcgcaccaa ctccaacggt   7800
tccaaggcat tccgtgaggc aatgctgtct ggcgattggg aaaagtgtgt ggatattgcc   7860
aagcagcaaa cccgcgatgg tgcacacatg ctggatcttt tgtgtggatta cgtgggacga   7920
gacggcaccg ccgatatggc gaccttggca gcacttcttg ctaccagctc cactttgcca   7980
atcatgattg actccaccga gccagaggtt attcgcacag gccttgagca cttgggtgga   8040
cgaagcatcg ttaactccgt caactttgaa gacggcgatg gccctgagtc ccgctaccag   8100
cgcatcatga aactggtaaa gcagcacggt cggccgtgg ttgcgctgac cattgatgag   8160
gaaggccagg cacgtaccgc tgagcacaag gtgcgcattg ctaaacgact gattgacgat   8220
atcaccggca gctacggcct ggatatcaaa gacatcgttg tggactgcct gaccttcccg   8280
atctctactg gccaggaaga aaccaggcga gatggcattg aaaccatcga agccatccgc   8340
gagctgaaga agctctaccc agaaatccac accaccctgg gtctgtccaa tatttccttc   8400
ggcctgaacc ctgctgcacg ccaggttctt aactctgtgt tcctcaatga gtgcattgag   8460
gctggtctgg actctgcgat tgcgcacagc tccaagattt tgccgatgaa ccgcattgat   8520
gatcgccagc gcgaagtggc gttggatatg gtctatgatc gccgcaccga ggattacgat   8580
ccgctgcagg aattcatgca gctgtttgag ggcgtttctg ctgccgatgc caaggatgct   8640
cgcgctgaac agctggccgc tatgcctttg tttgagcgtt tggcacagcg catcatcgac   8700
ggcgataaga atggccttga ggatgatctg gaagcaggca tgaaggagaa gtctcctatt   8760
gcgatcatca acgaggacct tctcaacggc atgaagaccg tgggtgagct gtttggttcc   8820
ggacagatgc agctgccatt cgtgctgcaa tcggcagaaa ccatgaaaac tgcggtggcc   8880
tatttggaac cgttcatgga agaggaagca gaagctaccg atctgcgca ggcagagggc   8940
aagggcaaaa tcgtcgtggc caccgtcaag ggtgacgtgc acgatatcgg caagaacttg   9000
gtggacatca ttttgtccaa caacggttac gacgtggtga acttgggcat caagcagcca   9060
```

```
ctgtccgcca tgttggaagc agcggaagaa cacaaagcag acgtcatcgg catgtcggga      9120
cttcttgtga agtccaccgt ggtgatgaag gaaaaccttg aggagatgaa caacgccggc      9180
gcatccaatt acccagtcat tttgggtggc gctgcgctga cgcgtaccta cgtggaaaac      9240
gatctcaacg aggtgtacac cggtgaggtg tactacgccc gtgatgcttt cgagggcctg      9300
cgcctgatgg atgaggtgat ggcagaaaag cgtggtgaag gacttgatcc caactcacca      9360
gaagctattg agcaggcgaa gaagaaggcg gaacgtaagg ctcgtaatga gcgttcccgc      9420
aagattgccg cggagcgtaa agctaatgcg gctcccgtga ttgttccgga gcgttctgat      9480
gtctccaccg atactccaac cgcggcacca ccgttctggg gaacccgcat tgtcaagggt      9540
ctgccctttgg cggagttctt gggcaacctt gatgagcgcg ccttgttcat ggggcagtgg      9600
ggtctgaaat ccaccgcgg caacgagggt ccaagctatg aggatttggt ggaaactgaa       9660
ggccgaccac gcctgcgcta ctggctggat cgcctgaagt ctgagggcat tttggaccac      9720
gtggccttgg tgtatggcta cttcccagcg gtcgcggaag gcgatgacgt ggtgatcttg      9780
gaatccccgg atccacacgc agccgaacgc atgcgcttta gcttcccacg ccagcagcgc      9840
ggcaggttct tgtgcatcgc ggatttcatt cgcccacgcg agcaagctgt caaggacggc      9900
caagtggacg tcatgccatt ccagctggtc accatgggta atcctattgc tgatttcgcc      9960
aacgagttgt tcgcagccaa tgaataccgc gagtacttgg aagttcacgg catcggcgtg      10020
cagctcaccg aagcattggc cgagtactgg cactcccgag tgcgcagcga actcaagctg      10080
aacgacggtg gatctgtcgc tgattttgat ccagaagaca agaccaagtt cttcgacctg      10140
gattaccgcg gcgcccgctt ctcctttggt tacggttctt gccctgatct ggaagaccgc      10200
gcaaagctgg tggaattgct cgagccaggc cgtatcggcg tggagttgtc cgaggaactc      10260
cagctgcacc cagagcagtc cacagacgcg tttgtgctct accacccaga ggcaaagtac      10320
tttaacgtct aacaccttttg agagggaaaa cttttcccgca cattgcagat cgtgccactt      10380
taactaaggt tgacggcatg attaaggcga ttttctggga catggacggc acgatggtgg      10440
actctgagcc acagtggggc attgctacct acgagctcag cgaagccatg ggccgccgcc      10500
tcaccccgga gctccgggaa ctcaccgtcg gctcgagcct gccgcgcacc atgcgcttat      10560
gcgcagagca cgcaggcatt acattgagcg acgcggacta cgagcgctac cgggctggca      10620
tgttcgcccg ggtccatgag cttttcgacg aatccctcgt cccaaatcca ggcgtcaccg      10680
aactcctgac agagttgaag gccctcgaga tccccatgtt ggtcaccacc aacacagagc      10740
gcgatctcgc gacccgttca gtcgcagccg tgggaaatga gttcttcatc ggttctatcg      10800
ctggtgatga agtcccaaca gcaaagccag ccccccgacat gtacctcgaa gcagcacgac      10860
gtgtgggctt tgacccatca gagtgcctcg tgttcgaaga ttcctacaac ggcatgctgg      10920
gcgctgttac tgcaggttgc cgcgtcattg gtctgcaccc agaagaagtc caagcgccag      10980
aaggtgtagt gcctttgcgt tccctccacg gtaaaaactc tttcgaaggt gtcaccgctg      11040
agatggtcac tgcctggtac caccagatcg agccggcagg tgtcgcaaaa taaaaccagg      11100
tgggggagtg aaattattcg actaatatcc tcccccaaac acacattgat aactgttgtg      11160
tggaagaatg taccgagtga agacatttga ctcgctgtac gaagaacttc ttaaccgtgc      11220
tcagacccgc cctgaagggt ctggaaccgt ggccgccttg gataaaggca tccatcatct      11280
aggtaagaag gtcatcgaag aagccggaga ggtctggatt gcagccgagt at              11332
```

<210> SEQ ID NO 94

<211> LENGTH: 3311
<212> TYPE: DNA
<213> ORGANISM: Unknown
<220> FEATURE:
<223> OTHER INFORMATION: polynucleotide

<400> SEQUENCE: 94

| | | | | | |
|---|---|---|---|---|---|
| ctcattccag | cgtcacgacg | ttccgaaggt | actggttacc | tggcattggg | cactaccgtt | 60 |
| tctgcagcac | ttggaccagc | cctagcactt | tttgtcctag | gaacatttga | ttacgacatg | 120 |
| ctgtttatcg | tggtcttggc | aacctcggtc | atctctttga | tcgccgtcgt | gttcatgtac | 180 |
| tttaagacca | gcgaccctga | gccttctggg | gaaccagcca | agttcagctt | caaatctatt | 240 |
| atgaacccaa | agatcatccc | catcggcatc | tttatcttgc | ttatttgctt | tgcttactct | 300 |
| ggcgtcattg | cctacatcaa | cgcatttgct | gaagaacgcg | atctgattac | gggtgctgga | 360 |
| ttgttcttca | ttgcctacgc | agtatcaatg | tttgtgatgc | gcagcttcct | tggcaaactg | 420 |
| caggaccgtc | gcggagacaa | cgtcgttatt | tactttggat | tgttcttctt | cgttatttcc | 480 |
| ttgacgattt | tgtcctttgc | cacttccaac | tggcacgttg | tgttgtccgg | agtcattgca | 540 |
| ggtctgggat | acggcacttt | gatgccagca | gtgcagtcca | tcgctgttgg | tgtagtagac | 600 |
| aaaaccgaat | tcggtacggc | cttctccact | tgttcctgt | ttgtggactt | aggttttggc | 660 |
| tttggaccta | ttatcctggg | agcagtttct | gcggcaattg | gtttcggacc | tatgtatgca | 720 |
| gcactggcag | gtgtgggtgt | gattgccgga | atcttctacc | tgttcacaca | cgctcgcacc | 780 |
| gatcgagcta | agaatggctt | tgttaaacac | ccagagcctg | tcgctttagt | tagctagttc | 840 |
| tttcagcttt | ccctcccgat | cagcgtaaac | cggcccttcc | ggttttgggg | tacatcacag | 900 |
| aacctgggct | agcggtgtag | acccgaaaat | aaacgagcct | tttgtcaggg | ttaaggttta | 960 |
| ggtatctaag | ctaaccaaac | accaacaaaa | ggctctaccc | atgaagtcta | ccggcaacat | 1020 |
| catcgctgac | accatctgcc | gcactgcgga | actaggactc | accatcaccg | gcgcttccga | 1080 |
| tgcaggtgat | tacaccctga | tcgaagcaga | cgcactcgac | tacacctcca | cctgcccaga | 1140 |
| atgctcccaa | cctggggtgt | ttcgtcatca | cacccaccgg | atgctcattg | atttacccat | 1200 |
| cgtcgggttt | cccaccaaac | tgtttatccg | tctacctcgc | taccgctgca | ccaaccccac | 1260 |
| atgtaagcaa | aagtatttcc | aagcagaact | aagctgcgct | gaccacggta | aaaaggtcac | 1320 |
| ccaccgggtc | acccgctgga | ttttacaacg | ccttgctatt | gaccggatga | gtgttcacgc | 1380 |
| aaccgcgaaa | gcacttgggc | tagggtggga | tttaacctgc | caactagccc | tcgatatgtg | 1440 |
| ccgtgagctg | gtctataacg | atcctcacca | tcttgatgga | gtgtatgtca | ttggggtgga | 1500 |
| tgagcataag | tggtcacata | atagggctaa | gcatggtgat | gggtttgtca | ccgtgattgt | 1560 |
| cgatatgacc | gggcatcggt | atgactcacg | gtgtcctgcc | cggttattag | atgtcgtccc | 1620 |
| aggtcgtagt | gctgatgctt | tacggtcctg | gcttggctcc | cgcggtgaac | agttccgcaa | 1680 |
| tcagatacgg | atcgtgtcca | tggatggatt | ccaaggctac | gccacagcaa | gtaaagaact | 1740 |
| cattccttct | gctcgtcgcg | tgatggatcc | attccatgtt | gtgcggcttg | ctggtgacaa | 1800 |
| gctcaccgcc | tgccggcaac | gcctccagcg | ggagaaatac | cagcgtcgtg | gtttaagcca | 1860 |
| ggatccgttg | tataaaaacc | ggaagacctt | gttgaccacg | cacaagtggt | tgagtcctcg | 1920 |
| tcagcaagaa | agcttggagc | agttgtgggc | gtatgacaaa | gactacgggg | cgttaaagct | 1980 |
| tgcgtggctt | gcgtatcagg | cgattattga | ttgttatcag | atgggtaata | agcgtgaagc | 2040 |
| gaagaagaaa | atgcggacca | ttattgatca | gcttcgggtg | ttgaaggggc | cgaataagga | 2100 |
| actcgcgcag | ttgggtcgta | gtttgttaa | acgacttggt | gatgtgttgg | cgtatttcga | 2160 |

```
tgttggtgtc tccaacggtc cggtcgaagc gatcaacgga cggttggagc atttgcgtgg    2220
gattgctcta ggtttccgta atttgaacca ctacattctg cggtgcctta tccattcagg    2280
gcagttggtc cataagatca atgcactcta aaacaggaag agcccgtaaa cctctgacta    2340
gcgtcaccct ctgattaagg cgaccgcgga tttaagagca gaggctgcca cgagcgcatc    2400
ttcacggctg tgtgttgtac taaaagtaca gcgcacagcc gttcgtgctt gatcctcctc    2460
aagccccaac gccagcaaca catgggatac ctctccggaa ccacaggcag aaccagggga    2520
gcacacaatg ccttggcgtt ccaattccag aagaacagtt tcagatccta tgctgtcgaa    2580
gagaaaagat gcgtgtccat caatgcgcat cctaggatgt ccagtcaggt gtgctcccgg    2640
gatagtgaga acttcctcga tgaattcgcc aagatctgga taggattccg ccctggccaa    2700
ttccaaggca gtggcaaagg cgatagcccc cgcaacgttt ccgtgccac tacgccgccc     2760 tttttcctgg ccgccgccat ggattaccgg ctccagggga agctttgacc ataacactcc    2820
aatcccttta ggcgcaccga atttatgacc cgacaaactt aacgcgtcaa ctcccaagtc    2880
aaaggttaaa tgtgcagctt gcactgcatc ggtgtgaaaa ggcgtactgc ttaccgccgc    2940
caactcagct atcggctgaa tggttcccac ctcattgttg cataaccaa tgctgatcaa     3000 tgtggtgtcc ggcctgactg ctttgcggag accctccggg gagatcagcc cagtgtgatc    3060
gggggatagg taggtgatct cgaaatcatg aaacctttca agataagcag cagtttctag    3120
gacactgtca tgctcgatcg gggtggtgat gaggtgccgg ccacgaggat tagctaagca    3180
cgctcctttg atagcgaggt tgttggcttc tgatccaccc gacgtaaacg tcacctgtgt    3240
ggggcgtcct ccgataatgc gggccacccg agttcgagca tcctccagcc ccgcagaggc    3300
gagtcttccc a                                                         3311

<210> SEQ ID NO 95
<211> LENGTH: 1230
<212> TYPE: DNA
<213> ORGANISM: Unknown
<220> FEATURE:
<223> OTHER INFORMATION: polynucleotide

<400> SEQUENCE: 95
atgagcaaga cctctctcga caagagcaag atccgcttcc ttctgctgga aggcgtccac      60
cagaccgcac tggatacgct caaggctgcc ggctacacca acatcgagta cctgaccggc     120
tcgctgcccg aggaacagtt gaaagagaag atcgccgacg cccacttcat cggcatccgc     180
tcgcgcaccc aactgaccga ggaggtcttc gaccgcgcga agaagctggt cgcggtcggc     240
tgtttctgca tcggcaccaa ccaggtcgac ctggaggccg ctcgcgagcg cggcatcgcg     300
gtgttcaacg ccccctactc gaacacccgc tcggtggccg agctggtgct cgccgaggcg     360
atcctgctgc tgcgcggcat tcccgagaag aacgcggcca gccaccgcgg cggctggctg     420
aagagcgcca gcaactccta cgagatccgc ggcaagaagc tcggcatcat cggctatggc     480
tcgatcggta cccagctctc ggtgctggcc gaaagcctgg gcatgcaggt gctgttctac     540
gacgtggtga ccaagctgcc gctgggcaac gccgcccagg tggcaaccct ctacgacttg     600
ctcggccagg ccgacatcgt cacccgtgcac gtgccggaaa ccgccgcgac caagtggatg     660
atcggcgaga aggaaatccg cgccatgaag aaaggcgcca tcctgctcaa cgccgcccgc     720
ggcaccgtgg tggacatcga cgcgctggcc gccgccctcc gcgacaagca cctcaacggc     780
gcggccatcg acgtgttccc ggtggaaccg cgctccaaca acgacgagtt cgtcagcccg     840
```

-continued

```
ctgcgcgagt tcgacaacgt catcctcacc ccgcacgtcg gcggctcgac catggaggcc      900
caggccaaca tcggttcgga agtggccgag aagctggtca agtacagcga caacggcacc      960
tcggtgtcct cggtcaactt cccggaagtg gccctgccct cccacccggg caagcaccgc     1020
ctgctgcaca tccacaagaa catcccggga gtgatgagcg agatcaacaa ggtcttcgcc     1080
gagaacggca tcaacatttc cggccagttc ctgcagacca acgagacggt cggctacgtg     1140
gtgatcgatg tcgatgccga gtactcggaa atggccctgg agaaactgca gcaggtgaac     1200
ggcaccatcc gcagccgcgt gctgttctga                                      1230
```